US012288360B2

(12) United States Patent
Ostadabbas et al.

(10) Patent No.: US 12,288,360 B2
(45) Date of Patent: Apr. 29, 2025

(54) 3D HUMAN POSE ESTIMATION SYSTEM

(71) Applicant: Northeastern University, Boston, MA (US)

(72) Inventors: Sarah Ostadabbas, Watertown, MA (US); Shuangjun Liu, Boston, MA (US); Xiaofei Huang, Lynnfield, MA (US); Nihang Fu, Malden, MA (US)

(73) Assignee: Northeastern University, Boston, MA (US)

( * ) Notice: Subject to any disclaimer, the term of this patent is extended or adjusted under 35 U.S.C. 154(b) by 520 days.

(21) Appl. No.: 17/403,933

(22) Filed: Aug. 17, 2021

(65) Prior Publication Data
US 2022/0051437 A1 Feb. 17, 2022

Related U.S. Application Data

(60) Provisional application No. 63/178,564, filed on Apr. 23, 2021, provisional application No. 63/066,394, filed on Aug. 17, 2020.

(51) Int. Cl.
*G06T 7/73* (2017.01)
*G06T 7/50* (2017.01)

(52) U.S. Cl.
CPC ............... *G06T 7/75* (2017.01); *G06T 7/50* (2017.01); *G06T 2207/10024* (2013.01); *G06T 2207/10028* (2013.01); *G06T 2207/10048* (2013.01)

(58) Field of Classification Search
CPC ... G06T 7/75; G06T 7/50; G06T 2207/10024; G06T 2207/10028; G06T 2207/10048; G06T 2207/10016; G06T 2207/20076; G06T 2207/20081; G06T 2207/20084;
(Continued)

(56) References Cited

U.S. PATENT DOCUMENTS 6,049,281 A * 4/2000 Osterweil .............. G08B 21/22
340/573.7
10,679,046 B1 * 6/2020 Black ...................... G06V 40/23
(Continued)

OTHER PUBLICATIONS

F. Ofli, R. Chaudhry, G. Kurillo, R. Vidal and R. Bajcsy, "Berkeley MHAD: A comprehensive Multimodal Human Action Database," 2013 IEEE Workshop on Applications of Computer Vision (WACV), Clearwater Beach, FL, USA, 2013, pp. 53-60, doi: 10.1109/WACV.2013.6474999. (Year: 2013).*
(Continued)

*Primary Examiner* — Ping Y Hsieh
*Assistant Examiner* — Vaisali Rao Koppolu
(74) *Attorney, Agent, or Firm* — Verrill Dana, LLP

(57) ABSTRACT

Methods and systems for providing a dataset of human in-bed poses include simultaneously gathered images of in-bed poses of humans from imaging modalities including red-green-blue (RGB) and one or more of long wavelength infrared (LWIR), depth imaging, and pressure mapping. The images are obtained under a lighting condition and a cover condition. The dataset can be used to train a model of estimating human in-bed poses and for methods of estimating human in-bed poses. Methods and systems of estimating three-dimensional human poses from two-dimensional input images are provided.

17 Claims, 27 Drawing Sheets
(16 of 27 Drawing Sheet(s) Filed in Color)

(58) Field of Classification Search
CPC . G06T 2207/30196; G06T 2207/30204; G06T 2207/30232; G06T 7/74; G06T 7/80
See application file for complete search history.

(56) References Cited

U.S. PATENT DOCUMENTS

2017/0372483 A1* 12/2017 Chronis ............... G06T 7/20
2018/0027988 A1* 2/2018 Poodeh .............. A47G 9/1027

OTHER PUBLICATIONS

S. Liu, Y. Yin, S. Ostadabbas, "In-Bed Pose Estimation: Deep Learning with Shallow Dataset," Journal of Translational Engineering in Health and Medicine (JTEHM), vol. 7, No. 1, pp. 1-12, Jan. 2019; hereafter referred to as Liu (Year: 2019).*
Achilles, F., Ichim, AE., Coskun, H., Tombari, F., Noachtar, S., Navab, N. (2016). Patient MoCap: Human Pose Estimation Under Blanket Occlusion for Hospital Monitoring Applications. In: Medical Image Computing and Computer-Assisted Intervention—MICCAI 2016. MICCAI 2016. Lecture Notes in Computer Sc (Year: 2016).*
Bogo et al., "Keep it SMPL: Automatic Estimation of 3D Human Pose and Shape from a Single Image", European Conference on Computer Vision. Springer 2016 pp. 1-18 arXiv:1607.08128v1 [cs.CV] Jul. 27, 2016.
Chu et al., "Multi-Context Attention for Human Pose Estimation", IProceedings of the IEEE Conference on Computer Vision and Pattern Recognition, 2017, pp. 1831-1840.
Gkioxari et al., "Chained Predictions Using Convolutional Neural Networks", European Conference on Computer Vision. Springer, 2016 pp. 1-16 arXiv: 1605.02346v2 [cs.CV] Oct. 23, 2016.
Kolotouros et al., "Learning to Reconstruct 3D Human Pose and Shape via Model-fitting in the Loop", Proceedings of the IEEE/CVF International Conference on Computer Vision, pp. 2252-2261, 2019.
Liu et al., "A computationally Efficient Denoising and Hole-Filling Method for Depth Image Enhancement", Real-time image and video processing, 2016, 9 pages.
Liu et al., "A Vision-Based System for In-Bed Posture Tracking", Proceedings of the IEEE International Conference on Computer Vision, 2017 pp. 1373-1382.
Nguyen et al., "Modeling Kinect Sensor Noise for Improved 3d Reconstruction and Tracking", 2012 Second International Conference on 3D Imaging, Modeling, Processing, Visualization & Transmission, pp. 524-530. IEEE.
Pouyan et al., "Continuous Eight-Posture Classification for Bed-Bound Patients", 2013 6th International Conference on Biomedical Engineering and Informatics, 2013, pp. 121-126.
Xiao et al., "Simple Baselines for Human Pose Estimation and Tracking", European Conference on Computer Vision (ECCV), 2018 pp. 1-16.
Liu et al., "Seeing Under the Cover: A Physics Guided Learning Approach for In-Bed Pose Estimation", International Conference on Medical Image Computing and Computer-Assisted Intervention. Springer, 2019, pp. 1-9.

Ostadabbas et al., "In-Bed Posture Classification and Limb Identification", 2014 IEEE Biomedical Circuits and Systems Conference (BioCAS) Proceedings, 2014, pp. 1-4.
Liu et al., "In-Bed Pose Estimation: Deep Learning with Shallow Dataset", IEEE journal of translational engineering in health and medicine, pp. 1-12 arXiv:1711.01005v3 [cs.CV] Jul. 7, 2018.
Kanazawa et al., "End-to-end Recovery of Human Shape and Pose", Proceedings of the IEEE Conference on Computer Vision and Pattern Recognition, pp. 1-11, 2018 arXiv:1712.06584v1 [cs.CV] Dec. 18, 2017.
Liu et al., "Simultaneously-Collected Multimodal Lying Pose Dataset: Towards In-Bed Human Pose Monitoring under Adverse Vision Conditions" arXiv:2008.08735v1 [cs.CV] Aug. 20, 2020.
Sun et al., "Deep High-Resolution Representation Learning for Human Pose Estimation", CVRP, 2019 arXiv:1902.09212v1 [cs.CV] Feb. 25, 2019.
He et al., "Deep Residual Learning for Image Recognition", Proceedings of the IEEE conference on computer vision and pattern recognition, pp. 770-778, 2016.
Yang et al., "Learning Feature Pyramids for Human Pose Estimation", Proceedings of the IEEE international conference on computer vision, 2017, pp. 1281-1290.
Newell et al., "Stacked Hourglass Networks for Human Pose Estimation" European Conference on Computer Vision, pp. 1-17, 2016. arXiv:1603.06937v2 [cs.CV] Jul. 26, 2016.
Moon et al., "Camera Distance-aware Top-down Approach for 3d Multi-person Pose Estimation from a Single RGB Image", Proceedings of the IEEE International Conference on Computer Vision, 2019, pp. 10133-10142.
Ronchi et al., "It's all relative: Monocular 3d Human Pose Estimation from Weakly Supervised Data", BMVC, 2018 arXiv:1805.06880v2 [cs.CV] Jul. 28, 2018.
Zhou et al., "Towards 3d Human Pose Estimation in the Wild: A Weakly-supervised Approach", The IEEE International Conference on Computer Vision (ICCV), Oct. 2017. pp. 398-407.
Xiong et al., "A2J: Anchor-to-Joint Regression Network for 3D Articulated Pose Estimation from a Single Depth Image", Proceedings of the IEEE International Conference on Computer Vision, 2019, pp. 793-802.
Haque et al., "Towards Viewpoint Invariant 3D Human Pose Estimation", European Conference on Computer Vision, Oct. 2016. arXiv:1603.07076v3 [cs.CV] Jul. 26, 2016.
Loper et al., "Smpl: A Skinned Multi-Person Linear Model", ACM transactions on graphics (TOG), 34(6):1-16, 2015.
Kato et al., "Neural 3D Mesh Renderer", The IEEE Conference on Computer Vision and Pattern Recognition (CVPR), 2018. pp. 3907-3916.
Fessler, J., "Statistical methods for tomographic image reconstruction", University of Michigan, GE CRD, (2000) 68 pages.
Ionescu et al., "Human3.6M: Large Scale Datasets and Predictive Methods for 3D Human Sensing in Natural Environments", IEEE transactions on pattern analysis and machine intelligence, 36(7):1325-1339, 2013.

* cited by examiner

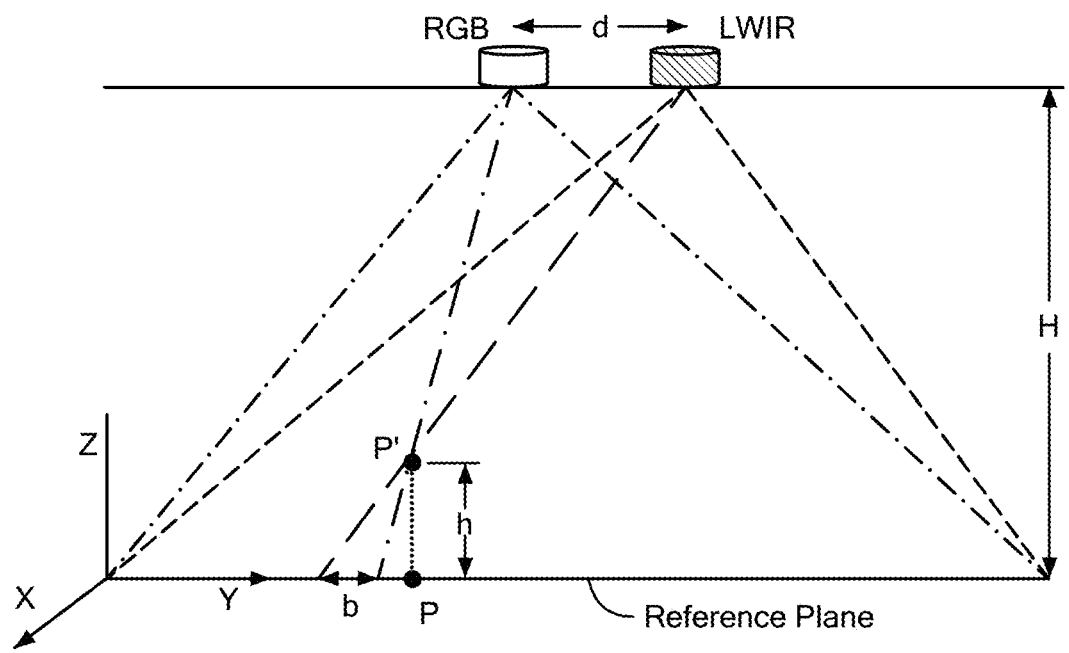
FIG. 4
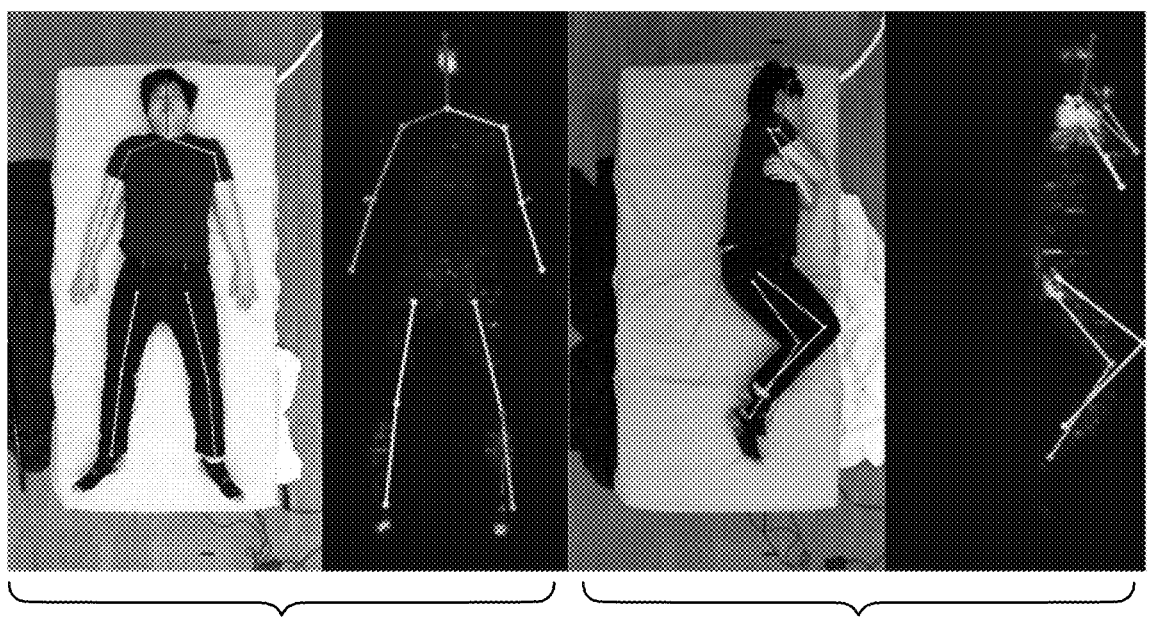
FIG. 5A  FIG. 5B

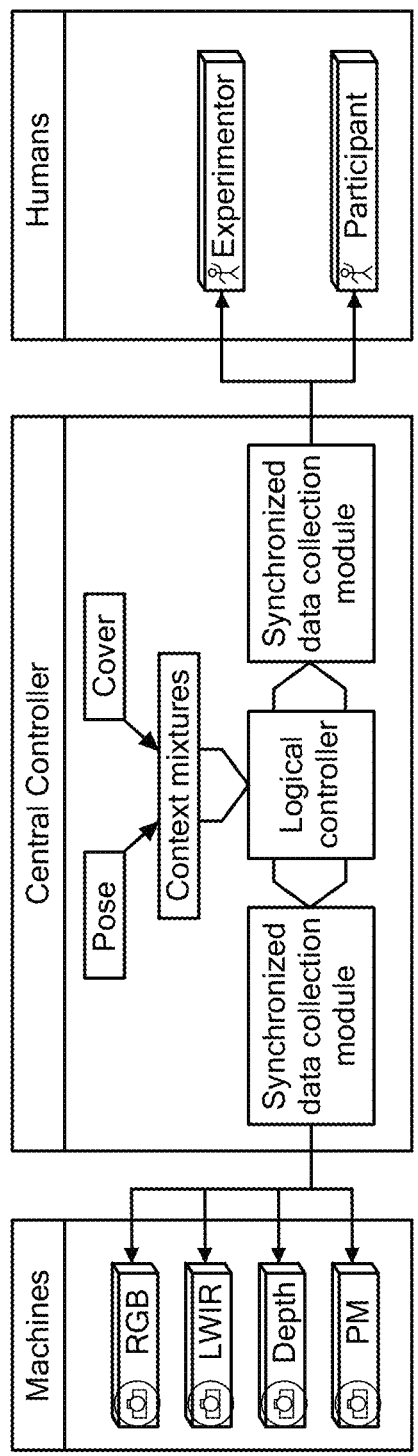
FIG. 8
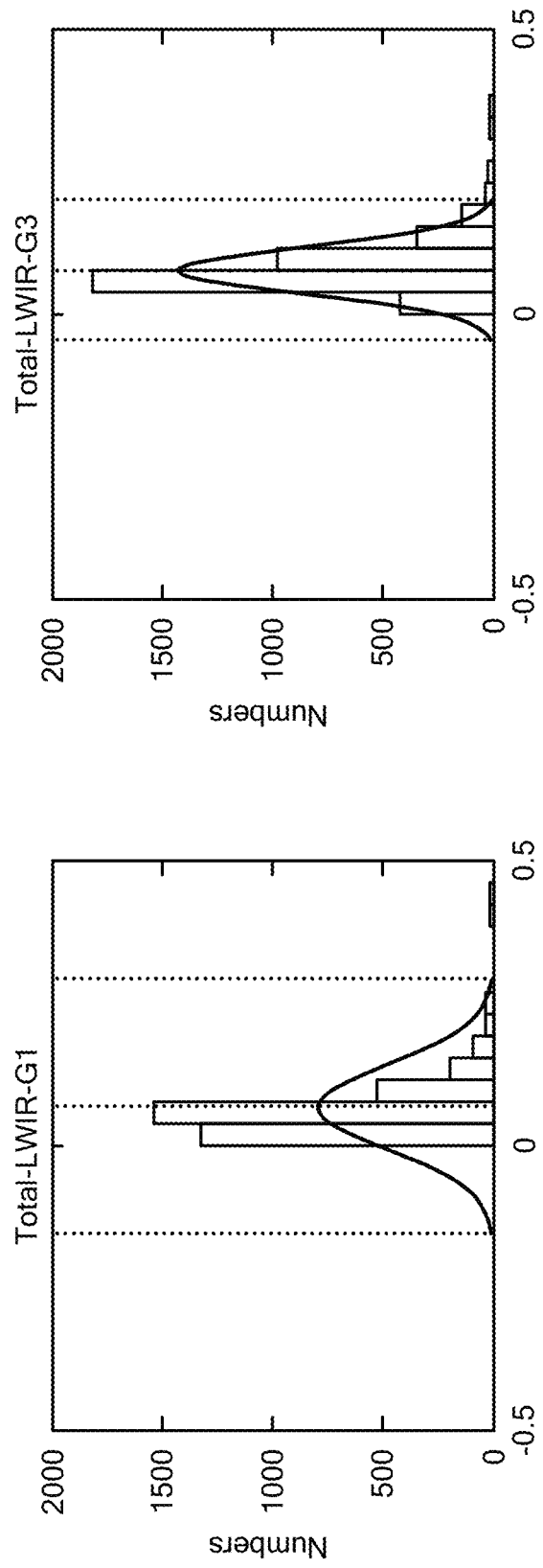
FIG. 9A
FIG. 9B

3D HUMAN POSE ESTIMATION SYSTEM

CROSS REFERENCE TO RELATED APPLICATIONS

This application claims benefit under 35 U.S.C. § 119(e) of U.S. Provisional Application No. 63/066,394, filed on 17 Aug. 2020, entitled "High Resolution Full-Body In-Bed Pose Estimation System Using Multimodal Sensing," and U.S. Provisional Application No. 63/178,564, filed on 23 Apr. 2021, entitled "3D Human Pose Estimation System," which are hereby incorporated by reference.

STATEMENT REGARDING FEDERALLY SPONSORED RESEARCH OR DEVELOPMENT

This invention was made with government support under Grant No. 1755695 awarded by the National Science Foundation. The government has certain rights in the invention.

BACKGROUND

Sleep/at-rest behavior monitoring is a critical aspect in many healthcare prediction, diagnostic, and treatment practices, in which accurately tracking poses that a person takes while in bed can play an important role in the outcomes. In-bed poses affect the symptoms of many medical complications such as sleep apnea, pressure ulcers, and even carpal tunnel syndrome. Patients in hospitals may be required to maintain specific poses after certain surgeries to get a better recovery result. The need for automatic in-bed behavior monitoring systems became more apparent during the SARS-CoV-2 pandemic when spiking numbers of patients required consistent monitoring throughout the day and medical system overload became more common. In such circumstances, automatic patient monitoring systems that can be employed unobtrusively at home or in local medical centers could lead to reduced hospital visits and mitigate the risk of spreading infections as well as reducing the workload of caregivers.

However, in-bed human pose monitoring still relies heavily on obtrusive wearable devices or reports taken manually by caregivers. Expensive medical-grade devices often cannot be offered beyond a professional hospital setting. Also, the behavioral reports are usually subjective and differ between different medical wards. Human in-bed pose estimation that relies mainly on expensive pressure mapping (PM) solutions with only limited granularity can cost up to thousands of dollars. Contact-less methods based on other sensing modalities such as depth sensing (via Microsoft Kinect) or camera-based method (via RGB videos) have been proposed; however they either provide limited pose detection granularity or cannot work under full darkness or covered conditions common in sleeping contexts.

Recent computer vision advancements in general human pose estimation have opened up a new avenue for contact-less patient monitoring. However, the special vision adversarial conditions around in-bed human pose estimation, such as the large illumination changes (including full darkness) and the presence of heavy occlusions (e.g., sheets or blanket), have hindered the accuracy of pose estimation algorithms for in-bed cases.

Efforts have been made to address the in-bed human pose estimation problem under adversarial conditions by employing other sensing modalities including pressure map, depth data, and infrared imaging. Yet, the scale of data in these works is limited by having only a few participants, and none of the work has publicly released their datasets to the machine learning/computer vision community. Lack of publicly available datasets not only makes it hard to reproduce their results and validate their effectiveness, but also comparison with newly-developed algorithms without a common benchmark has not been possible in this domain.

Deep learning-based human pose estimation algorithms have been developed since the introduction of convolutional pose machines. These algorithms can achieve a high level of performance for 2D human pose estimation. 3D human pose estimation has been developed. However, these algorithms have not achieved similar results when a human is lying in a bed. Mainstream human pose estimation studies are based on conventional RGB images, which are not effective under darkness or when a human subject is fully covered. Second, even for human annotators, pose ground truth generation under such contexts is challenging and may not be feasible. Also, due to the lack of available large-scale datasets, data driven approaches are difficult to establish.

RGB data has been employed for general posture estimation. (S. Liu and S. Ostadabbas, "A vision-based system for in-bed posture tracking," in *Proceedings of the IEEE International Conference on Computer Vision*, 2017, pp. 1373-1382) However, the study settings have been limited to well illuminated environments and with little to no occlusion. To address these adverse vision conditions in monitoring of in-bed poses, other imaging modalities have been introduced, including pressure map, depth data, and recent work based on long wavelength infrared (LWIR) (S. Liu and S. Ostadabbas, "Seeing under the cover: A physics guided learning approach for in-bed pose estimation," in *International Conference on Medical Image Computing and Computer-Assisted Intervention*. Springer, 2019, pp. 236-245. S. Liu, Y. Yin, and S. Ostadabbas, "In-bed pose estimation: Deep learning with shallow dataset," *IEEE journal of translational engineering in health and medicine*, vol. 7, pp. 1-12, 2019.)

For pose estimation using pressure sensors/mats, Pouyan et al. extracted binary signatures from pressure images obtained from a commercial pressure mat and used a binary pattern matching technique for pose classification. (M. B. Pouyan, S. Ostadabbas, M. Farshbaf, R. Yousefi, M. Nourani, and M. Pompeo, "Continuous eight-posture classification for bed-bound patients," 2013 *6th International Conference on Biomedical Engineering and Informatics*, pp. 121-126, 2013.) The same group also introduced a Gaussian mixture model (GMM) clustering approach for concurrent pose classification and limb identification using pressure data. (S. Ostadabbas, M. Pouyan, M. Nourani, and N. Kehtarnavaz, "In-bed posture classification and limb identification," 2014 *IEEE Biomedical Circuits and Systems Conference (BioCAS) Proceedings*, pp. 133-136, 2014.) However, 2D or 3D pose ambiguity issues have been observed when body parts lose contact with the pressure sensors. Another factor that hinders the mainstream use of pressure mapping systems is their high cost and difficulty in maintaining and cleaning them, which limits their usage to professional hospital rooms.

The data scarcity issue poses a hurdle for many scientific, industrial, and healthcare applications, where gathering or labeling data can be prohibitively expensive due to sampling costs or strong privacy laws. Data-efficient machine learning (ML) approaches therefore have been trying to exploit structural knowledge in the problem in order to constrain them to a point where the model is simple enough to be correctly trained with the available data. One way is to train an initial inference model using plentiful data from a similar problem, then transfer the learning (e.g., via fine-tuning) to the target problem. Data-efficient ML however often requires some sample data (although limited) from the target domain or a series of shared attributes in the zero-shot learning case. However, in some cases, not even a single annotated sample is available in a target application due to data collection difficulties or context constraints.

SUMMARY

Computer vision (CV) has achieved great success in interpreting semantic meanings from images, yet CV algorithms can be brittle for tasks with adverse vision conditions and tasks that suffer from data/label pair availability. One of these tasks is in-bed human pose estimation, which has significant value in many healthcare applications. In-bed pose monitoring involves natural adversarial conditions such as complete darkness or full occlusion due to the usage of covers during sleep. Furthermore, the lack of publicly available in-bed pose datasets hinders the use of many successful pose estimation algorithms for this task. The technology described herein provides a dataset of lying poses (sometimes termed "Simultaneously-collected multimodal Lying Pose" or "SLP" dataset herein), which includes images from participants while lying in a bed captured using multiple imaging modalities including red-green-blue (RGB), long wave infrared (LWIR), depth, and pressure mapping modalities. A physical hyper parameter tuning (PHPT) strategy is provided for ground truth labeling of these poses under a lighting condition and a cover condition, including conditions such as fully covered and full darkness. SLP is designed and formed in a compatible way to the mainstream two dimensional (2D) human pose datasets. Therefore, state-of-the-art 2D human pose estimation models can effectively be trained with SLP pose data with, in some embodiments, performance as high as 95% at PCKh0.5 on a single modality. The pose estimation performance can be further improved by including additional modalities through collaboration. Besides its multimodal content that addresses the challenges associated with environments with adverse vision conditions, SLP specific pose distribution can be complementary to existing datasets for general purpose use in experiments.

Additionally, monocular three dimensional (3D) human pose estimation from a single RGB image has received much attention in the past few years. However, pose inference models with competitive performance require supervision with 3D pose ground truth data or at least known pose priors in their target domain. Yet, these data requirements in target applications with data collection constraints may not be achievable. In the technology described herein, a heuristic weakly supervised solution (sometimes termed "HW-HuP" herein) is provided to estimate 3D human poses in contexts for which no ground truth 3D data is accessible, even for fine-tuning. HW-HuP can learn a set of pose priors from public 3D human pose datasets and use observations from the target domain to iteratively estimate a 3D human pose and shape in an optimization and regression hybrid cycle. In this technology, depth data as auxiliary information is employed for supervision, yet it is not needed for the inference. HW-HuP has been evaluated qualitatively on a clinical dataset of in-bed human poses, where no ground truth 3D pose is provided. HW-HuP performance has also been tested quantitatively on a publicly available motion capture dataset against the 3D ground truth. HW-HuP is also able to be extended to other input modalities for pose estimation tasks especially under adverse vision conditions, such as occlusion or full darkness.

Further embodiments, aspects, and features include the following:

1. A method of generating a dataset of a plurality of human in-bed poses, comprising:
    by a computer system comprising a processor and memory having computer-readable instructions stored therein:
    (a) receiving a plurality of sets of simultaneously gathered images of in-bed poses of humans from at least two imaging modalities, wherein:
        the imaging modalities include a red-green-blue (RGB) imaging modality and at least one of a long wavelength infrared (LWIR) imaging modality, a depth imaging modality, and a pressure mapping imaging modality, and
        each of the images comprise an in-bed pose and an appearance, the appearance comprising each of the humans in a lighting condition and a cover condition, the lighting condition ranging from full illumination to full darkness, the cover condition selected from the group consisting of no covering, a first cover, and a second cover, the second cover being thicker than the first cover;
    (b) labeling the gathered images with ground truth poses; and
    (c) storing the gathered images labeled with the ground truth poses in a database in the computer system.

2. The method of 1, wherein in step (a), the imaging modalities include each of the red-green-blue (RGB) imaging modality, the long wavelength infrared (LWIR) imaging modality, the depth imaging modality, and the pressure mapping imaging modality.

3. The method of any of 1-2, wherein step (b) further comprises:
    mapping each image in one of the imaging modalities to a target pose state; and
    minimizing a pose estimation error that depends on parameters including a target appearance, a target pose, a context appearance, and a context pose;
    wherein the target appearance, the context appearance, and the context pose comprise hyperparameters used to control the labeling.

4. The method of any of 1-3, wherein the or a step of minimizing the pose estimation error comprises labeling images by comparison to a known image with a same target pose under a different context appearance or a different context pose.

5. The method of any of 1-4, wherein the or a step of minimizing the pose estimation error comprises labeling images that have a same target pose under a context appearance of no cover.

6. The method of any of 1-5, wherein the or a step of minimizing the pose estimation error comprises using images that are gathered from the RGB imaging modality as a heuristic guide to label images gathered from another of the imaging modalities.

7. The method of any of 1-6, wherein the or a step of minimizing the pose estimation error comprises a homographic mapping from an image obtained from one imaging modality to an image obtained from a different imaging modality.

8. The method of any of 1-7, further comprising, prior to step (a):
 obtaining a background image of a surface of an unoccupied bed at a room temperature at each of the imaging modalities;
 obtaining a further image of the surface of the unoccupied bed with one or more markers placed on the surface of the unoccupied bed, each marker altering the images obtained by each of the imaging modalities; and
 using the further image in the or a homographic mapping.

9. The method of any of 1-8, wherein the labeled images comprise images of body joints.

10. The method of any of 1-9, wherein the labeled images include a data file containing coordinate locations of each body joint.

11. The method of any of 1-10, further comprising acquiring the sets of the simultaneously gathered images from the imaging modalities, wherein:
 the RGB imaging modality, the LWIR imaging modality, and the depth imaging modality, each comprise a camera or sensor mounted on a ceiling at a same distance above a bed surface;
 the pressure mapping imaging modality comprises a pressure mat disposed on the bed surface; and
 each of the imaging modalities is in communication with the computer system to provide simultaneously obtained images to the computer system.

12. The method of any of 1-12, wherein the lighting condition of full illumination comprises a room having artificial illumination turned on, and the lighting condition of full darkness comprises a room having artificial illumination turned off.

13. A system for providing a dataset of a plurality of human in-bed poses, comprising:
 a computer system comprising a processor and memory having computer-readable instructions stored therein that when executed cause the computer system to:
 (a) receive a plurality of sets of simultaneously gathered images of in-bed poses of humans from at least two imaging modalities, wherein:
  the imaging modalities include a red-green-blue (RGB) imaging modality and at least one of a long wavelength infrared (LWIR) imaging modality, a depth imaging modality, and a pressure mapping imaging modality, and
  each of the images comprise an in-bed pose and an appearance, the appearance comprising each of the humans in a lighting condition and a cover condition, the lighting condition ranging from full illumination to full darkness, the cover condition selected from the group consisting of no covering, a first cover, and a second cover, the second cover being thicker than the first cover;
 (b) label the images with ground truth poses; and
 (c) store the gathered images labeled with the ground truth poses in a database in the computer system.

14. The system of 13, wherein in step (a), the imaging modalities include each of the red-green-blue (RGB) imaging modality, the long wavelength infrared (LWIR) imaging modality, the depth imaging modality, and the pressure mapping imaging modality.

15. The system of any of 13-14, wherein step (b) further comprises:
 mapping each image in one of the imaging modalities to a target pose state; and
 minimizing a pose estimation error that depends on parameters including a target appearance, a target pose, a context appearance, and a context pose;
 wherein the target appearance, the context appearance, and the context pose comprise hyperparameters used to control the labeling.

16. The system of any of 13-15, wherein the or a step of minimizing the pose estimation error comprises labeling images by comparison to a known image with a same target pose under a different context appearance or a different context pose.

17. The system of any of 13-16, wherein the or a step of minimizing the pose estimation error comprises labeling images that have a same target pose under a context appearance of no cover.

18. The system of any of 13-17, wherein the or a step of minimizing the pose estimation error comprises using images that are gathered from the RGB imaging modality as a heuristic guide to label images gathered from another of the imaging modalities.

19. The system of any of 13-18, wherein the or a step of minimizing the pose estimation error comprises a homographic mapping from an image obtained from one imaging modality to an image obtained from a different imaging modality.

20. The system of any of 13-19, further comprising, prior to step (a):
 obtaining a background image of a surface of an unoccupied bed at a room temperature at each of the imaging modalities;
 obtaining a further image of the surface of the unoccupied bed with one or more markers placed on the surface of the unoccupied bed, each marker altering the images obtained by each of the imaging modalities; and
 using the further image in the or a homographic mapping.

21. The system of any of 13-20, wherein the labeled images comprise images of body joints.

22. The system of any of 13-21, wherein the labeled images include a data file containing coordinate locations of each body joint.

23. The system of any of 13-22, further comprising the imaging modalities for acquiring the sets of the simultaneously gathered images, wherein:
 the RGB imaging modality, the LWIR imaging modality, and the depth imaging modality, each comprise a camera or sensor mounted on a ceiling at a same distance above a bed surface;
 the pressure mapping imaging modality comprises a pressure mat disposed on the bed surface; and
 each of the imaging modalities is in communication with the computer system to provide simultaneously obtained images to the computer system.

24. The system of any of 13-23, wherein the lighting condition of full illumination comprises a room having artificial illumination turned on, and the lighting condition of full darkness comprises a room having artificial illumination turned off.

25. A method of estimating a human in-bed pose comprising:
 (a) providing a computer system comprising a processor and memory, including a trained model for estimating human in-bed poses trained with a dataset comprising a plurality of human in-bed poses comprising sets of images generated simultaneously from at least two imaging modalities, wherein:
  the imaging modalities include a red-green-blue (RGB) imaging modality, and one or more of a long wavelength infrared (LWIR) imaging modality, a depth imaging modality, and a pressure map imaging modality, and each of the images further comprise an in-bed pose and an appearance, the appearance comprising each of the humans in a lighting condition and a cover condition, the lighting condition ranging from full illumination to full darkness, the cover condition selected from the group consisting of no covering, a first cover, and a second cover, the second cover being thicker than the first cover;

(b) transmitting to the processor one or more images of a human lying in a bed from one or more imaging devices oriented toward the bed, the imaging devices comprising one or more of a red-green-blue (RGB) imaging device, a long wavelength infrared (LWIR) imaging device, a depth imaging device, and a pressure map imaging device; and (c) determining by the processor a pose of the human lying in the bed.

26. The method of 25, wherein the processor is operative to determine the pose of the human in one or more of full illumination, full darkness, no covering, the first cover, and the second cover.

27. The method of any of 25-26, wherein in step (a), the imaging modalities include each of the red-green-blue (RGB) imaging modality, the long wavelength infrared (LWIR) imaging modality, the depth imaging modality, and the pressure mapping imaging modality.

28. The method of any of 25-27, wherein step (c) comprises providing an image of the human, including labeled images comprising images of body joints.

29. The method of any of 25-28, wherein step (c) comprises providing an image of the human including a data file containing coordinate locations of each body joint of the human.

30. A system for estimating a human in-bed pose comprising:

one or more imaging devices oriented toward a bed, the imaging devices comprising one or more of a red-green-blue (RGB) imaging device, a long wavelength infrared (LWIR) imaging device, a depth imaging device, and a pressure map imaging device; and a computer system comprising a processor and memory, including a trained model for estimating human in-bed poses trained with a dataset comprising a plurality of human in-bed poses comprising sets of images generated simultaneously from at least two imaging modalities, wherein:

the imaging modalities including a red-green-blue (RGB) imaging modality, and at least one of a long wavelength infrared (LWIR) imaging modality, a depth imaging modality, and a pressure map imaging modality, each of the images further comprise an in-bed pose and an appearance, the appearance comprising a darkness condition and a cover condition, the darkness condition selected from the group consisting of light and darkness, the cover condition selected from the group consisting of no covering, a first cover, and a second cover, the second cover being thicker than the first cover, and the processor is in communication with the one or more imaging devices to receive one or more images of a human lying in the bed and is operative to determine a pose of the human lying in the bed via the trained model.

31. The system of 30, wherein the processor is operative to determine the pose of the human in one or more of light, darkness, no covering, the first cover, and the second cover.

32. The system of any of 30-31, wherein the imaging modalities include each of the red-green-blue (RGB) imaging modality, the long wavelength infrared (LWIR) imaging modality, the depth imaging modality, and the pressure mapping imaging modality.

33. The system of any of 30-32, wherein the processor is operative to provide an image of the human, including labeled images comprising images of body joints.

34. The system of any of 30-33, wherein the processor is operative to provide an image of the human including a data file containing coordinate locations of each body joint of the human.

35. A method of estimating human in-bed poses comprising:

(a) generating a dataset of a plurality of images of human in-bed poses, the images comprising simultaneously gathered sets of images of in-bed poses from at least two imaging modalities, wherein:

the imaging modalities including a red-green-blue (RGB) imaging modality, and at least one of a long wavelength infrared (LWIR) imaging modality, a depth imaging modality, and a pressure map imaging modality, and each of the images further comprise an in-bed pose and an appearance of a human, the appearance comprising the human in a lighting condition and a cover condition, the darkness condition selected from the group consisting of light and darkness, the cover condition selected from the group consisting of no covering, a first cover, and a second cover, the second cover being thicker than the first cover;

(b) in a computer system comprising a processor and memory, training a model for estimating human in-bed poses with the dataset; and (c) with the model, estimating a human in-bed pose from an input image.

36. The method of 35, wherein in step (a), the imaging modalities include each of the red-green-blue (RGB) imaging modality, the long wavelength infrared (LWIR) imaging modality, the depth imaging modality, and the pressure mapping imaging modality.

37. The method of any of 35-36, wherein the processor is operative to estimate the human in-bed pose in the input image obtained in one no covering, the first cover, and the second cover.

38. The method of any of 35-37, wherein the processor is operative to estimate the human in-bed pose in the input image obtained in one of full illumination, no artificial illumination, and full darkness.

39. A method of estimating a human pose comprising:

(a) providing a computer system comprising a processor and memory having computer-readable instructions stored therein, including a trained model for estimating human poses trained with a dataset comprising a plurality of three-dimensional images from a source domain and a plurality of target domain images;

(b) inputting a two-dimensional image of a human figure;

(c) determining by the processor a three-dimensional pose and shape of the human figure; and (d) generating an image of the human figure, the image illustrating a three-dimensional pose and shape of the human figure.

40. The method of 39, wherein the source domain images include three-dimensional pose and shape images; and the target domain images include two-dimensional annotated pose data and depth data.

41. The method of any of 39-40, wherein:
the target domain images include sets of simultaneously gathered images of in-bed poses of humans from at least two imaging modalities, wherein:
the imaging modalities include a red-green-blue (RGB) imaging modality and at least one of a long wavelength infrared (LWIR) imaging modality, a depth imaging modality, and a pressure mapping imaging modality; and
each of the images comprises an in-bed pose and an appearance, the appearance comprising a lighting condition and a cover condition, the lighting condition ranging from full illumination to full darkness, the darkness condition selected from the group consisting of light and darkness, the cover condition selected from the group consisting of no covering, a first cover, and a second cover, the second cover being thicker than the first cover.

42. The method of any of 39-41, wherein the imaging modalities include each of the red-green-blue (RGB) imaging modality, the long wavelength infrared (LWIR) imaging modality, the depth imaging modality, and the pressure mapping imaging modality.

43. The method of any of 39-42, wherein the processor incudes:
a three-dimensional pose regression model trained to estimate, from the two-dimensional image, a three-dimensional pose of the human figure, a shape of the human figure, and camera parameters, wherein the regression model is trained to provide an output comprising an estimated mesh of vertices representative of an estimated image of the human figure; and
a neural renderer to determine a predicted depth and a mask from the estimated mesh.

44. The method of any of 39-43, wherein the three-dimensional pose is a vector of a representation of a plurality of body parts, and the shape is a number of coefficients in a human template space.

45. The method of any of 39-44, wherein the camera parameters comprise a camera global rotation, a translation vector, and a scale.

46. The method of any of 39-45, wherein the processor is operative:
in an optimization pipeline to minimize a two-dimensional pose estimation error; and
in an observation pipeline to feed observed two-dimensional pose annotation data, depth data, human body mask data, and joint depth-based proxy data for supervision of step (c) of determining the three-dimensional pose and the shape of the human figure.

47. The method of any of 39-46, wherein the processor is operative to:
in a first stage, determine an estimated mesh of the human figure aligned in two-dimensions and an estimated mask from the estimated mesh; and
in a second stage, fine tune the three-dimensional pose and the shape from the estimated mask with additional depth alignment data.

48. The method of any of 39-47, wherein the processor is operative in a first stage to:
(e) determine by the regression model an initial estimate of a three-dimensional pose and camera parameters;
(f) in the optimization pipeline, optimize the initial estimate from step (e) or a subsequent estimate to provide an updated estimate;
(g) in the observation pipeline, update the regression model by minimizing an error in the updated estimate from the two-dimensional pose annotation data and the joint depth-based proxy data; and
(h) repeat steps (f) through (g) for a determined number of iterations.

49. The method of any of 39-48, wherein in step (g), the regression model is updated with a supervision loss dependent on a two-dimensional pose loss, a pose prior learned from the source domain, and penalty terms representative of shape coefficients and joint rotations.

50. The method of any of 39-49, wherein in step (g), the regression model is updated with a three-dimensional pose loss dependent on joint visibility data in the two-dimensional pose annotation data.

51. The method of any of 39-50, wherein the processor is operative in a second stage after the first stage to generate, by the neural renderer, an estimated depth and a mask of the human figure.

52. The method of any of 39-51, wherein the processor is operative in the second stage to generate the estimated depth and mask of the human figure with a loss term of human pose and shape regression dependent on a two-dimensional pose loss, optimized pose and shape terms, and a depth loss term.

53. The method of any of 39-52, wherein the processor is operative to determine the pose of the human in one or more of an uncovered condition and a covered condition.

54. The method of any of 39-53, wherein the processor is operative to determine the pose of the human in a lighting condition ranging from full illumination to full darkness.

55. The method of any of 39-54, wherein the input two-dimensional image includes an image of a human in bed, in a vehicle seat, or in a cockpit.

56. A system for estimating a human pose comprising:
a computer system comprising a processor and memory, including a trained model for estimating human poses trained with a dataset comprising a plurality of three-dimensional images from a source domain and a plurality of target domain images, and computer-readable instructions stored in the memory that when executed cause the computer system to:
(a) receive a two-dimensional image of a human figure;
(b) determine a three-dimensional pose and shape of the human figure; and
(c) generate an image of the human figure, the image illustrating a three-dimensional pose and shape of the human figure.

57. The system of 56, wherein the source domain images include three-dimensional pose and shape images; and
the target domain images include two-dimensional annotated pose data and depth data.

58. The system of any of 56-57, wherein:
the target domain images include sets of simultaneously gathered images of in-bed poses of humans from at least two imaging modalities, wherein:
the imaging modalities include a red-green-blue (RGB) imaging modality and at least one of a long wavelength infrared (LWIR) imaging modality, a depth imaging modality, and a pressure mapping imaging modality; and
each of the images comprises an in-bed pose and an appearance, the appearance comprising a lighting condition and a cover condition, the lighting condition ranging from full illumination to full darkness, the darkness condition selected from the group consisting of light and darkness, the cover condition selected from the group consisting of no covering, a first cover, and a second cover, the second cover being thicker than the first cover.

59. The system of any of 56-58, wherein the imaging modalities include each of the red-green-blue (RGB) imaging modality, the long wavelength infrared (LWIR) imaging modality, the depth imaging modality, and the pressure mapping imaging modality.

60. The system of any of 56-59, wherein the processor incudes:
    a three-dimensional pose regression model trained to estimate, from the two-dimensional image, a three-dimensional pose of the human figure, a shape of the human figure, and camera parameters, wherein the regression model is trained to provide an output comprising an estimated mesh of vertices representative of an estimated image of the human figure; and
    a neural renderer to determine a predicted depth and a mask from the estimated mesh.

61. The system of any of 56-60, wherein the three-dimensional pose is a vector of a representation of a plurality of body parts, and the shape is a number of coefficients in a human template space.

62. The system of any of 56-61, wherein the camera parameters comprise a camera global rotation, a translation vector, and a scale.

63. The system of any of 56-62, wherein the processor is operative:
    in an optimization pipeline to minimize a two-dimensional pose estimation error; and
    in an observation pipeline to feed observed two-dimensional pose annotation data, depth data, human body mask data, and joint depth-based proxy data for supervision of step (c) of determining the three-dimensional pose and the shape of the human figure.

64. The system of any of 56-63, wherein the processor is operative to:
    in a first stage, determine an estimated mesh of the human figure aligned in two-dimensions and an estimated mask from the estimated mesh; and
    in a second stage, fine tune the three-dimensional pose and the shape from the estimated mask with additional depth alignment data.

65. The system of any of 56-64, wherein the processor is operative in a first stage to:
    (e) determine by the regression model an initial estimate of a three-dimensional pose and camera parameters;
    (f) in the optimization pipeline, optimize the initial estimate from step (e) or a subsequent estimate to provide an updated estimate;
    (g) in the observation pipeline, update the regression model by minimizing an error in the updated estimate from the two-dimensional pose annotation data and the joint depth-based proxy data; and
    (h) repeat steps (f) through (g) for a determined number of iterations.

66. The system of any of 56-65, wherein in step (g), the regression model is updated with a supervision loss dependent on a two-dimensional pose loss, a pose prior learned from the source domain, and penalty terms representative of shape coefficients and joint rotations.

67. The system of any of 56-66, wherein in step (g), the regression model is updated with a three-dimensional pose loss dependent on joint visibility data in the two-dimensional pose annotation data.

68. The system of any of 56-67, wherein the processor is operative in a second stage after the first stage to generate, by the neural renderer, an estimated depth and a mask of the human figure.

69. The system of any of 56-68, wherein the processor is operative in the second stage to generate the estimated depth and mask of the human figure with a loss term of human pose and shape regression dependent on a two-dimensional pose loss, optimized pose and shape terms, and a depth loss term.

70. The system of any of 56-69, wherein the processor is operative to determine the pose of the human in one or more of an uncovered condition and a covered condition.

71. The system of any of 56-70, wherein the processor is operative to determine the pose of the human in a lighting condition ranging from full illumination to full darkness.

72. The system of any of 56-72, wherein the input two-dimensional image includes an image of a human in bed, in a vehicle seat, or in a cockpit.

73. A system for providing a dataset of a plurality of human in-bed poses using the method of any of 1-12, comprising:
    the computer system comprising the processor and memory having computer-readable instructions stored therein that when executed, cause the computer system to carry out the steps (a), (b), and (c), 74. A system for estimating a human in-bed pose using the method of any of 25-29, comprising:
    one or more imaging devices oriented toward a bed, the imaging devices comprising one or more of a red-green-blue (RGB) imaging device, a long wavelength infrared (LWIR) imaging device, a depth imaging device, and a pressure map imaging device; and
    the computer system comprising the processor and memory, including the trained model for estimating human in-bed poses trained with the dataset comprising a plurality of human in-bed poses comprising sets of images generated simultaneously from at least two imaging modalities, wherein:
        the imaging modalities including a red-green-blue (RGB) imaging modality, and at least one of a long wavelength infrared (LWIR) imaging modality, a depth imaging modality, and a pressure map imaging modality,
        each of the images further comprise an in-bed pose and an appearance, the appearance comprising a darkness condition and a cover condition, the darkness condition selected from the group consisting of light and darkness, the cover condition selected from the group consisting of no covering, a first cover, and a second cover, the second cover being thicker than the first cover, and
        the processor is in communication with the one or more imaging devices to receive one or more images of a human lying in the bed and is operative to determine a pose of the human lying in the bed via the trained model.

75. A system for estimating a human pose using the method of any of 39-55, comprising:
    the computer system comprising the processor and memory, including the trained model for estimating human poses trained with the dataset comprising a plurality of three-dimensional images from a source domain and a plurality of target domain images, and computer-readable instructions stored in the memory that when executed cause the computer system to:

(a) receive a two-dimensional image of a human figure;
(b) determine a three-dimensional pose and shape of the human figure; and
(c) generate an image of the human figure, the image illustrating a three-dimensional pose and shape of the human figure.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A illustrates a regular bedroom, and FIG. 1B a simulated hospital room.

FIG. 3A illustrates false leg pose (in red) caused by the heat residue in the LWIR image, FIG. 3B illustrates false arm pose (in red) due to the cuddled limbs. The correct limb poses are given in green.

FIG. 4 illustrates ghosting error and between-camera mapping bias caused by elevation from reference plane with a working example between RGB and LWIR.

FIGS. 5A and 5B illustrate demonstrations of pressure mat (PM) ground truth generation via physical hyperparameter tuning (PHPT) guideline III in: FIG. 5A illustrates a supine pose, and FIG. 5B illustrates a right lying pose. Red dash line shows direct annotation, intuitively.

FIG. 6A illustrates an interior view of an embodiment of an alignment marker. FIG. 6B illustrates automatic center extraction in RGB. FIG. 6C illustrates a front view of the alignment marker of FIG. 6A.

FIG. 7A illustrates height (cm), FIG. 7B illustrates weight (kg), and FIG. 7C illustrates limb sizes (cm).

FIG. 8 is a schematic diagram of an embodiment of a multimodal data collection system.

FIGS. 9A and 9B illustrate truncated histograms of normalized distance from the gold standard labels (using LWIR-G123) for labels using: FIG. 9A illustrates LWIR-G1, and FIG. 9B illustrates LWIR-G3. A Gaussian curve is fitted with green vertical lines as the mean and 3 standard deviation bounds.

DETAILED DESCRIPTION

Figure 1B:
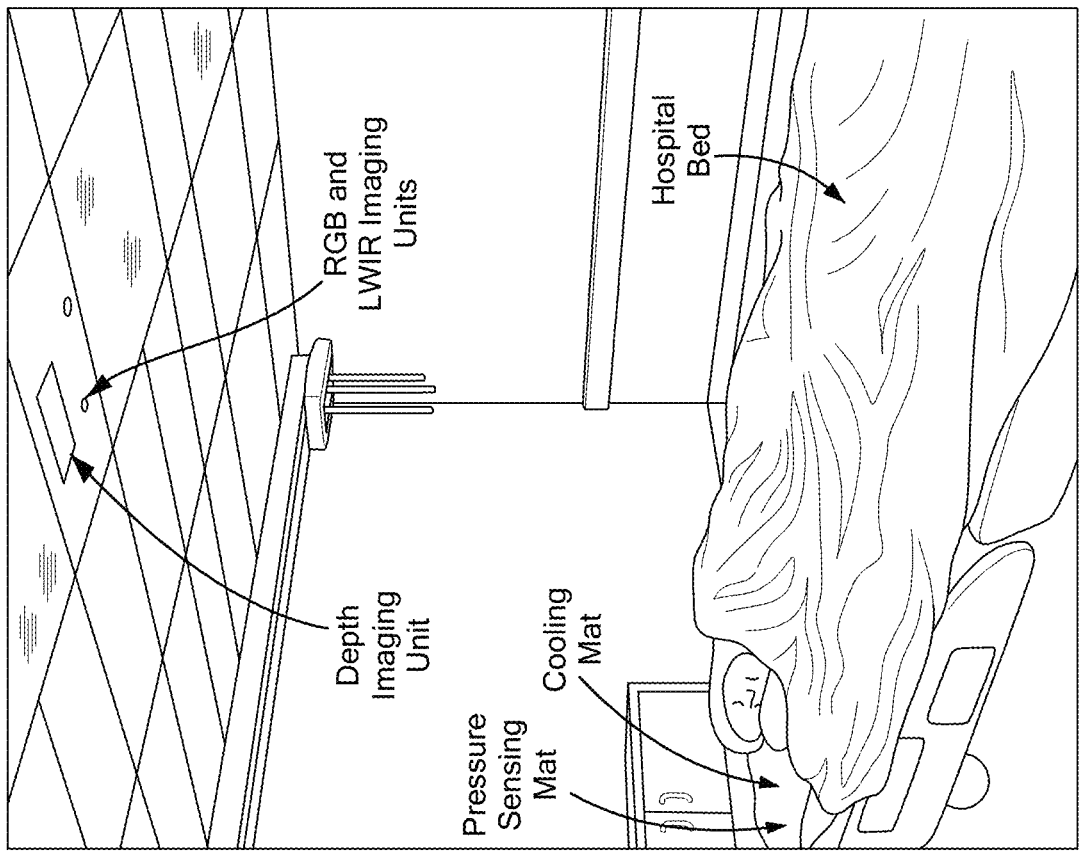
FIGS. 1A and 1B illustrate multimodal in-bed pose data collection setup.

The technology described herein provides methods and systems of providing a dataset of human in-bed poses that includes simultaneously gathered images of in-bed poses of humans from imaging modalities including red-green-blue (RGB) and one or more of long wavelength infrared (LWIR), depth imaging, and pressure mapping. The images can be obtained under a lighting condition and a cover condition. The lighting condition can range from full illumination to full darkness, and the cover condition can include no covering, a first cover, and a second cover, the second cover being thicker than the first cover. The dataset can be used to train a model of estimating human in-bed poses and for methods of estimating human in-bed poses.

The technology also provides methods and systems of estimating three-dimensional human poses from two-dimensional input images. The methods and systems use a trained model for estimating human poses trained with a dataset comprising a plurality of three-dimensional images from a source domain and a plurality of target domain images.

I. High Resolution Full-Body In-Bed Pose Estimation Using Multimodal Sensing

The technology described herein provides embodiments of a simultaneously-collected multimodal lying pose (SLP) dataset to address the in-bed human pose estimation problem under vision-adverse environments such as under a full covering (e.g., a sheet or blanket) and darkness (e.g., no artificial illumination in a room). The effectiveness of the dataset has been illustrated in tests with robust performance across multiple state-of-the-art models, across varying cover conditions, and across lab and real hospital contexts. The tests also illustrate that machine perception can surpass human perception in some contexts and learning between humans and machines can be interactive instead of or in addition to unilateral. The experiments also illustrate that the SLP dataset's value is not limited to its multimodal presentation but its pose distribution itself is also complementary to existing public datasets. The SLP dataset can be used with 2D human pose estimation, 3D human pose estimation, and as LWIR-D-PM (long wavelength infrared, depth, pressure mapping) visualization for monitoring purposes. The SLP dataset can provide various possible solutions for in-bed human poses based on different modalities. It can provide a low-cost depth/LWIR solution. In cases in which higher accuracy is needed, PM can be added for further performance improvement. Since PM depth has already been extensively used in clinical studies, the SLP dataset can boost their performance without further investment.

I.1. Simultaneously-Collected Multimodal Lying Pose (SLP) Dataset

In one aspect, the technology described herein addresses the challenges surrounding the development of robust in-bed pose estimation algorithms by providing a large-scale in-bed human pose dataset (sometimes termed "Simultaneously-collected multimodal Lying Pose" or "SLP"). The SLP dataset includes several imaging modalities used in relevant mainstream in-bed pose estimation works. Described herein are the SLP forming process and underlying principles, its statistics, demonstration applications, and performance evaluation of state-of-the-art human pose algorithms when trained and tested on SLP. The SLP data collection paradigm is described, which can be helpful for studies in potential applications when multimodal data with correspondence is needed. The SLP dataset can be used in a variety of applications, including by the computer vision community and the healthcare community.

The SLP dataset provides a large-scale (in some embodiments, >100 subjects with nearly 15,000 pose images), human in-bed (i.e., at-rest) dataset, with multiple sensing modalities collected simultaneously including RGB, long wavelength infrared (LWIR), depth (D), and pressure mapping (PM) devices. The SLP technology can address the difficulties for ground truth generation due to the lack of proper illumination and heavy occlusion by providing practical guidelines based on a physical hyperparameter tuning (PHPT) approach, in which hyperparameters can be optimized to control the learning process. The large scale SLP dataset can include accurate and extensive annotation of both covered and uncovered in-bed human subjects via a physical hyperparameter tuning method.

The SLP technology can provide a LWIR-D-PM visualization specific for in-bed human monitoring by employing multiple modalities, thereby improving caregivers' ability to understand the physical state of a human body during monitoring.

The SLP dataset can be formed in a compatible way with other human pose datasets. The SLP dataset can serve as a benchmark for in-bed human behavior studies based on different approaches and modalities. With this dataset, many existing machine learning models and human pose estimation algorithms can be trained effectively for in-bed human pose estimation purposes, and the performance of the algorithms can be reported in commonly used pose estimation metrics.

In some embodiments, the technology can include any suitable computer system or device, including one or more processors and memory, having a trained model for estimating human in-bed poses trained with the SLP dataset. The dataset includes a plurality of human in-bed poses comprising sets of images generated simultaneously from at least two imaging modalities, the modalities including a red-green-blue (RGB) imaging modality, and one or more of a long wavelength infrared (LWIR) imaging modality, a depth imaging modality, and a pressure map imaging modality. In some embodiments, the images are generated simultaneously from all the imaging modalities. The technology can be used for monitoring a human in-bed pose using one or more imaging devices to receive one or more images of a human lying in the bed. The processor is in communication with the imaging devices and is operative to determine a pose of the human lying in the bed via the trained model.

Figure 1A:
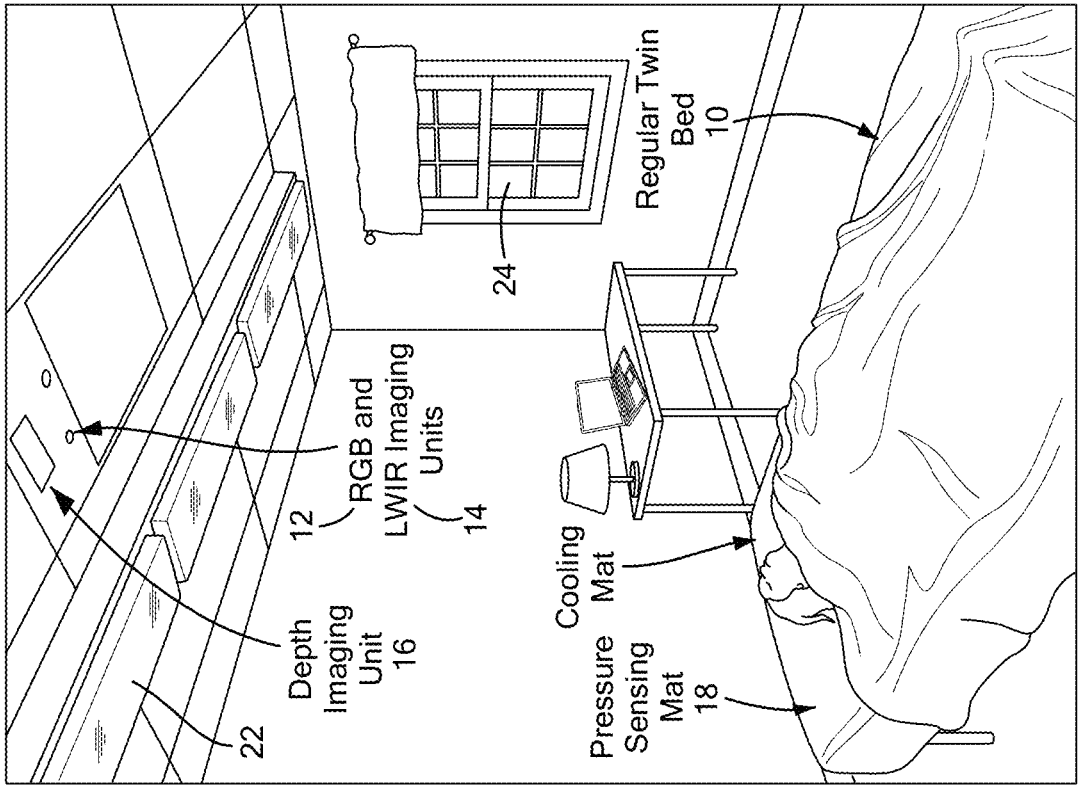

Referring to FIG. 1A, the dataset can be obtained and used with a setup within a room with a bed 10 and one or more of the imaging modalities. The imaging modalities in the room can include an RGB camera 12, a LWIR camera 14, and a depth imaging unit 16, each of which can be mounted to the ceiling with a viewpoint directed perpendicularly to the bed area. A pressure mapping system 18 can be installed on the bed. The room can include one or more sources of artificial illumination 22, such as overhead lighting and table lighting. In some cases, the room can include one or more windows 14 that can allow outside illumination to enter the room; the window(s) can be covered with shades or blinds or other coverings to alter the amount of outside illumination that can enter the room. In some embodiments, particularly for data collection for obtaining a dataset, a cooling mat 26 can be provided on the bed.

In some embodiments, a room setup can be as follows:

For RGB, any suitable RGB camera can be mounted to a ceiling of the room. The camera viewpoint can be directed perpendicularly to the bed area. The distance of the camera above the bed can be selected such that the bed area is within the field of vision of the camera.

For LWIR, a suitable LWIR camera can be mounted to a ceiling of the room. The camera viewpoint can be directed perpendicularly to the bed area. The distance of the camera above the bed can be selected such that the bed area is within the field of vision of the camera. One suitable camera is a FLIR Lepton 3.5 camera with pure thermal2 available from Teledyne FLIR. The camera is connected to a workstation in any suitable manner, such as with a USB cable or wirelessly. A human subject lying in the bed can arbitrarily change poses.

For depth, a depth sensor can be mounted to a ceiling of the room. The sensor viewpoint can be directed perpendicularly to the bed area. The distance of the sensor above the bed can be selected such that the bed area is within the field of vision of the sensor. One suitable depth sensor is a Microsoft Kinect version 2 camera. The depth sensor can be connected to a workstation in any suitable manner, such as with a USB cable or wirelessly. A suitable driver for the depth sensor or the Kinect camera can be installed in the workstation. A human subject lying in the bed can arbitrarily change poses.

For pressure mapping, a full body pressure map system can be installed on the bed. A suitable pressure mapping system is Tekscan 5315 available from Tekscan, Inc. The pressure mapping system can be connected to a workstation using a corresponding driver installed in the workstation and with a USB cable or wirelessly.

The computer system can run the software with instructions to periodically capture LWIR/depth images and display a skeleton pose figure to the user. The detailed pose descriptor can be saved to a text file with time stamp. A pre-recorded pressure map can be imported into the software pipeline to generate pose skeleton image wise.

For data collection to generate a SLP dataset of a plurality of in-bed human poses, a plurality of images can be simultaneously gathered of in-bed poses of a human subject lying in the bed under a variety of lighting conditions and cover conditions from at least two imaging modalities. The imaging modalities include a red-green-blue (RGB) imaging modality, and at least one of a long wavelength infrared (LWIR) imaging modality, a depth imaging modality, and a pressure map imaging modality. Each of the images comprises an in-bed pose and an appearance of the human subject. The appearance comprises the human subject in a lighting condition and a cover condition. In some embodiments, the lighting condition can range from full illumination to full darkness. In some embodiments, the lighting condition can include full illumination, which can comprise a room having the artificial illumination therein turned on. In some embodiments, the lighting condition can include full darkness, which can comprise a room having the artificial illumination therein turned off. In some embodiments, the cover condition can be selected from the group consisting of no covering, a first cover, and a second cover, the second cover being thicker than the first cover. In some embodiments, the first cover can be a sheet and the second cover can be a blanket.

For systems and methods of estimating a human in-bed lying pose using a SLP dataset, a room setup can be substantially similar. In some embodiments, the imaging modalities can include a red-green-blue (RGB) imaging modality, and at least one of a long wavelength infrared (LWIR) imaging modality, a depth imaging modality, and a pressure map imaging modality. Images can be obtained while the human lying in the bed is in a lighting condition that can range from full illumination to full darkness. In some embodiments, the lighting condition can include full illumination, which can comprise a room having the artificial illumination therein turned on. In some embodiments, the lighting condition can include full darkness, which can comprise a room having the artificial illumination therein turned off. In some embodiments, the cover condition can be selected from the group consisting of no covering, a first cover, and a second cover, the second cover being thicker than the first cover. In some embodiments, the first cover can be a sheet and the second cover can be a blanket.

The dataset can be used with a variety of machine learning or artificial intelligence (AI) systems, algorithms and techniques, such as, without limitation, convolution pose machines and deep neural networks.

I.2. Human Pose Estimation

More particularly, the present technology can provide an in-bed pose dataset, called SLP that includes simultaneously-collected imaging modalities employed by the state-of-the-art studies for in-bed human pose estimation. The SLP dataset provides accurately labelled ground truth poses for each image even when it is taken under adverse vision conditions such as full darkness and/or complete occlusion. The SLP dataset provides a magnitude of samples equivalent to known general purpose human pose datasets such as the Leeds Sports Pose (LSP) dataset with 12K human image samples, the Max Planck Institute for Informatics (MPH) Human Pose dataset with 25K samples, and the Look Into Person (LIP) dataset with 50K samples. Using SLP makes training of in-bed pose estimation models with deep neural network architecture from scratch possible. With public availability and versatile modalities, the SLP dataset can also be employed as a public benchmark for relevant studies. The multimodal nature of the SLP dataset also allows cross-domain collaboration and inference possible to overcome the issues specific to a single modality.

The technology also can provide raw materials to the computer vision community under adverse vision conditions with multimodal correspondence, and to the healthcare community who may seek a functional tool for in-bed human pose monitoring and actually face similar challenges in practice. Therefore, besides evaluating the effectiveness of the dataset in training 2D and 3D human pose estimation models, technical aspects of the SLP dataset forming process are described in details, in case similar problems need to be solved from scratch in practice. Models trained on SLP can be used as a tool directly for in-bed human pose monitoring purposes.

I.3. Simultaneously-Collected Multimodal Lying Pose (SLP) Dataset

To facilitate achieving a robust in-bed pose monitoring system, high numbers of human subjects in various in-bed poses under conditions such as darkness and full coverage can be incorporated in the SLP dataset. The SLP dataset has a number of characteristics, including the following:

(i) Modality coverage: Imaging modalities covered in the SLP dataset include: RGB camera (camera equipped with red, green, and blue sensors to obtain images in color), LWIR sensor (sensor equipped with long wavelength infrared (8 to 15 μm) sensor), depth (D) sensor, and pressure mapping (PM) system.

(ii) Posture coverage: Participants can be asked to lie in natural poses evenly among supine, and left/right lying poses. In the example described further below, 102 subjects (+7 for hospital room setting) with 135 poses with 3 cover conditions were collected from 4 modalities simultaneously.

(iii) Different cover cases: Uncovered, thin sheet (1 mm), and thick blanket (3 mm) cases.

(iv) Scenario coverage: The most common application scenarios are located in a home bedroom or in a hospital room. In the example described below, besides the main dataset, which was collected under a home setting, a specific test set was collected for a hospital room to test candidate methods' true performance in the field.

(v) Physical measurements: Pressure is the result of the interaction of a body's physical properties and a mattress, including its weights and geometries. To facilitate investigation especially when pressure sensing is involved, additional physical measures including participants' weight, height, gender, and tailor measurements of all of their limbs can also be collected, as in the example described below.

(vi) A systematic multimodal ground truth generation: A physical hyperparameter tuning (PHPT) approach and its underlying argument can also be employed.

I.3.1 SLP Ground Truth Generation Guidelines

Aiming at vision-based pose inference under adverse vision conditions (e.g. darkness, occlusion), the inference process is not only challenging for machines but also for humans, which makes the ground truth generation difficult. To tackle this challenge, the technology uses a recast physical hyperparameter tuning (PHPT) concept and provides ground truth generation guidelines to employ the PHPT concept in practice.

A pose labeling process can be defined as a function L that maps the image $I_{mod}$ in a given modality mod∈{RGB, LWIR, D, PM} back to the target pose state $\beta_t$, such that:

$$\hat{\beta}_t = L(I_{mod}(\alpha_t, \beta_t, \alpha_c, \beta_c)), \quad (1)$$

where $\hat{\beta}_t$ is the estimated target pose, $\alpha_t$ and $\beta_t$ stand for the target appearance and pose and $\alpha_c$ and $\beta_c$ stand for the context appearance and pose, respectively. The appearance includes how each of the humans looks in a lighting condition and a cover condition. The lighting condition can range from full illumination to full darkness. The cover condition can be selected from the group consisting of no covering, a first cover, and a second cover, the second cover being thicker than the first cover.

Pose estimation error E depends on not only the pose terms but also the appearance terms. As all these parameters (i.e., $\{\alpha_t, \alpha_c, \beta_c,\}$) can be decoupled from $\beta_t$, they can be deemed as the hyperparameters of the function L. Therefore, the pose estimation problem can be formulated as an optimization problem:

$$\hat{\beta}_t = \underset{\hat{\beta}_t}{\mathrm{argmin}}\ E(\hat{\beta}_t, \beta_t; \alpha_t, \alpha_c, \beta_c, I_{mod}). \quad (2)$$

The estimated target pose, $\hat{\beta}_t$ is conditioned on other terms including $\alpha_t, \alpha_c, \beta_c, I_{mod}$ during the inference process. For example, human perception can achieve a more accurate $\hat{\beta}_t$ in well-illuminated RGB domain ($I_{RGB}$) with no occlusion ($\beta_c, \alpha_c$: no cover context), which means all these terms can be tuned to improve the inference. Unlike commonly referred hyperparameters in mathematical modeling, these variables are directly related to the physical properties of the object, so they are called physical hyperparameters. Due to the physical constraints, they cannot be changed freely like other hyperparameters, yet it can be shown that in this application, physical hyperparameters can also be altered effectively to optimize target L performance with prior knowledge. RGB to LWIR modality mapping is employed as an exemplar to demonstrate the PHPT guidelines for ground truth generation. As mappings between modalities are similar, these guidelines are generalizable to all other modality pairs.

Guideline I: Labeling with Variable Cover States. Physical hyperparameters $\beta_t$, $\alpha_c$, $\beta_c$ cannot be optimized mathematically to their optimal values due to their physical constraints. For example, the subject's appearance cannot be changed without affecting $\beta_t$. However, altering $\alpha_c$ and $\beta_c$ can be easily achieved without affecting $\beta_t$. So a first guideline for LWIR image labeling in provided:

Guideline I: Perform Labeling Under Settings with the Same $\beta_t$ but No Cover to Yield Best Pose Labeling Performance.

Figure 2:
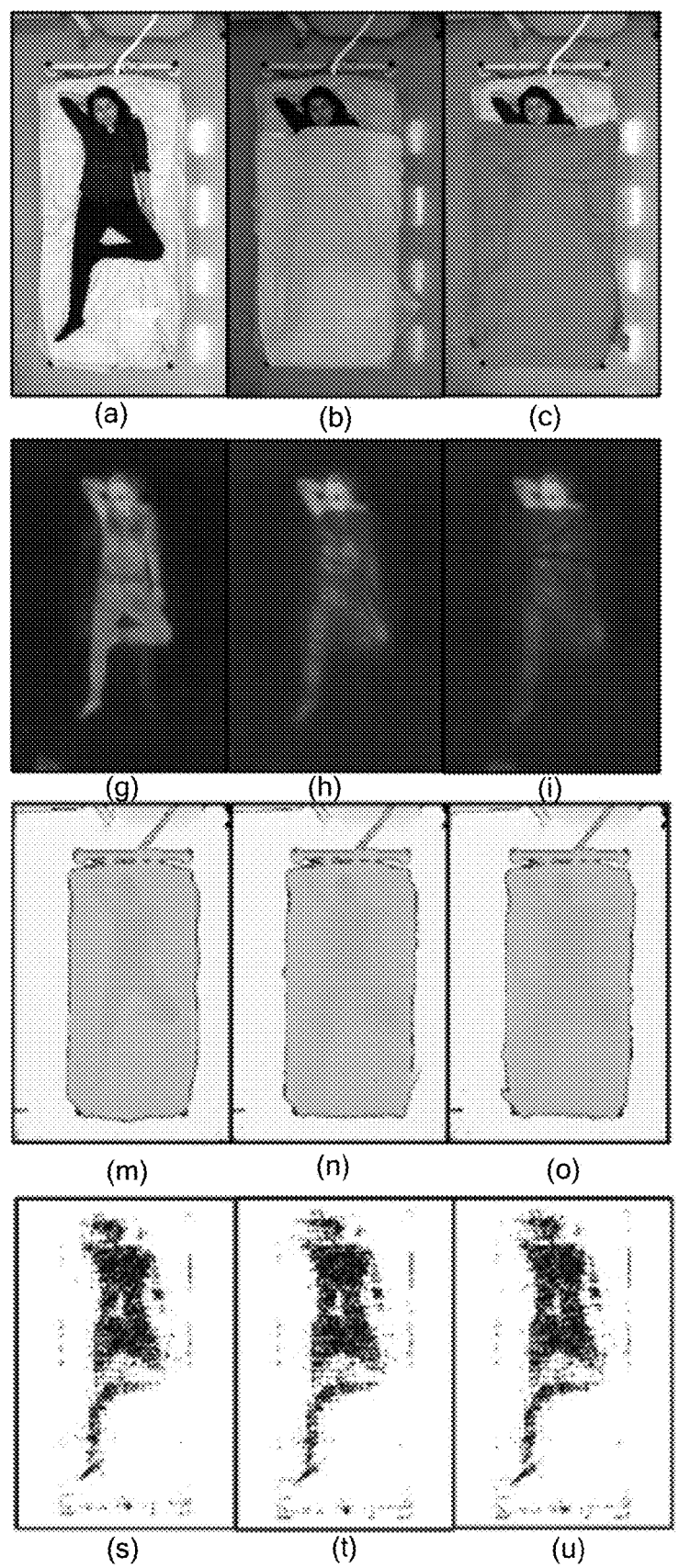
FIG. 2 illustrates SLP image data samples from in-bed supine and side postures: (a-f) show images captured using RGB webcam, (g-l) show images captured using LWIR camera, (m-r) show images captured using a depth camera, and (s-x) show images captured using a pressure mat. These images are taken from subject without cover and with two different types (one thin and one thick) of covers.
Figure 2:
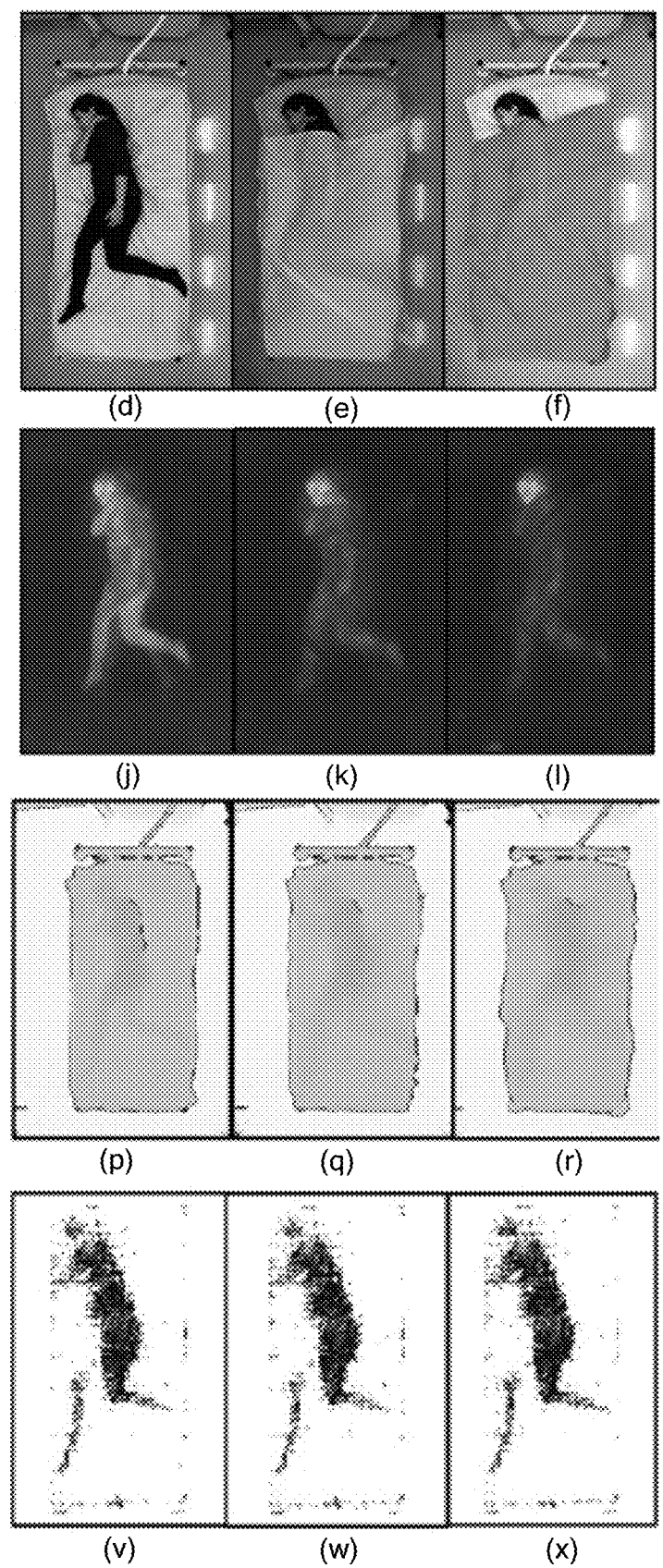

In practice, Guideline I can be employed by collecting data not only from covered individuals in bed but also from the same person without cover for the same exact pose $\beta_t$. In this way, $\alpha_c$ and $\beta_c$ can be actually altered. Some examples from such data collection process are shown in different columns of FIG. 2. In RGB modality, human pose $\beta_t$ under the cover is hard to be annotated as shown in FIG. 2(c), yet the exact $\beta_t$ can be obtained via FIG. 2(a). In LWIR modality, when pose $\beta_t$ is hard to annotate accurately due to its blurriness, label FIG. 2(g) can be labeled, which is supposed to have identical pose $\beta_t$ as FIG. 2(i).

Guideline II: Cross Domain Referencing. Though imaging via thermal diffusion is promising for under the cover human detection and distinguishing the human from the background, however since body limbs share very similar temperature, they may not be highly distinguishable from each other. Moreover, as a human moves in the bed, the "heat residue" of the previous pose can result in ghost temperature patterns as the heated area needs sometimes to gradually diffuse heat (see FIG. 3A). The heat residue concern for real-life in-bed pose monitoring applications may not be an issue after the pose become stable for a while. However, during SLP data collection, it can lead to labeling difficulties due to its misleading effect on pose annotation. Unlike real-life sleeping scenarios, participants cannot be expected to stay in a given pose for more than a few minutes, otherwise the data collection duration would have been excessively long. Therefore, this problem can be addressed by accelerating the heat diffusion progress via a commercial cooling mat (see FIGS. 1A and 1B). Nevertheless, complete elimination of the heat residue in a short time period cannot be achieved in practice. Another ambiguity in limb localization is when limbs are cuddled together and visual cues in LWIR become misleading. For example, in FIG. 3B, from the LWIR modality, it is plausible to assume that the left arm is at rest on the torso; however it is actually under the head, from the RGB reference.

Figure 3B:
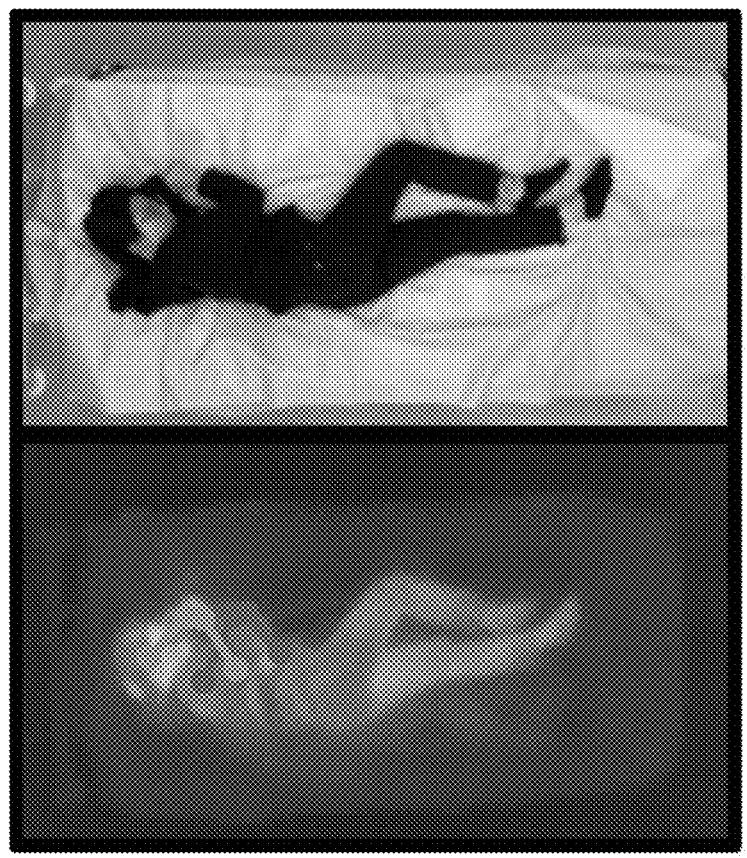
FIGS. 3A and 3B illustrate pose ambiguities in LWIR images with their corresponding RGB images.
Figure 3A:
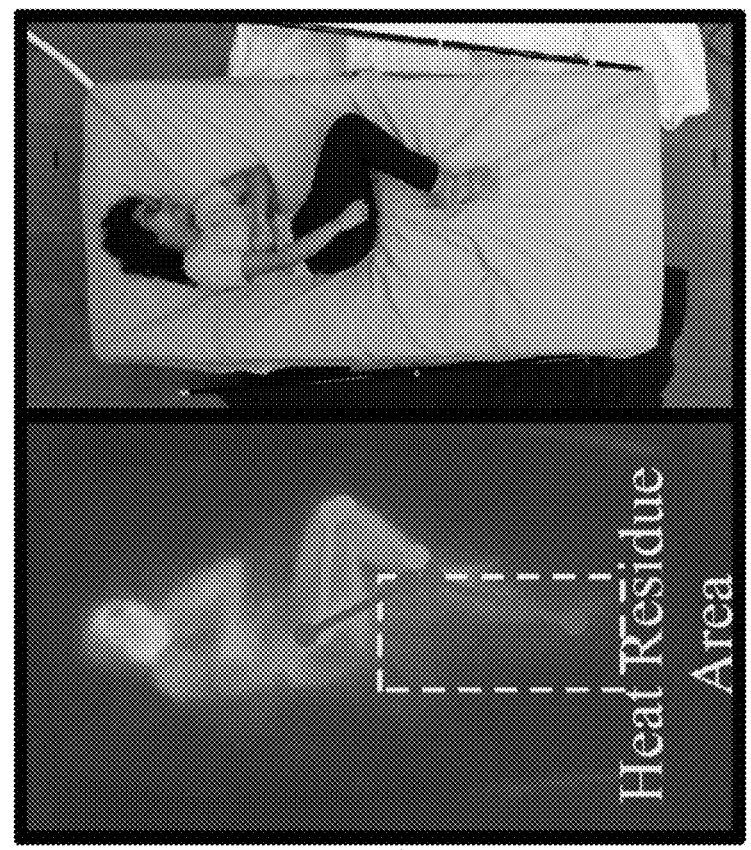

These conditions do not necessarily lead to a fully intractable pose localization problem since there still exist cues in the LWIR image such as the heat residue having slightly less temperature value compared to the true body location (see FIG. 3A), or the arm will still show a (although weak) profile beside the head (see FIG. 3B). Nevertheless, these subtle cues in an LWIR image may be missed by the human annotators, which does not happen if they are given the RGB image counterpart (see RGB images in FIGS. 3A and 3B). Thus, the function $I_{mod}$ can be altered to improve labeling by providing a second guideline:

Guideline II: Employ $I_{RGB}$ Counterpart as a Heuristic Guide to Prune Out False Poses in $I_{LWIR}$.

Guideline III: Cross Domain Labeling with Bounded Error. Although Guidelines I and II can be employed for most cases to achieve highly accurate ground truth labels, cases exist in which a limb is nearly intractable when it is fully overlapped with another body part (e.g., a crossed arm over torso). While in RGB images the difference between the color and/or texture of different body parts can be used as differentiating cues, in LWIR images uneven temperature distribution when two limbs cross each other makes the detection of the limbs' boundaries difficult. It also happens when clothes have complex wrinkle textures that may mislead the annotators as false boundaries. This can also happen when two limbs share similar heights in depth modalities.

Thus, using the RGB image counterpart, Guideline II can be expanded to include the projection of the $I_{RGB}$'s labels into the $I_{LWIR}$'s labels. When two images share the same planar surface, plane to plane mapping is feasible through homography. However, mapping between two $I_{RGB}$ and $I_{LWIR}$ images taken from a human subject in a given pose can usually result in a ghosting effect in homography mapping, which is also well-known in panoramic image creation. Since a human's top surface while lying in a bed is not a flat plane, when approximated by a plane parallel to the bed, mapping coordinate bias occurs. However, such error can be considered bounded in these settings.

Suppose multiple domain cameras are mounted on the same plane. After homography calibration, one point's coordinates on reference plane can be exactly mapped from one domain to another. Referring to FIG. 4, let P be a point on the reference plane, which has an exact mapping from the RGB domain to the LWIR domain. If one elevates P by h to a higher position P', a ghosting bias occurs, in which the mapped point does not coincide with the corresponding point in another camera. If one looks at P' from the RGB camera, its image point in the $I_{RGB}$ image is equivalent to its projection $P_{RGB}$, the intersection point of the green solid line and the reference plane. Homography mapping in this case is actually mapping P' projection $P_{RGB}$ to another domain (LWIR). However, from the LWIR perspective, the true projection of P' is actually $P_{LWIR}$ instead of $P_{RGB}$, and here the bias occurs.

Suppose the distance from the camera mounting plane to the reference plane is H; P' is biased from the reference plane with z=h; the distance between two cameras is d; and the bias between the two projection points in different domain is b. From the geometry shown in FIG. 4, $$b = d \times \frac{h}{H - h'}$$

where d is a preset value fora specific mounting configuration; however H and h are both variables in real applications. H can be determined by the bed height and also the room ceiling height. h depends on the limb length and how much it sticks out of the bed plane. So the bias b can hardly be determined a priori in practice; however H and h should be bounded due to the practical and physical constraints, in which $h \in [h_{low}, h_{high}]$, and $H \in [H_{low}, H_{high}]$. Namely, a hospital or residence room usually has H about 8-10 feet and a human at rest in-bed cannot stick a limb out away from the bed plane more than 3-4 feet when lying. When h=0, then b=0, which reduces to the case of exact homography mapping when the point is located on the reference plane. When d=0, it reduces to the case of pure rotation, in which the bias can also be eliminated. In the worst case, a point is biased far away from the reference plane with $h=h_{high}$ and a short ceiling height $H=H_{low}$. So, the bias between mapping of a point from $I_{RGB}$ to $I_{LWIR}$ images is bounded as:

$$b \in \left[0, \frac{d \cdot h_{high}}{H_{low} - h_{high}}\right] \quad (3)$$

Using this bounded mapping error, a third guideline for labeling is provided:

Guideline III: When Finding Exact Joint Locations are Intractable in One Domain, Employ Labels from Another Domain with Bounded Bias Via Homography Mapping.

This is even more necessary for pressure map (PM) data as pose data in PM are highly ambiguous for human annotators. Most existing PM based pose estimation work can only estimate a rough posture or limited numbers of limbs as PM is inherently hard to label. A demonstration of PM ground truth of supine and side (right) lying pose via PHPT is shown in FIGS. 5A and 5B. In the supine pose example, though an annotator can provide a plausible pose by linking pressure concentrated area (red dash line), yet it can be seen that the support area is not always the joint location. In FIG. 5A, heel resulted pressure is not necessarily aligned with the limb axis due to the unknown roll motion of the leg. For a side lying pose in FIG. 5B, it is even worse as the pose can hardly be estimated of the right leg or arms crossed over the chest when they lose contact with the bed surface. However, with the PHPT (guideline III), correct poses can be achieved in all cases. Furthermore, compared to the other pose estimation studies using PM, joint based pose descriptor provides higher granularity and is compatible to many state-of-the-art models of pose estimation. In short, the PHPT approach provides a way to generate more accurate ground truth pose labels even when the labels are inaccessible in a given modality.

I.3.2 Cross Modality Alignment

Conventionally, a camera model can be calibrated with a checkerboard by estimating its intrinsic and extrinsic parameters. Between well-calibrated camera systems, one point in one system can be accurately mapped into another given that the depth data is known. However, this approach cannot be used in the SLP dataset for cross modality mapping since: (1) except for the depth modality, the Z coordinate is not known in other SLP imaging modalities; (2) a checkerboard will not provide thermal correspondence; and (3) a pressure map does not have a pin hole model unlike other camera-based imaging systems. Instead, since all SLP modalities are in the form of 2D arrays, homography is employed for cross modality mapping with respect to a plane parallel to the bed surface, where shared markers were used across modalities.

As the SLP imaging process comes from different modality functions, $I_{mod} \in \{I_{RGB}, I_{LWIR}, I_D, I_{PM}\}$, each modality only corresponds to specific physical properties, including visible light reflection in RGB, temperature in LWIR intensity, distance in D, and pressure in PM. For example, $I_{PM}$ only depends on the contact pressure quantities no matter what RGB, LWIR and D are. So, a joint variation is needed among all relevant properties. Suppose a background image with the modality state as $[s_{RGB}^0, s_{LWIR}^0, s_D^0, s_{PM}^0]$, where $s_{RGB}^0$ is the bed surface appearance, $s_{LWIR}^0$ is assumed to be the room temperature, $s_D^0$ is the distance from the bed surface to depth camera, and $s_{PM}^0$ can be deemed as zero since no pressure is applied when the bed is not occupied.

All modalities are designed to alter jointly via a series of visually-detectable markers to have a new state as $[s_{RGB}^0 + s_{RGB}^\Delta, s_{LWIR}^0 + s_{LWIR}^\Delta, s_D^0 + s_D^\Delta, s_{PM}^0 + s_{PM}^\Delta]$, by elevating the temperature (LWIR), height (D) and pressure (PM) and altering the RGB appearance by blocking the background. $s_{RGB}^\Delta$, $s_{LWIR}^\Delta$, $s_D^\Delta$, and $s_{PM}^\Delta$ stand for the "appearance" shift in different imaging modalities causes by these shared markers.

Figure 6B:
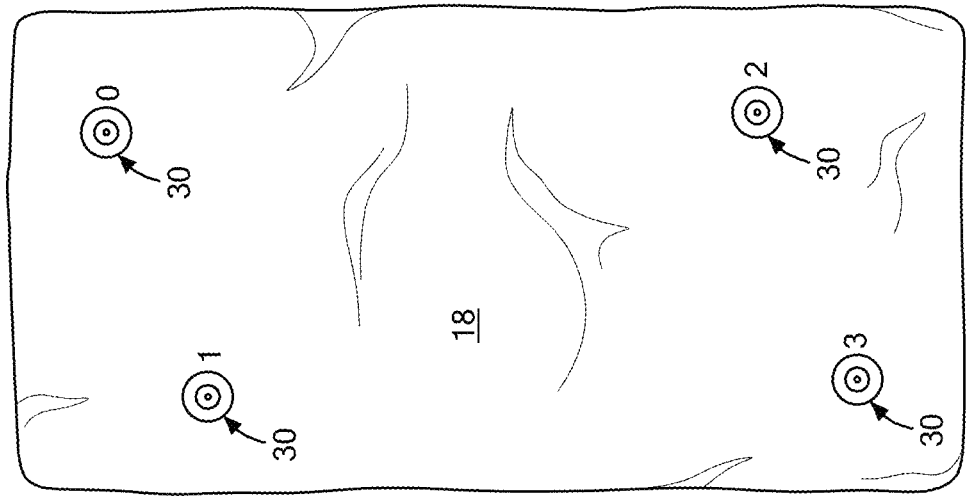
FIG. 6A-6C illustrate SLP cross domain alignment design.
Figure 6A:
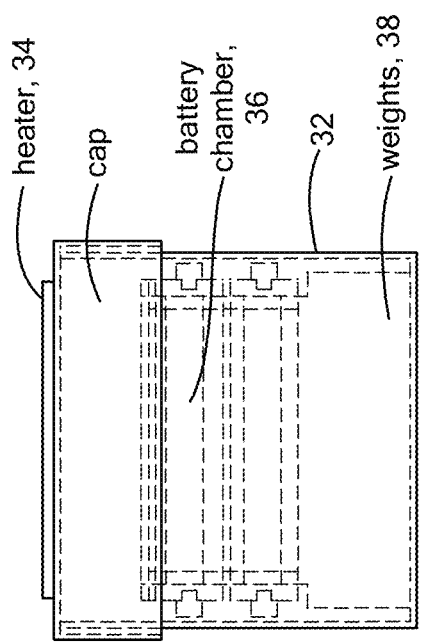
Figure 6C:
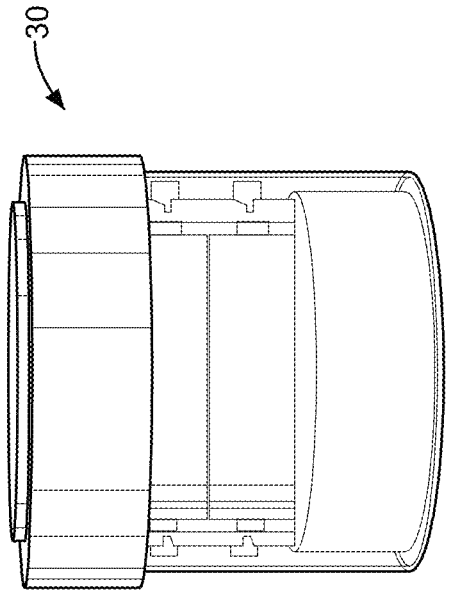

Based on this idea, alignment markers 30 are provided as shown in FIGS. 6A-6C. Each alignment marker includes a cylinder jar 32 that can easily be recognized by the RGB modality. A thermal plate 34 is attached on top of the jar powered by the batteries in the chamber 36 to alter the LWIR profile. Added weights 38 inside the jar result in increased pressure profile. The jar height is around 10 cm, which also alters the distance in the depth modality. Due to the possible displacement of the pressure sensing mattress 18 during the experiment, the alignment homography is recalculated before each session. To facilitate this process and reduce the experimenter's workload, an automatic center extraction algorithm is provided by getting the geometric center of each marker's contour. An extraction example in RGB domain is shown in FIG. 6B. A manual labeling code is also provided as a complementary tool when the algorithm fails to extract the correct centers. The experimenter can judge whether to use manual tool or not according to the automatic extraction results.

I.4 Further Aspects of the SLP Dataset Technology

The technology can improve safety by needing minimal interventions to the bed or the human user. Other imaging modalities, such as red-green-blue (RGB) or depth, are unable to monitor poses when the human is covered with a sheet or blanket or when the room is dark, including full darkness or no artificial illumination. In contrast to a few existing methods that can monitor a human in bed under a cover or in full darkness, the contactless approach of the technology herein provides greater safety and preservation of natural settings, for example, compared to pressure mapping methods used for in-bed pose detection.

The technology can be used for a variety of applications, such as sleeping behavior studies, patient activity monitoring in hospital, and pressure ulcer studies for early detection and prevention. The technology can be used for any healthcare research that requires in-bed human pose information over time.

The SLP dataset can have wider applications. For computer vision (CV) or machine learning (ML) studies, the SLP dataset can present an exemplar recognition/regress problem under the normal vision (RGB) adversarial environment. The SLP dataset can be a starting point and or can be used to study similar problems when RGB is no longer effective. The multimodal nature with correspondence between modalities enables the dataset to be used with domain adaptation or domain transfer related work. For medical care, models pretrained on the SLP dataset can provide a toolkit to recognize in-bed patient poses. Reliable human pose estimation can provide a foundation for many higher-level studies, such as patient action recognition or behavior studies.

In contrast to existing pose estimation algorithms that build their models from scratch with limited data and low granularity annotation in the context of in-bed poses, the technology herein can provide extensive and reliable annotation via a physical hyperparameter tuning strategy and can train state-of-the-art human pose estimators directly.

The technology can provide superior accuracy and resolution in human pose estimation at lower cost and size compared to the state-of-the-art systems with similar capabilities. Its compactness and affordability can be useful for large scale applications in related fields.

The technology can be cost effective, for example, in some cases, 1/60th the price (LWIR) or 1/200th the price (depth). The technology can be smaller in size, for example, in some cases, 1/300th the size (LWIR) or 2/3 the size (depth). The technology can have greater higher pose recognition granularity and accuracy.

I.5. System/Dataset Evaluation

To validate the SLP dataset diversity and broadness in terms of in-bed poses, pose inference models were evaluated on a main setting, e.g., a regular bedroom (as shown in FIG. 1A), and re-deployed in a simulated hospital room (as shown in FIG. 1B), where additional data was collected for field testing. The models trained on the main setting were able to transfer the learning into the new setting, establishing the versatility of the SLP technology.

Several state-of-the-art human pose estimation models trained with this dataset showed strong estimation results for human pose inference under a cover, such as a sheet or blanket, and in complete darkness, such as in a room with no or insignificant artificial illumination from overhead lighting and/or no or insignificant outside lighting through windows. The models trained on LWIR and depth modalities in particular showed accuracy as high as 95% with the granularity up to 14 body joints. These sensing modalities cost substantially less than pressure mapping systems. The field test in a hospital room also showed similar pose estimation performance compared to a simulated home environment, illustrating the effectiveness of this technology in practical applications when deployed.

I.5.1 SLP Dataset Statistics

Figure 7B:
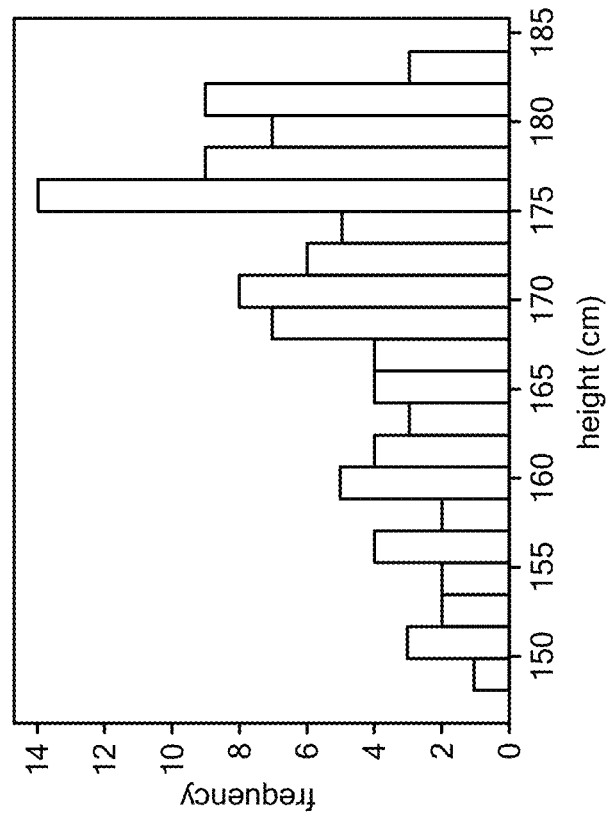
FIGS. 7A-7C illustrate distribution of the measured physical parameters.
Figure 7A:
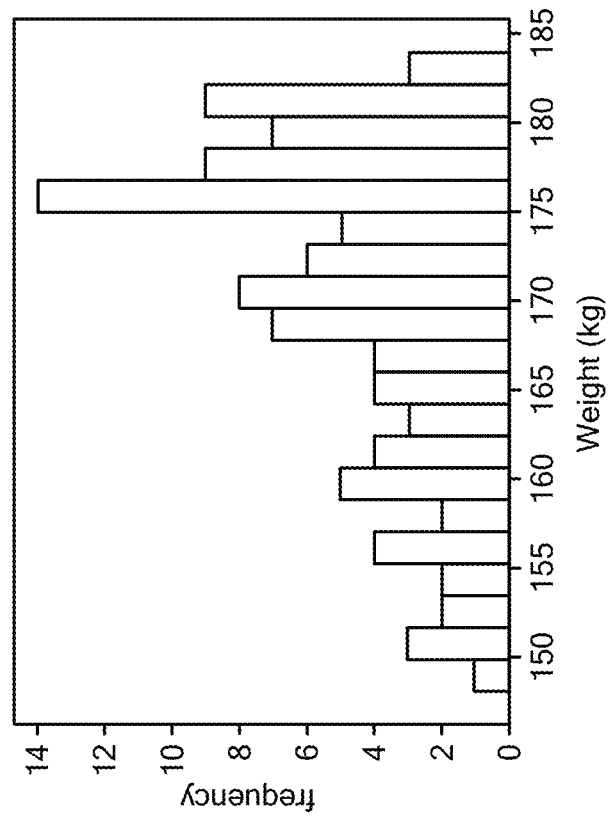
Figure 7C:
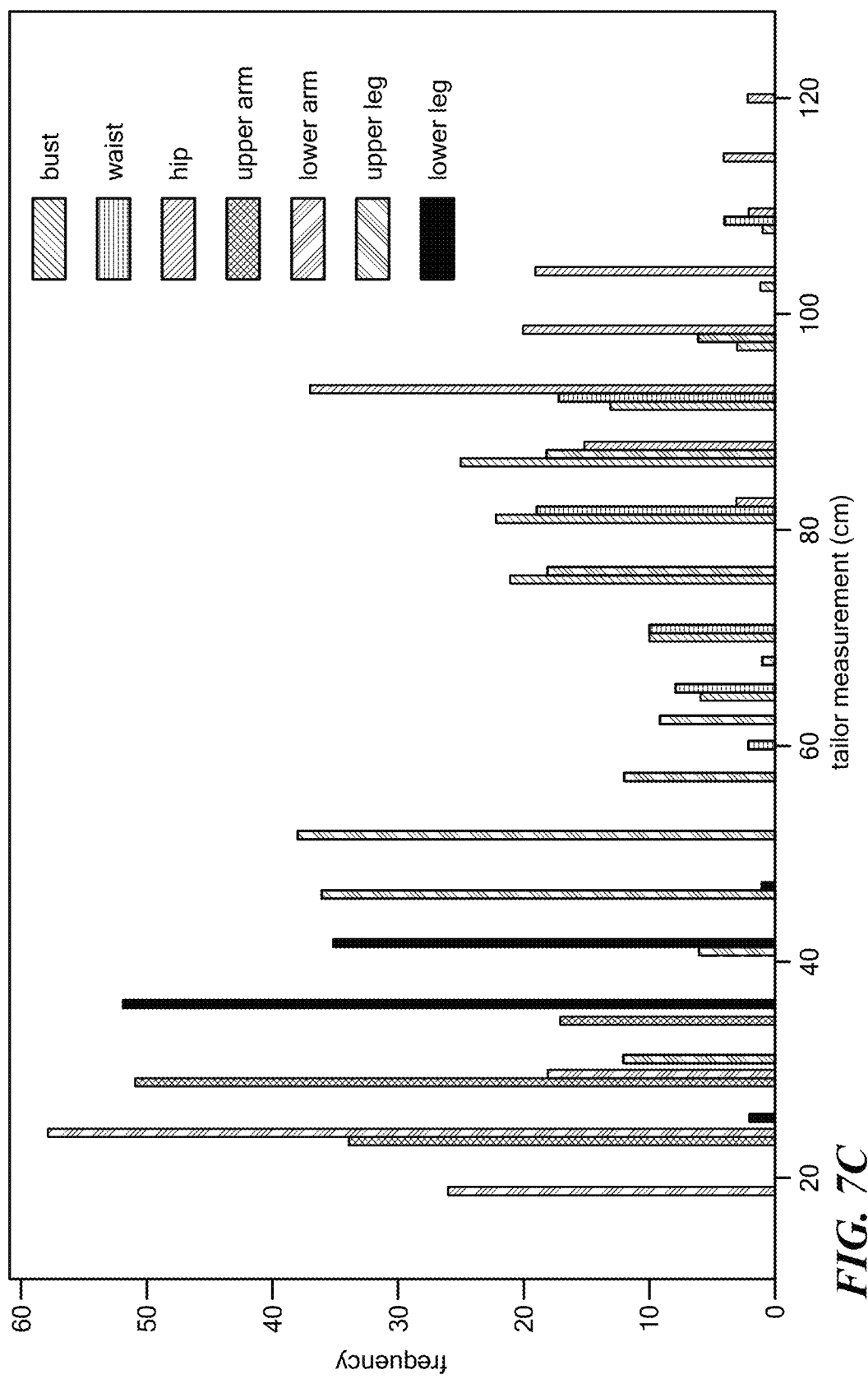

The SLP dataset included two subsets, which were collected under different contexts. The main set was collected under a home setting environment and this part was called the "home setting". A small dataset was also collected under a simulated hospital room setting for field test purposes, which was called "hospital setting". Using an institutional review board (IRB)-approved protocol, pose data was collected from each participant, while lying in a bed and randomly changing their poses under three main categories of supine, left side, and right side. For each category, 15 poses were collected. Overall 13,770 pose samples for the home setting and 945 samples for the hospital setting were collected in each of the 4 imaging modalities. Moreover, the cover condition was changed from uncover to cover one (a thin sheet with approximately 1 mm thickness) and then to cover two (a thick blanket with approximately 3 mm thickness). Additional tailor measurements were also from each participant that are shown in FIGS. 7A-7C.

I.5.2 SLP Data Collection Procedure

At the beginning of each data collection session, the experimenter was required to instruct the process to the participants, provide them with the IRB approved agreement and take their tailor measurements for additional references as shown in Table 1. With a symmetric assumption, only their right side was measured for paired limbs to simplify the process. Realignment was conducted before the main session.

To improve efficiency and reduce mistakes during data collection, the whole process was managed by a central control software which dispatched tasks to both participants and sensor devices for a better human-machine collaboration. As shown in FIG. 8, each task was the combination of a pose and a cover condition, which required a joint operation by sensors and human participants. On one hand, a logical controller transformed tasks into audio guides to the experimenter and participant. At the start of each task, the participant was requested to move to a designated pose and then the experimenter was instructed to alter the cover condition accordingly or relaunch the task in case of false operation. On the other hand, the logical controller sent a trigger command to a synchronized data collection module to drive relevant devices to capture and save data simultaneously to a hard-drive.

TABLE 1

Additional tailor measurements
List of physical parameters weight (kg)
height (cm)
gender [0-1]
bust (cm)
waist (cm)
hip (cm)
upperArm-R (cm)
lowerArm-R (cm)
thigh-R (cm)
shank-R (cm)

I.5.3 Ground Truth Generation Via PHPT

To evaluate the performance of the PHPT guidelines, the collected LWIR pose images were labeled by finding 14 body joints in each, based on three different strategies: (1) LWIR-G1 which employed only Guideline I, (2) LWIR-G3 which employed only Guideline III, and (3) LWIR-G123 which employed all three guidelines. As this was an evaluation of ground truth generation process, there was no higher level standard to refer to; therefore the labeling results of LWIR-G123 was used as the reference and how much other strategies were biased from this one was evaluated using a normalized distance metric (based on the probability of correct keypoints (PCK)) to visualize the error distribution when different labelling strategies were used.

The total differences between the labels from the golden standard (LWIR-G123) and the LWIR-G1 and LWIR-G3 are shown in FIGS. 9A and 9B as the histograms of normalized distance error with fitted Gaussian curve. Compared to the LWIR-G3, LWIR-G1 error shows a lower mean value and a larger variance, which demonstrates using LWIR-G1 yielded a high accuracy for recognizable poses, yet had a larger error for the ambiguous cases. In contrast, LWIR-G3 caused the ghosting errors that persisted throughout the labeling process, but an insignificant bias.

I.5.4 Human Pose Estimation in 2D

With a similar scale and annotation style as in publicly available datasets, SLP is compatible with most of the state-of-the-art human pose estimation models for general purposes, and their performance can be fairly evaluated with well recognized metrics employed in the computer vision (CV) community. To demonstrate this, several state-of-the-art models were trained from scratch on SLP and their performance is reported on PCKh. The models used were:

Sun, CVPR '19 (K. Sun, B. Xiao, D. Liu, and J. Wang, "Deep high-resolution representation learning for human pose estimation," *CVPR*, 2019);

Gkioxari, ECCV '16 (G. Gkioxari, A. Toshev, and N. Jaitly, "Chained predictions using convolutional neural networks," in *European Conference on Computer Vision*. Springer, 2016, pp. 728-743);

Xiao, ECCV '18 (B. Xiao, H. Wu, and Y. Wei, "Simple baselines for human pose estimation and tracking," in *European Conference on Computer Vision (ECCV)*, 2018);

Chu, CVPR '17 (X. Chu, W. Yang, W. Ouyang, C. Ma, A. L. Yuille, and X. Wang, "Multi-context attention for human pose estimation," in *Proceedings of the IEEE Conference on Computer Vision and Pattern Recognition*, 2017, pp. 1831-1840);

Yang, ICCV '17 (W. Yang, S. Li, W. Ouyang, H. Li, and X. Wang, "Learning feature pyramids for human pose estimation," in *Proceedings of the IEEE international conference on computer vision*, 2017, pp. 1281-1290); and Newell, ECCV '16 (A. Newell, K. Yang, and J. Deng, "Stacked hourglass networks for human pose estimation," *European Conference on Computer Vision*, pp. 483-499, 2016).

I.5.4.1 Implementation Details

For each work, one of their typical configurations was chosen in the test. For Sun, CVPR '19, the W32 configuration was chosen with width(C) 32 for the high resolution subnet. For Xiao, ECCV '18, the configuration with restnet50 backbone was chosen. For Chu, CVPR '17, Yang, ICCV '17 and Newell, ECCV '16, the stage number was set as 2. All models were adapted to work with the corresponding SLP modalities or joint modalities by varying the models' input channels. All models were trained from scratch with corresponding modalities in SLP from the training split which was the first 90 subjects. All models were trained on a NVIDIA V100 GPU with 100 epochs, learning rate 1 e-3, Adam optimizer, learning decay rate 0.1 at epoch 70 and 90. Batch size was set to 30 for Chu, CVPR '17 and Yang, ICCV '17, and 60 to fit the GPU memory capacity.

The augmentation included rotation, shifting, scaling, color jittering, as well as synthetic occlusion to simulate the potential objects blocking the view point such as a bed table.

I.5.4.2 Evaluations Under the Home Setting

Figure 10A:
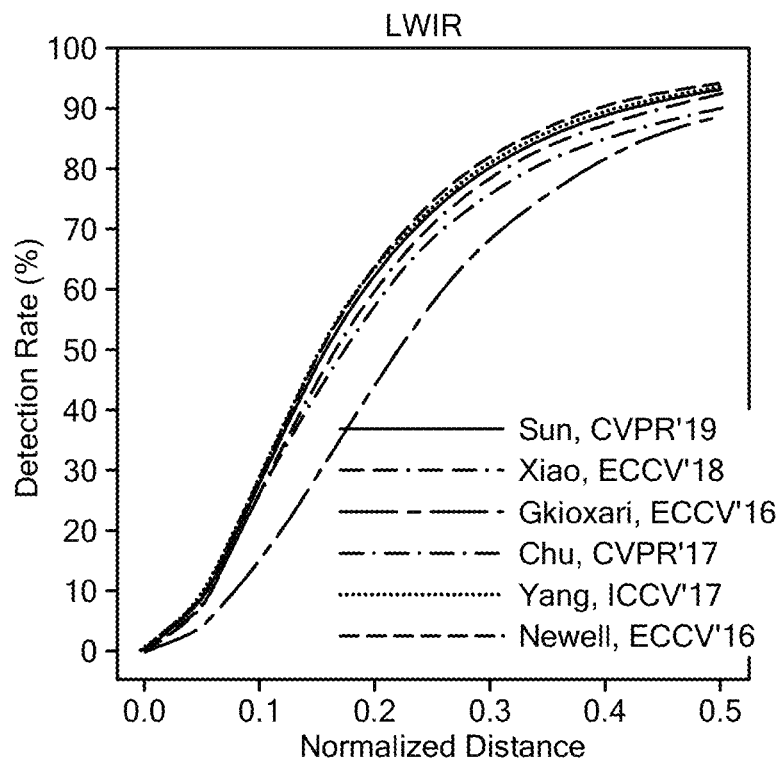
FIGS. 10A-10C illustrate PCKh performance of state-of-the-arts on LWIR (FIG. 10A), depth (FIG. 10B), and PM (FIG. 10C) modalities under home setting.
Figure 10B:
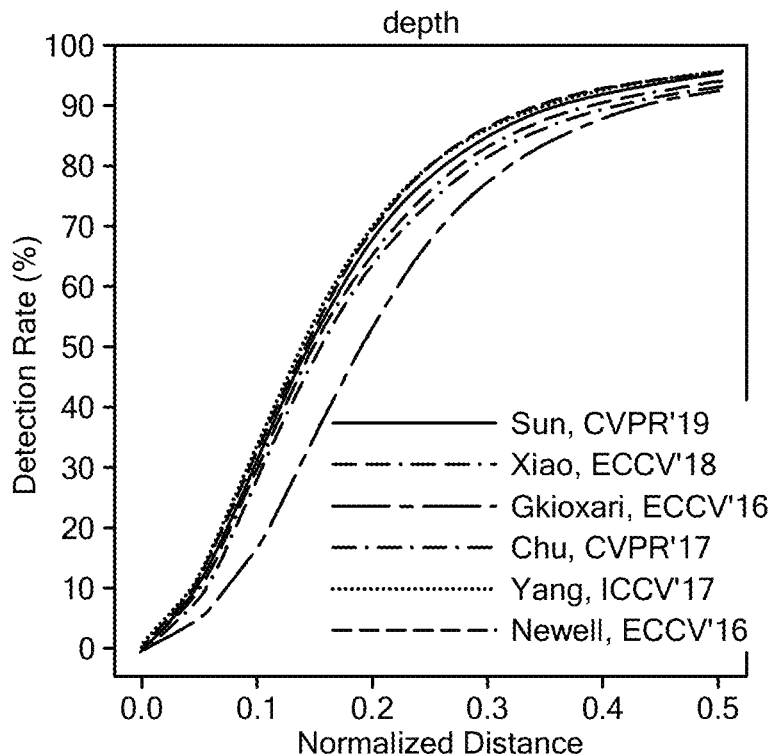
Figure 10C:
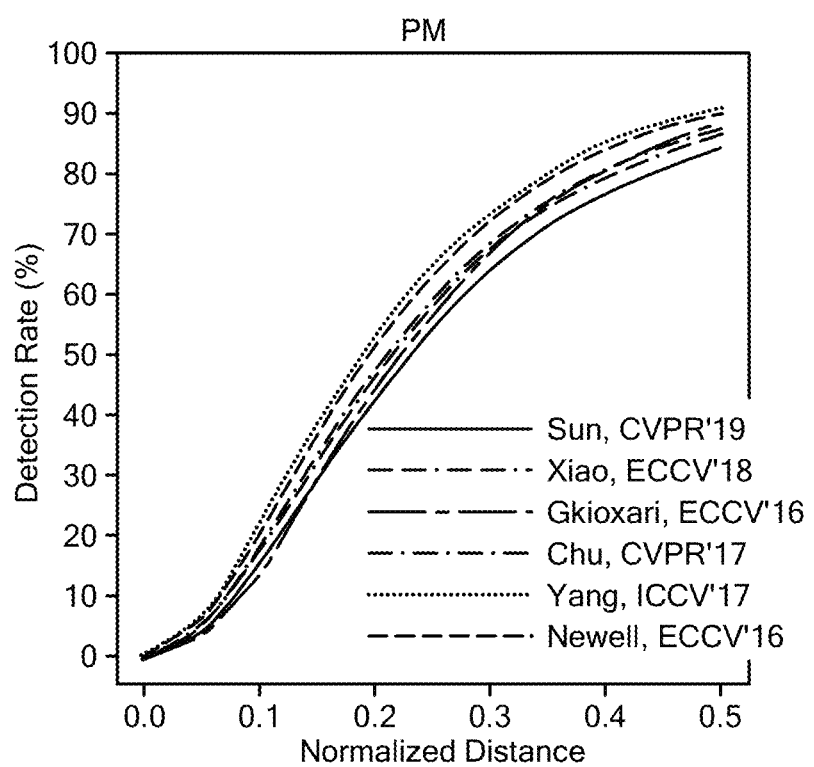
Figure 11:
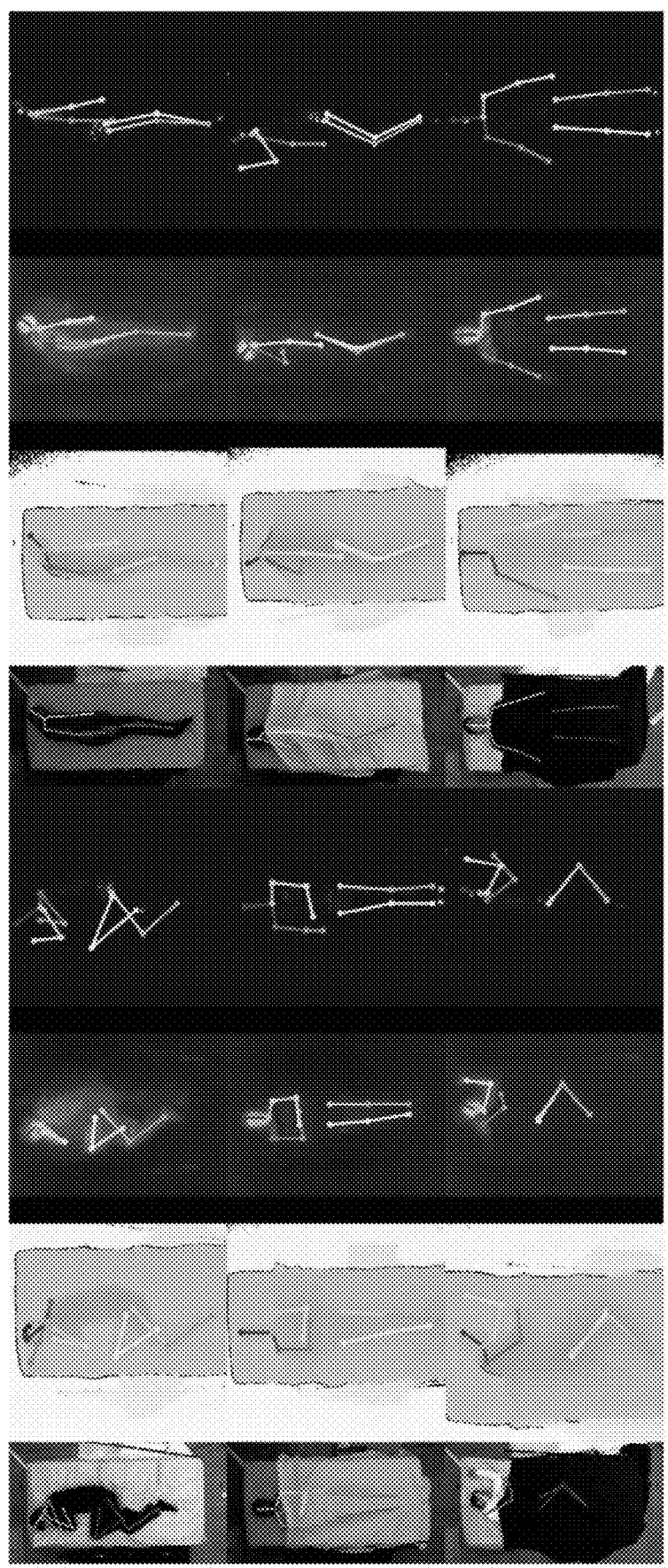
FIG. 11 illustrates qualitative results of 2D human pose inference with leading RGB with ground truth followed by inference result from depth, LWIR and PM.

Performances based on each modalities are reported in FIGS. 10A-10C. Overall, LWIR and depth showed noticeably better performance than PM, which complies with the findings in other PM based studies due to the ambiguity issue when limbs are out of contact. Depth based inference showed more stable performance comparing to LWIR with all 6 methods over 90% at PCKh0.5 against 4 of LWIR counterparts. In the test, Yang ICCV '17 came out to be the best across all modalities with best PCKh0.5 of 94.2%, 90.7%, 96.6% for LWIR, PM, depth respectively and Newell, ICCV '16 came after it with a very similar performance. The qualitative result is shown in FIG. 11 where a leading RGB is given with ground truth for an intuitive view for human observers followed by the inference results from other modalities.

I.5.4.3 Field Test Under the Hospital Setting

Figure 12:
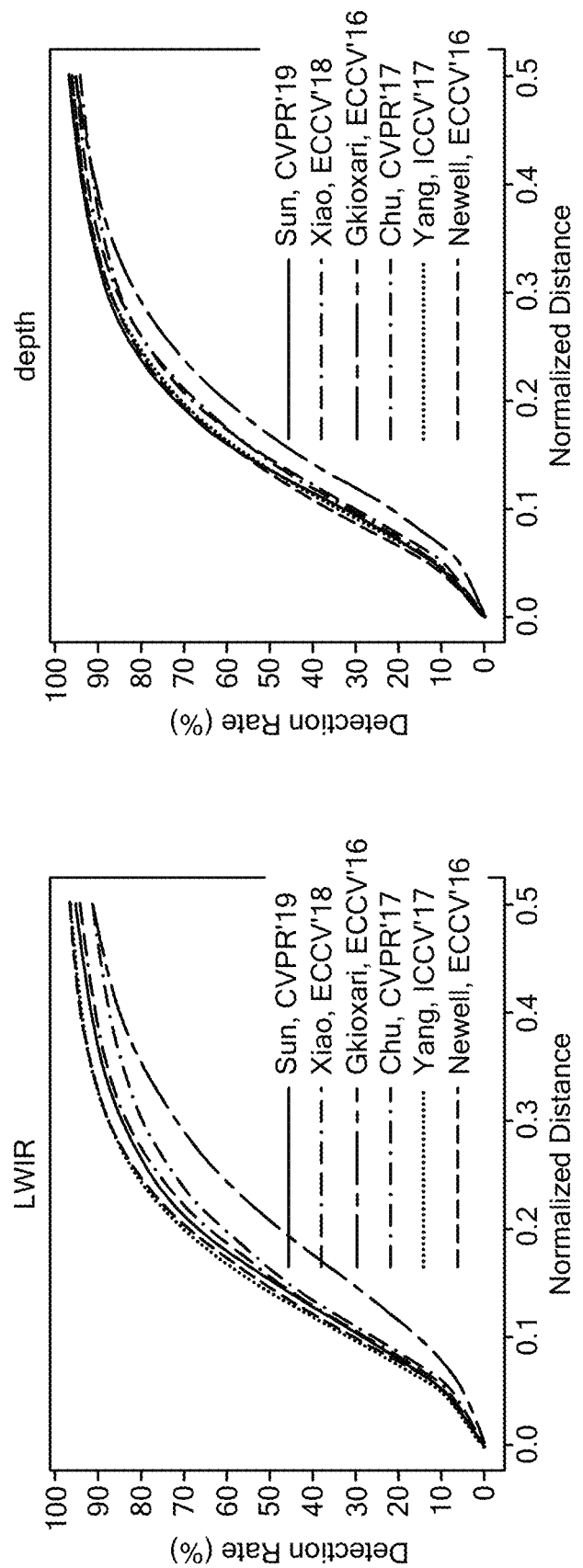
FIG. 12 illustrates PCKh performance of state-of-the-arts on LWIR, depth modalities in a hospital room for field test.

In the hospital setting, the device was deployed in a real hospital room in a different context manifested by a different hospital bed, newly purchased blankets from different brands and colors, and subjects which had never been seen in the main set training. This reflected most of the possible changes when this approach was employed in a real application scenario. All modalities were collected except PM from 7 subjects and tested against the pre-trained models directly. Their performance is shown on FIG. 12. It can be seen that most of the models trained on SLP showed robust performance in this field test and LWIR (Newell, ECCV '16) with PCKh0.5 96.5% and depth (Sun, CVPR '19) with PCKh0.5 96.1% came out to be the best. In the above tests, Newell, ECCV '16 and Yang, ICCV '17 showed a robust performance in both the original set test and the field test where Yang, ICCV '17 is actually a revised version of Newell, ECCV '16 with additional attention mechanism.

I.5.4.4 Evaluation of the Annotation Quality

Basically, the annotation quality was difficult to gauge as there was no true ground truth for comparison. Two kinds of error in the inference process were assumed: (1) One was recognition error when a body part was recognized as a wrong one, such as a wrist was recognized as an ankle in the receptive field. This could be caused by certain difficult cases such as difficult poses, a rare appearance, or heavy occlusion. (2) The other was regression error to the exact joint location after a body part was correctly recognized.

Supposing the joint annotation followed a Gaussian distribution centered at the true joint location (which is actually the underlying assumption for most of the heatmap-based methods by using a joint centered Gaussian map as regression target), by maximizing the likelihood, the model's inference was supposed to be the expectation center of the target joint. With the PCKh0.5 standard, all inferences within this 0.5 standard threshold could be deemed as correct. When recognized correctly, the standard variance of their estimation error partially reflected the annotation quality. So the same models were trained and tested on public human pose datasets, the Max Planck Institute for Informatics (MPII) Human Pose dataset MPII, Microsoft Common Objects in Context (COCO), and SLP (the dataset described herein) and their means and variances within the correctness threshold (PCKh0.5) are reported in Table 2. From the result, it can be seen that for error mean, SLP-PM most times showed a larger mean error around 0.2, except Xiao, ECCV '18 showed 0.35 on COCO. The other datasets/SLP-modality showed a similar performance around 0.17. This agreed with the localization ambiguity issue of PM. However, when it came to error std, it can be seen that almost all SLP modalities yielded better std including comparing to MPII and COCO. It partially suggests that the guidelines originated from PHPT can help to produce more stable and consistent annotation. This benefits from the cross modality referencing which was further proved in the ablation study.

TABLE 2

Mean and Variance of Sun, CVPR '19, Xiao, ECCV '18 tested on MPII, COCO, and SLP with PCKh0.5

| Methods | Datasets | MPII | COCO | SLP-LWIR | SLP-PM | SLP-depth |
|---|---|---|---|---|---|---|
| Sun, CVPR '19 | mean | 0.167 | 0.167 | 0.172 | 0.214 | 0.157 |
| | std | 0.127 | 0.136 | 0.107 | 0.117 | 0.099 |
| Xiao, ECCV '18 | mean | 0.173 | 0.349 | 0.177 | 0.206 | 0.163 |
| | std | 0.127 | 0.118 | 0.107 | 0.115 | 0.101 |

I.5.5 Ablation Study

Figure 13:
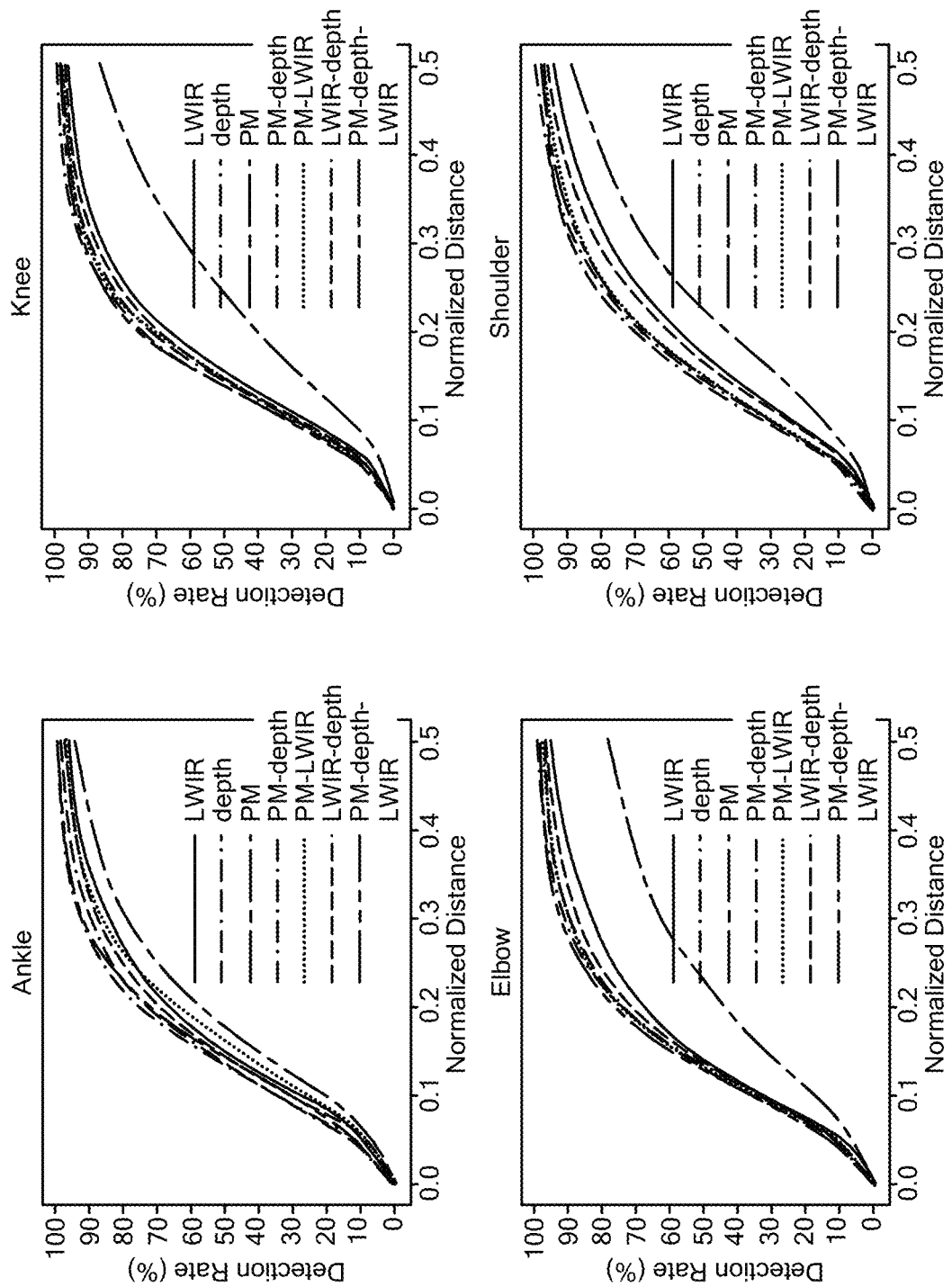
FIG. 13 illustrates PCKh performance of Sun et al. on with typical modality combinations.
Figure 13:
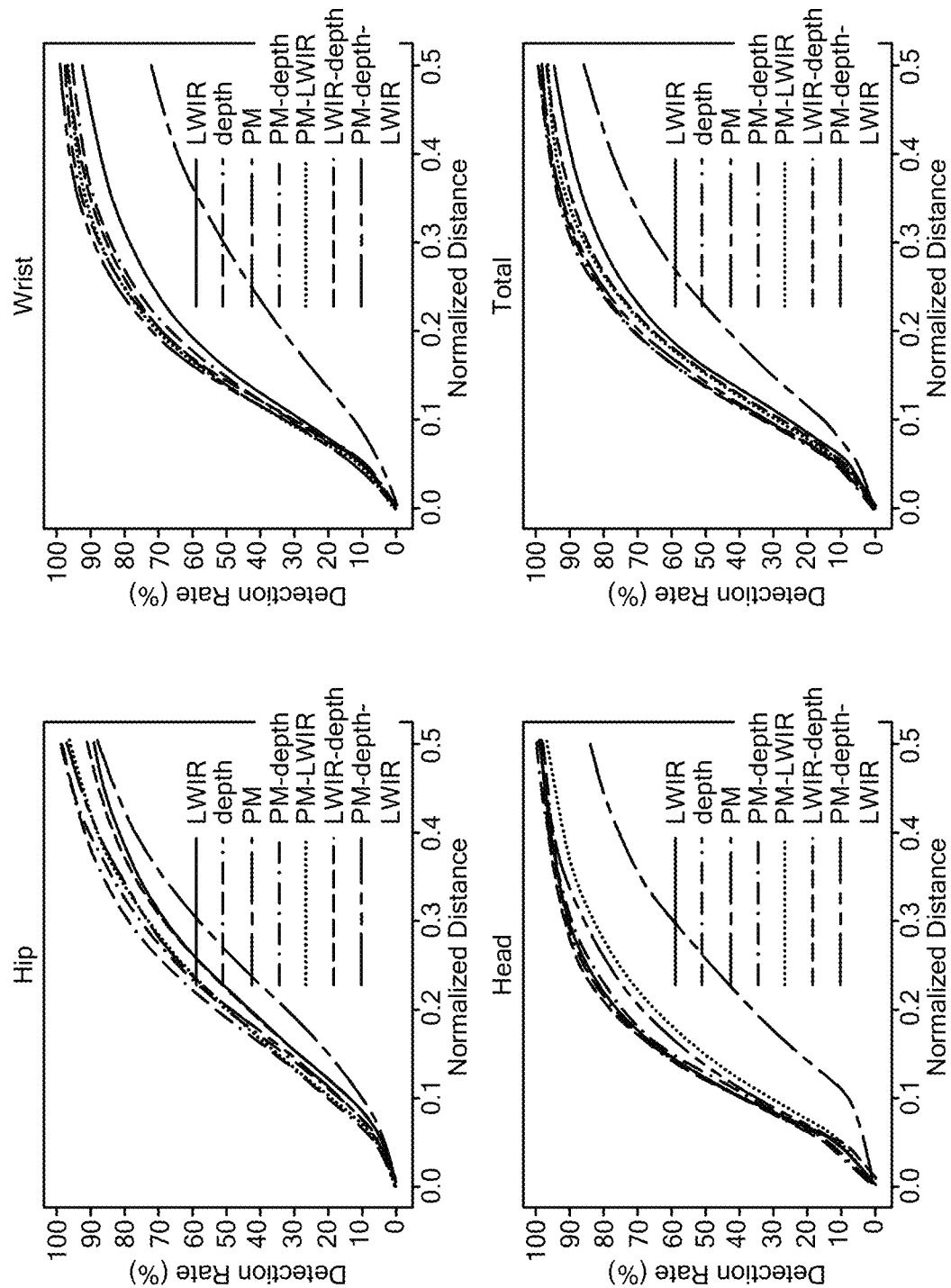

Different from network focused works, the ablation focused on how SLP modalities affected the inference result by extensive testing of individual modality or their possible collaborations. One of the recent state-of-the-art human pose models, Sun, CVPR '19, was chosen for this test and the result is shown in FIG. 13.

According to the result, it can be seen that for single modality, LWIR and depth were more effective than PM. By collaborating with either LWIR or depth, PM performance was significantly improved as shown PM-LWIR and PM-depth. However, it was found that PM was not useless in the inference but complementary to other modalities, which was reflected in that by adding the PM modality, the collaboration versions of PM-LWIR and PM-depth showed greater improvements than their single modality counterpart based on LWIR and depth only. The underlying reason is more intuitive from the qualitative result shown in FIG. 11. For example, in the inference result in row 2 column 2 (r2,c2), the PM could hardly estimate the right lower arm out of contact of the bed whose pose however was more intuitive in other modalities (LWIR, depth). On the contrary, in (r1,c1), when the head rested on the right arm, the depth failed the inference due to a blocked view point, which however was more evidently presented in PM. It can be seen that by sensing from a different perspective, PM showed a complementary effect to LWIR and depth. Furthermore, for the PM modality, the better performed joint estimation was more likely to happen around supportive areas such as hips, shoulders, and heels. These areas are all high-risk areas for developing pressure ulcers.

I.5.6 LWIR-D-PM Visualization

From the human 2D pose estimation study, it can be seen that a human's perception is not always superior to a machine. Especially with unfamiliar modalities from which the human annotator can hardly recognize a pose, such as a covered depth/LWIR image, a machine can quickly learn and surpass a human. This seems unusual, as in most vision tasks, human perception is deemed as an oracle and plays the role of teacher, because humans are trained since birth in the 'RGB' world. It should be seen that learning is not an exclusive right to machines but also to humans. By observing the inference exemplar of pretrained machine models as shown in FIG. 11, a human can also learn how to interpret a human pose under difficult contexts and unfamiliar modalities, such as covered LWIR or depth. For example, if a medical practitioner needs to monitor a patient via non-RGB modalities during the night, a pretrained machine model can provide a good teacher's role to illustrate how to determine a pose from these modalities. Thus, machine intelligence can augment human cognition to make better decisions, particularly when prior knowledge is important, such as in medical care.

Figure 14:
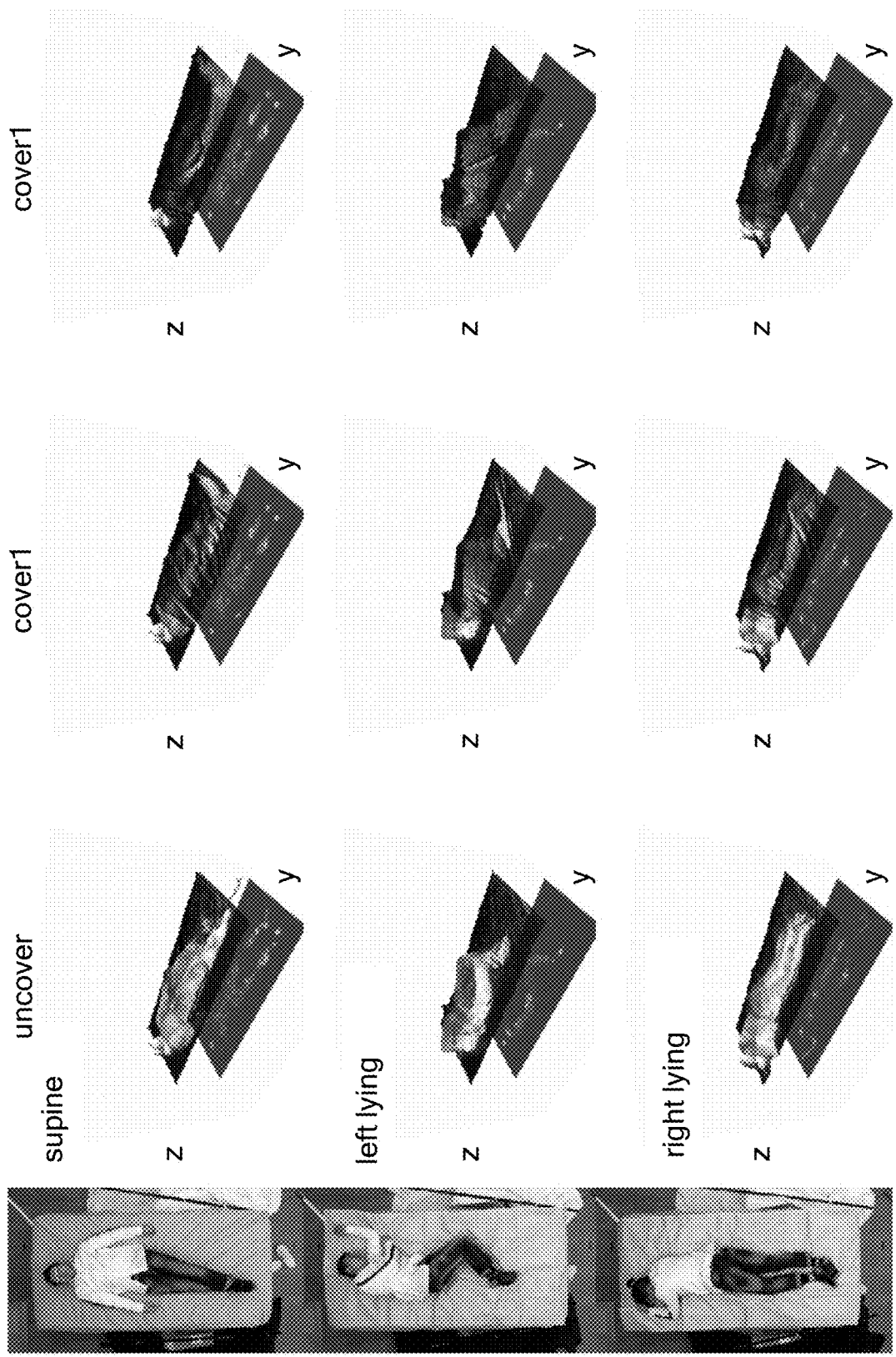
FIG. 14 illustrates LWIR-D-PM visualization.

Furthermore, one can also think about the inverse loop. By observing a RGB human, one can learn the pose easily. However, a human can have more difficulty determining target geometries, temperature, and underlying pressure. Learning how lying poses can affect contact pressure and bed bound disease development is an important topic in medical studies. For this purpose, the best way for a human to learn vision tasks is by observing the input and desired output simultaneously, and the LWIR-D-PM visualization for in-bed human can be introduced. As all modalities of SLP were collected with correspondence, this presentation can be generated with ease by rendering the coupling modalities to the corresponding layers respectively. A demonstration is shown in FIG. 14 with multiple cover conditions from three general lying posture categories.

A typical benefit of this visualization is that it provides an intuitive view of an in-bed human, which is helpful for relevant medical studies, for example, to understand what pose can avoid a pressure concentration. Yet such relations are not easily observed via the pressure map alone, for example, as shown in FIG. 5A. By fusing multiple modalities, the LWIR-D-PM visualization can be helpful for medical workers to better understand the underlying relationships.

I.5.7 Human Pose Estimation in 3D

The SLP dataset does not have a 3D human pose ground truth. However, it is interesting to see if an SLP pose can be estimated directly by employing pretrained models from publicly available datasets that are deemed to be effective for general purpose.

The mainstream of 3D human pose estimation focuses on monocular RGB. By further incorporating 2D images in the wild, existing 3D human pose estimation can achieve improved accuracy on existing benchmarks and can also show qualitatively satisfactory results on images in the wild. Thus, some promising 3D human pose methods exist. In-bed human poses could be potentially correctly recognized with such pretrained models for general purposes if not for the difficulties of darkness and coverings.

Figure 15:
FIG. 15 illustrates quantitative results of 2D human post inference with leading RGB with ground truth followed by inference result of [65]-[68].

So several state-of-the-art 3D human pose estimation models were tested based on RGB and depth by feeding the corresponding modalities without cover which are supposed to be in the same domain as source training data. The qualitative result is shown in FIG. 15. The models used were:

Moon, ICCV '19 (G. Moon, J. Y. Chang, and K. M. Lee, "Camera distance-aware top-down approach for 3d multi-person pose estimation from a single rgb image," in *Proceedings of the IEEE International Conference on Computer Vision*, 2019, pp. 10 133-10 142)

Ronchi, 'BMVC '18 (M. R. Ronchi, O. Mac Aodha, R. Eng, and P. Perona, "It's all relative: Monocular 3d human pose estimation from weakly supervised data," in *BMVC*, 2018)

Zhou, ICCV '17 (X. Zhou, Q. Huang, X. Sun, X. Xue, and Y. Wei, "Towards 3d human pose estimation in the wild: A weakly-supervised approach," in *The IEEE International Conference on Computer Vision (ICCV)*, October 2017)

Xiong, 'ICCV '19 (F. Xiong, B. Zhang, Y. Xiao, Z. Cao, T. Yu, J. T. Zhou, and J. Yuan, "A2j: Anchor-to-joint regression network for 3d articulated pose estimation from a single depth image," in *Proceedings of the IEEE International Conference on Computer Vision*, 2019, pp. 793-802)

From the results, it can be seen that the depth based result failed most times. There may be several reasons. One reason is the "blend" effect of the depth appearance. As a human at rest (in-bed) is stable in an effortless configuration in which all limbs are supported, this can result in a tight neighboring effect among nearby limbs and context items and their surfaces usually blend into a continuous landscape as shown in FIG. 14. Consider Xiong, ICCV '19, is based on the ITOP datasets (A. Haque et al., "Towards viewpoint invariant 3d human pose estimation," *European Conference on Computer Vision*, October 2016), which focus on daily activities. This results in a much different depth appearance. For example, when the arms are placed in front of the torso, they are rarely attached to the torso in daily activities. Second, the background is usually far away from the body instead of a tightly attached bed surface. These aspects suggest that distinguishing body parts from each other in the case of in-bed humans is more challenging.

On the RGB side, most models actually can roughly localize the correct human joints. This complies with the assumption herein that the in-bed human appearance is domain identical with the source data for general human poses.

However, for individual limbs/joints, their uncertainties are usually seen, especially when the subject rests in an "in-bed" specific pose, such as resting the head on the arms. These models gave varying answers, to putting the hand forth or back or failing the detection at all, as shown in FIG. 15 row 1 (r1). Another typical issue is the uncertainly of the depth of the foot. Taking r2 for example, many models preferred to assume a back stretched leg configuration instead of resting at a similar depth level as the torso part. These problems may mainly come from the different pose priors of in-bed humans. One can imagine that if one sees a human raise one leg with a standing posture, it can be more likely to assume the human is trying to kick something, and a back stretched leg would be more reasonable. However, a different interpretation can be given under the in-bed context. However, it is not easy for a machine to understand this without having seen such data previously.

One can also imagine that the in-bed case is rare in existing public datasets. Even though these images were collected extensively, hoping to reflect all possible human poses for general purposes. But this process is more likely to result in what people want others to see, such as positive images, energetic images, and interesting images, but rarely resting in-bed images. This bias to make the datasets aim at representing the general cases, though large, is still a fraction of all possible human poses. SLP, though it may be considered to show an easier pose manifold, is not necessarily covered by existing human pose datasets for general purposes, but is more likely to be complementary.

II. 3D Human Pose Estimation Methods and Systems

Figure 16:
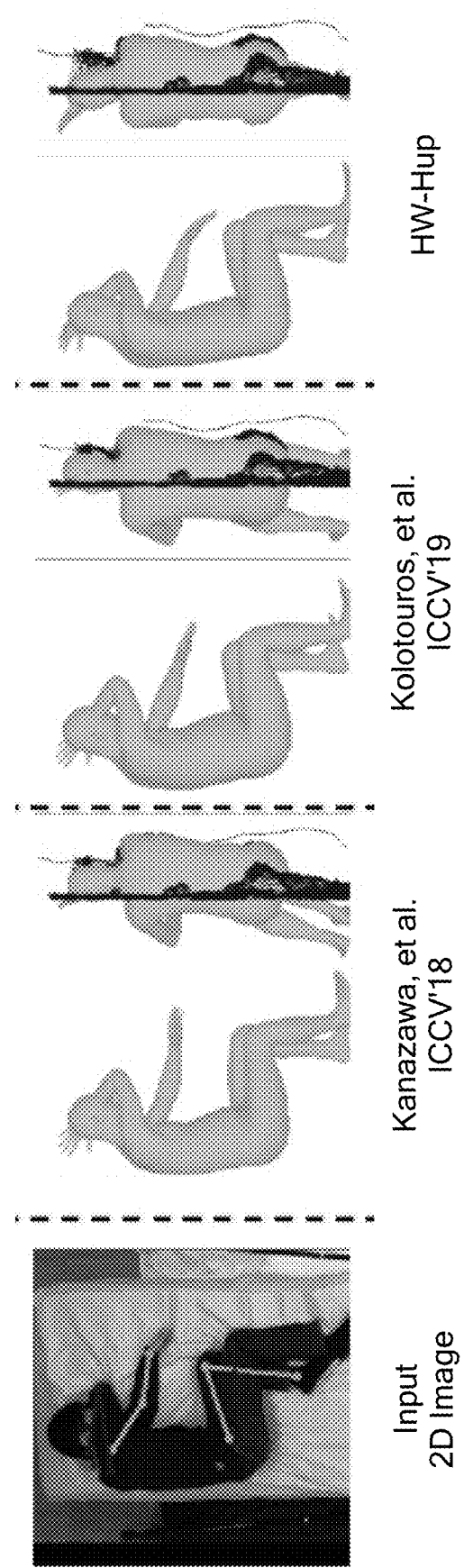
FIG. 16 is a visual inspection of the accuracy of the 3D human pose and shape estimation models compared to the heuristic weakly-supervised 3D human pose estimation model (HW-HuP), when applied on an in-bed pose image taken from the SLP dataset [31]. While top-view pose seems acceptable, the side-view reveals how other models are off in estimating the correct 3D pose/shape.

The technology described herein can also provide a predictive model that can estimate a 3D human pose and its shape directly from a single 2D image. By way of further explanation, one can look at the problem of 3D human pose estimation in applications in the "wild," where no ground truth 3D pose data are accessible. The technology herein presents an effective transfer learning approach based on a heuristic weakly supervised framework in order to enable the estimation of 3D human poses under such contexts. The technology uses easy-to-access 3D proxy data for weak supervision and heuristic rule extraction to train a robust 3D human pose estimation model. The technology in particular focuses on applications in which environmental or person-specific constraints prevent the use of professional motion capture (MoCap) devices to collect even a small 3D pose sample set in the target domain, such as patient monitoring in a hospital room due to its context constraints, or baby monitoring in a crib. FIG. 16 illustrates that some high performance state-of-the-art (SOTA) 3D pose estimation models when applied to in-bed patient monitoring failed to yield qualitatively correct results. To deal with the difficulties of gathering motion capture data in practical applications, depth sensing using inexpensive off-the-shelf cameras has been employed in some human pose estimation studies, which adds an extra dimension to the otherwise 2D RGB data. However, RGBD is not 3D, and the pose estimation Microsoft Kinect Software Development Kit (SDK) is only effective in limited working conditions. Thus, assuming depth cameras can provide 3D poses is not a valid assumption.

Accordingly, the technology described herein provides a weakly supervised solution to re-purpose existing SOTA models for 3D pose estimation in practical applications when the use of motion capture systems for 3D data collection is not feasible. Depth data is used as a higher-level and less precise estimation of 3D information to create heuristic rules and impose extra constraints on the motion capture-independent training data. The result is a predictive model that can estimate a 3D human pose and its shape directly from a single 2D image. The heuristic weakly-supervised 3D human pose estimation model (HW-HuP) is trained using both the learned pose and shape priors from a few public 3D pose datasets as well as 2D pose and depth observations from the target domain such as from SLP. By learning the priors from the source domain and the noisy observations from the target domain, the technology can iteratively converge to a reliable 3D pose estimation. Depth data is employed during the supervised training, yet it is not required during the pose inference. This makes the HW-HuP approach different from the RGBD-based pose estimation algorithms, which require full access to both RGB and depth modalities during the inference. This technology addresses the problem of 3D human pose estimation for applications where no 3D pose ground truth can be collected in their natural settings. The technology provides various features and aspects including the following:

A heuristic weakly supervised 3D human pose estimation (HW-HuP) approach that combines the priors from public 3D pose datasets and easy-to-access observations from the target domain in an iterative way.

A practical application in the healthcare domain, in which an automatic 3D pose estimation of in-bed patients can lead to useful outcomes. Since no annotated 3D pose data is available, existing SOTA models performed poorly in this application as shown in FIG. 16, and there is a need for a more reliable 3D pose approach such as that described herein.

HW-HuP has flexibility in its input modality, such that when RGB is not informative (e.g., in heavily occluded scenarios), other input modalities such as pressure mapping, depth, or infrared signals can be used in the pipeline.

II.1. 3D Pose Estimation without Ground Truth

The technology is described herein in the context of enabling 3D human pose estimation in practical scenarios, in which not only the SOTA 3D pose estimation models do not perform well, but also, due to the context-related constraints, no motion capture (MoCap) data can be collected to fine-tune the existing models with ground truth 3D data. Throughout this description, it is assumed that 2D human pose data are available since even in very data-restricted settings, some manually labeled 2D pose data can be efficiently collected and used for conventional fine-tuning of the 2D pose estimation models. Therefore, in the approach described herein, the following data availability is assumed: (1) 2D image data I, (usually RGB, unless otherwise indicated); (2) depth data D; (3) the ground truth 2D pose annotation x; and (4) a pre-trained 3D pose estimation model F trained on large-scale publicly available 3D human pose datasets. Considering that the technology can be used to target applications of 3D pose estimation in natural settings, the following assumption is made on data constraints: (1) depth data D may not be continuous but may be provided as individual frames; and (2) D could be noisy, especially since the existing RGBD cameras have limited range and anything outside that range is not sensed reliably. Also, if the target body is too close to the background, the depth detection performance drops dramatically, which is the case with the Kinect SDK.

Uncertainty in Depth Observation: Given the 2D joints x and the depth map D, one may assume a 3D pose can simply be achieved by combining the 2D pose and its projection from a depth map. However, a depth map only provides a series of surface points instead of the true joint locations. These points are called depth-based 3D proxy, which may have some biases from their true corresponding joint locations. If there were equal bias across all body joints, the true 3D pose could still be achieved by making everything root centered. However, these biases are not equal or constant and they are both pose- and shape-dependent. A large limb does not necessarily hold the same bias as a thin limb due to their shape differences. The bias may also vary from different viewpoints caused by pose differences.

Figure 17C:
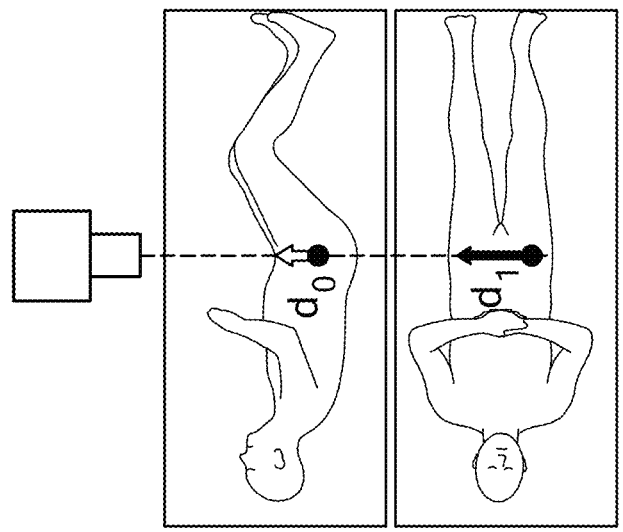
FIG. 17A-17C illustrate depth proxy point bias from the true joint location in the case of: single body with uneven shape (FIG. 17A), double bodies with occlusion (FIG. 17B), and right hip of a human body (FIG. 17C).
Figure 17B:
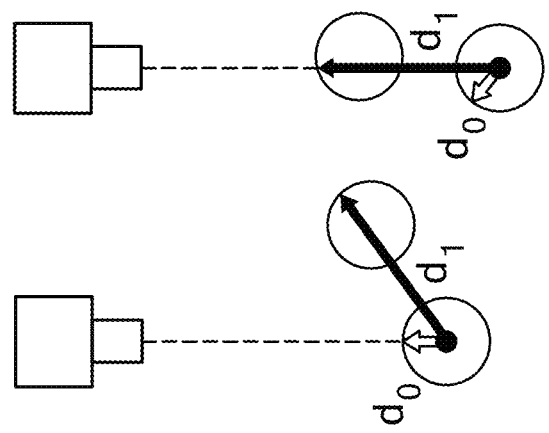
Figure 17A:
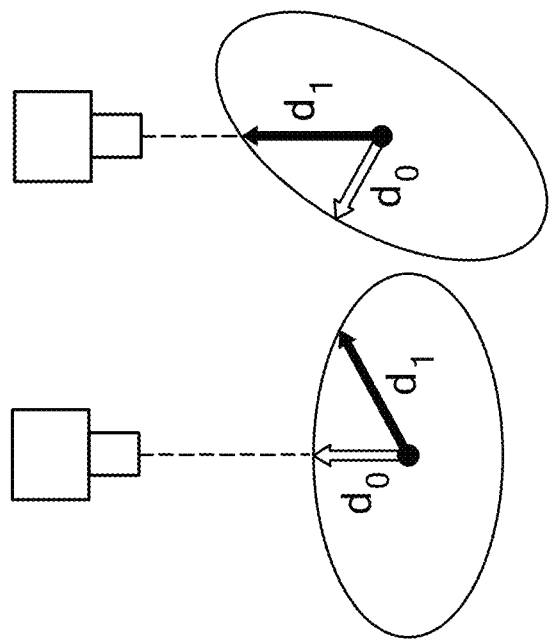

If it is assumed that all the limbs have an oval cross-section, in a single body case (e.g., a human head), the bias variation mainly comes from an uneven distance of the joint to its surrounding surfaces, which is usually small as shown in FIG. 17A. In a double body case (e.g., crossed arms or legs), the bias is mainly caused by the occlusion when the occluded joint is mapped to the upper surface of the other body part. Such error is usually large across limbs, as shown in FIG. 17B, and should need be avoided. An example of a double body bias that can occur in measuring the location of the right hip joint from different camera angles is shown in FIG. 17C. Therefore, the 3D joint location estimated based on the depth data is only a proxy for the true 3D pose.

II.2. Heuristic Weakly-Supervised 3D Human Pose Estimation Model (HW-HuP)

The data distribution gap between the public motion capture (MoCap) data and a practical pose estimation application often stems from the differences in types of poses that the subjects take in different domains. As a result, the pre-trained SOTA models do not show satisfactory performance on a new application unless they are fine-tuned. Nonetheless, having no ground truth 3D pose data prevents a straightforward fine-tuning.

Problem Formulation: The objective is to obtain a 3D pose regression model F to estimate the human's 3D pose θ, its shape β, and a weak-perspective camera model C, directly from a single 2D image I, as [Θ, C]=F(I), where $\Theta=(\theta, \beta)$ represents the human pose and shape parameters. θ and β are based on a shape parametric human template called SMPL (Matthew Loper, Naureen Mahmood, Javier Romero, Gerard Pons-Moll, and Michael J Black. Smpl: A skinned multi-person linear model. *ACM transactions on graphics (TOG)*, 34(6):1-16, 2015). Pose $\theta \in \mathbb{R}^{3K+3}$ is a vector of axis-angle representation of the relative rotation of K=23 body parts with respect to its parent in the kinematic tree plus the root global rotation. Shape $\beta \in \mathbb{R}^P$ is the first P=10 PCA coefficients (principal component analysis coefficients) in the human template space. The SMPL model is a differential function that outputs a triangulated mesh $M(\Theta) \in \mathbb{R}^{3 \times N}$ with N=6980 vertices. The camera model C=(R, T, s) includes camera global rotation $R \in \mathbb{R}^{3 \times 3}$, a translation vector $T \in \mathbb{R}^2$, and the scale $s \in \mathbb{R}$. For a 3D keypoint $X(\Theta) \in \mathbb{R}^3$, which is a linear combination of the human mesh vertices from M, its 2D projection x is given as $\hat{x}=s\Phi(RX(\Theta))+T$, where Φ is an orthographic projection. (Federica Bogo et al. Keep it smpl: Automatic estimation of 3d human pose and shape from a single image. *European conference on computer vision*, pages 561-578, Springer, 2016. Nikos Kolotouros, Georgios Pavlakos, Michael J Black, and Kostas Daniilidis. Learning to reconstruct 3d human pose and shape via model-fitting in the loop. *Proceedings of the IEEE/CVF International Conference on Computer Vision*, pages 2252-2261, 2019.)

II.2.1. HW-HuP Framework Components

Figure 18:
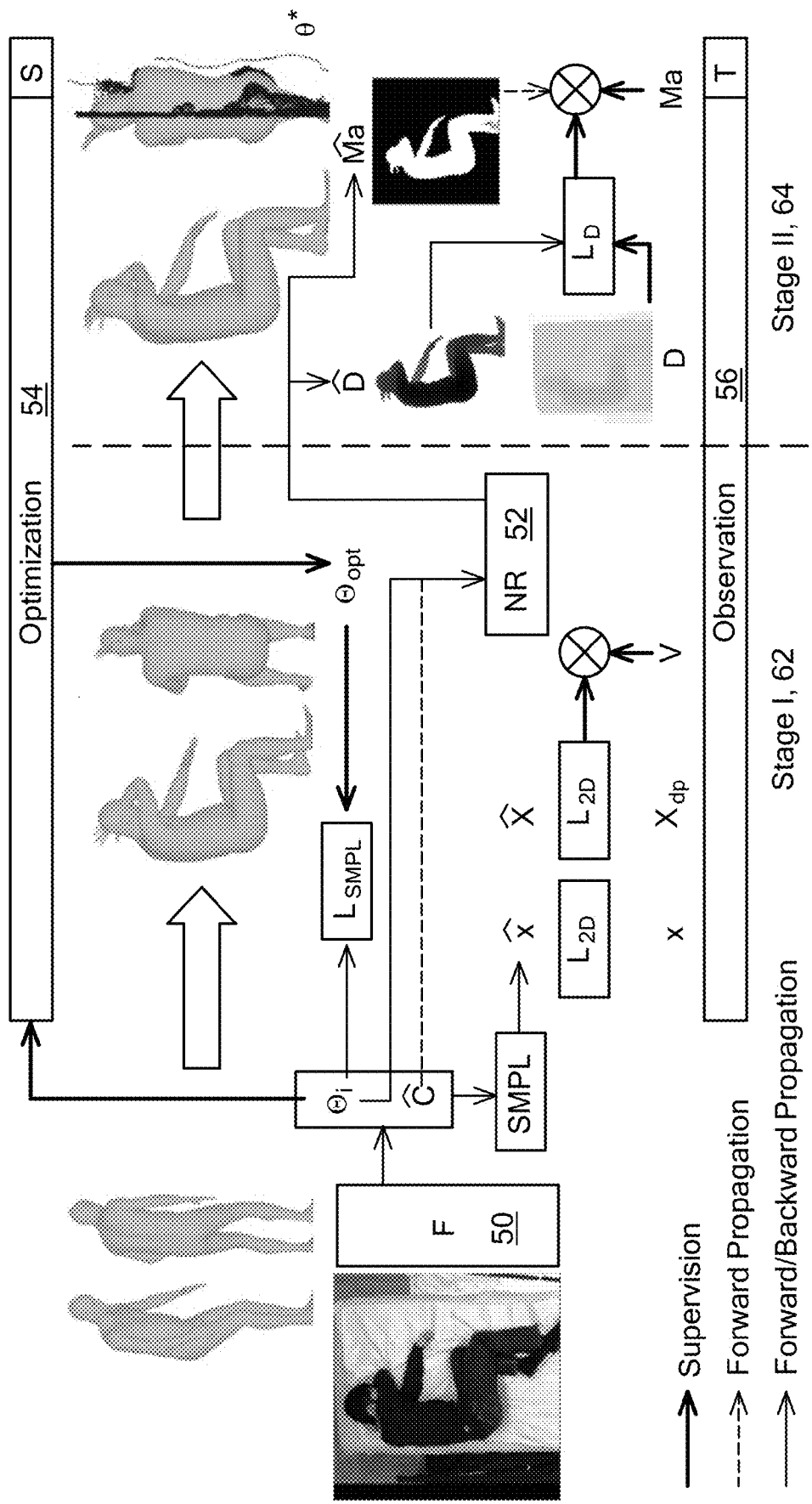
FIG. 18 illustrates heuristic weakly supervised 3D Human Pose (HW-HuP) framework. HW-HuP learns from known priors in the source domain (S) and new observations from the target domain (T), iteratively from a coarse to fine manner in two stages. F is the 3D pose regression network, and NR is the differentiable neural renderer. x stands for the 2D pose, $X_{dp}$ for 3D pose from depth-based proxy, V for the joint visibility, D for depth, Ma for the human body mask, all extracted from observations in T domain. C stands camera parameters. All hat versions ˆ stand for their estimated counterparts. In each iteration of stage I, from the initial 3D pose/shape $\Theta_i$, $\Theta_{opt}$ is estimated under the source priors to better explain the observation in T domain, while the detailed depth supervision comes in the stage II.

HW-HuP learns 3D pose information jointly from the pose priors in the source domain as well as observations from the target domain. The observations in the target domain are interpreted at run-time as the 3D regression model F converges. An overview of the HW-HuP framework is shown in FIG. 18 which includes:

Two Networks: (1) a 3D pose regression network F, 50, to estimate the human pose θ, shape β, and camera parameters C from an input 2D image I; and (2) a differentiable neural renderer, 52, which outputs the predicted depth D̂ and mask Ma from the predicted human mesh M̂(θ, β). A suitable neural renderer is described in Hiroharu Kato, Yoshitaka Ushiku, and Tatsuya Harada. Neural 3d mesh renderer. In *The IEEE Conference on Computer Vision and Pattern Recognition (CVPR)*, 2018, incorporated by reference herein.

Two Pipelines: (1) an optimization pipeline OPT, 54, based on the SMPLify model (Federica Bogo et al. 2016), to minimize the 2D pose x estimation error under the source priors based on the input initialization $\Theta_i$; and (2) an observation OBS pipeline, 56, which feeds the observed 2D pose x, depth D, human body mask Ma and the joint depth-based proxy $X_{dp}$ for supervision.

Two-Stage Supervision: The coarse-to-fine training paradigm has two stages. In stage I, 62, (1) from the input 2D image I, the 3D regression network F gives initial estimates on the 3D pose $\Theta_i$ and camera parameters Ĉ. (2) $\Theta_i$ serves as the initialization for the optimization pipeline OPT. OPT optimizes from the current estimation under the source prior to have $\Theta_{opt}$, as a guess of current observation. (3) The regression network F is updated by minimizing the error from observations x and $X_{dp}$. After each iteration, the regression model F is updated to have better estimation Θ*. (4) When the model converges at stage I (by setting a specific epoch), stage II, 64, is entered. In the stage II, the noisy $X_{dp}$ supervision is replaced with an aligned depth D supervision for a more detailed refinement.

II.2.2 HW-HuP Features

Features of the HW-HuP framework designed for 3D human pose estimation are described as follows:

Selective Pose Prior Transfer: The source priors are learned via an optimization process, which employs a pretrained Gaussian mixture model (GMM) prior (Federica Bogo, 2016). Using a mixture of regression and optimization in a loop (Kolotouros et al., 2019), the optimization serves as a refinement mechanism to update the regression output in the same domain. In the HW-HuP design, the optimization pipeline OPT mainly plays the role of introducing the source priors into the regressor F with the supervision loss:

$$L_{OPT} = L_{2D} + \lambda_\theta L_\theta(\theta) + \lambda_\beta L_\beta(\beta) + \lambda_\alpha L_\alpha(\theta), \quad (4)$$

where $L_{2D}$ is 2D pose loss, $L_\theta$ is GMM pose prior learned from the source domain, $L_\beta$ is a quadratic penalty on the shape coefficients, and $L_\alpha$ is the unnatural joint rotation penalty of elbows and knees. The same definition is followed for each penalty term as in Bogo et al., 2016. The optimization model is initialized with a strong source prior regulator, which degenerates over time with an exponential decay as $\lambda_\theta = \lambda_{\theta\text{-}0} f^e$, where $\lambda_{\theta\text{-}0}$ is the initial weight for the GMM prior, f is the decay factor, and e is the epoch number. With the source prior faded away over time, the major body parts follow the new target observation, yet the learned prior from source is kept for small limbs (Further discussion is provided below in Additional Materials, Section II.4.)

Joint Depth-Based Proxy Supervision: As introduced in Section II.1, the joint depth proxy $X_{dp}$ is noisy with bias depending on the human pose and shape and the bias could be significant or negligible depending on its causal source (as shown in FIG. 17). Since the significant biases mainly come from the occlusion cases, the visibility information is explicitly employed to filter out misleading invisible joints. The weakly supervised 3D pose loss via $X_{dp}$ is given as:

$$L_{3D} = \sum_{j=1}^{K} V_j \|(X_{dp_j} - \hat{X}_j)\|_2^2, \quad (5)$$

where Vj stands for the j-th joint visibility. Visibility is often provided in the 2D annotations; however the information is not usually used since most 2D pose estimation models attempt to infer all joints in the image no matter whether they are visible or not. Nonetheless, in $X_{dp}$ supervision, it is important to avoid the significant bias in the observations. When the visibility information is missing (such as in an unlabeled dataset), an occlusion detection model is trained by fine-tuning one of the SOTA pose estimation models and adding an occlusion detection branch called Vis-Net on top of its backbone network. Details are provided below in Section II.4.1

Observation Interpretation at Run-Time: The HW-HuP supervision process is designed in a coarse-to-fine manner in two stages. At stage I, F is supervised with only 2D pose x data, the joint depth proxy $X_{dp}$, and the $\Theta_{opt}$ under source priors. In this stage, the trained model can yield a plausible front view of a fitted model with aligned 2D poses. Combined with the $L_{3D}$ supervision with $X_{dp}$ after filtering, the estimated joints can also be close to their true locations X in the 3D space. At stage II, despite the depth error, the estimated mesh from stage I has already been well aligned in 2D and the estimated mask M̂a can be further employed for depth alignment.

In the design, a differential neural renderer (NR) is employed to generate the estimated depth D̂ and human mask Ma from estimated $\Theta_i$. A straightforward strategy is employed to directly match the depth in a segmented area from the union of M̂a and the known mask of the data Ma. Getting exact Ma requires additional fine-tuning and high-quality segmentation annotation of the boundary, which is time consuming. So here a weak mask can be employed to filter out the abnormal reading of D such as the unsensed area with a reading of 0. For the z direction, first the root distance is estimated along z from the rendered human mesh to the depth observation by minimizing the average distance from the observed depth to rendered depth in the segmented area:

$$b_0 = \underset{b}{\mathrm{argmin}} |D - b - \hat{D}| \odot (\hat{M}a \cap Ma), \quad (6)$$

where, D and D̂ stand for the ground truth depth and rendered depth, and M̂a for the estimated human body mask. The depth loss for stage II is given as:

$$L_D = \|(D - b_0 - \hat{D}) \odot (\hat{M}a \cap Ma)\|_2^2. \quad (7)$$

Here, the L2 norm for the depth is employed as the depth is filtered and smoothed. In case of depth with high level noise, a robust penalty loss can be recommended, such as Geman-McClure (Stuart Geman. Statistical methods for tomographic image reconstruction. *Bull. Int. Stat. Inst*, 4:5-21, 1987). In stage I, the joint is only pushed to the corresponding surface point via $X_{dp}$. In stage II, by matching the correct surface point, the pose can be further pushed into the true location. So, in stage II, the biased 3D supervision is stopped with $X_{dp}$ and the aligned depth supervision added via $L_D$. As in stage I, the major limbs are already roughly in place; stage II provides further refinement of the details. This refinement can be limited to pose and shape without affecting other global estimations such as camera parameters and human body area. To do this, take one-way propagation for the camera C, and mask M̂a to generate segmented predicted depth to prevent unnecessary camera change and body shape shrinking. The total loss for human pose and shape regression is given as:

$$L_{reg}=(1-\mathbb{1}_{(e>e_{stgII})})L_{3D}+L_{2D}+L_{SMPL}+\mathbb{1}_{(e>e_{stgII})}L_D, \quad (8)$$

where $\mathbb{1}$ is the indicator function to initiate stage II, e is for the current epoch, and $e_{stgII}$ is for beginning epoch for stage II, where the SMPL parameters loss $L_{SMPL}=\|\Theta-\Theta_{opt}\|_2^2$.

II.2.3 Features of HW-HuP

This technology provides a transfer learning strategy for 3D human pose estimation when no ground truth 3D annotations are available in the target application. By selectively learning from the source priors as well as a series of target observations, which can be easy to access, the HW-HuP model can yield a robust 3D pose estimation performance even under challenging target contexts. As a practical example application, HW-HuP was employed on an n-bed pose estimation problem, where other SOTA approaches failed. The flexibility of HW-HuP was also demonstrated with other non-RGB imaging modalities for solving 3D human pose estimation problems in heavily occluded scenarios and under total darkness. The performance of HW-HuP was demonstrated on a 3D human pose benchmark, Human3.6M, which showed comparable results with the SOTA approaches that have full access to the 3D ground truth pose data. By simply depending on a readily deployable, off-the-shelf depth camera, HW-HuP can solve many practical 3D human pose estimation problems, where the use of motion capture is infeasible under applications having natural settings. HW-HuP can enable patient monitoring in medical facilities as well as in real-life human behavioral studies in highly constrained spaces, such as pilot training in the cockpit or driver behavior or gesture recognition inside a car.

Monocular 3D human pose estimation from a single RGB image has received attention. However, such pose inference models to be useful require supervision with 3D pose ground truth data or at least known pose priors in their target domain. Yet, these data requirements in target applications with data collection constraints may not be achievable. The present technology addresses this challenge by providing a heuristic weakly supervised solution, called HW-HuP to estimate 3D human pose in contexts in which no ground truth 3D data is accessible, even for fine-tuning. HW-HuP can learn a set of pose priors from public 3D human pose datasets and can use easy-to-access observations from the target domain to iteratively estimate 3D human pose and shape in an optimization and regression hybrid cycle. In the technology, depth data as an auxiliary information is employed for supervision, yet it is not needed for the inference.

The technology can provide 3D human pose estimation under a context which is applicable to a variety of applications. The technology can be used to (1) train a model for a new context, and (2) deploy for new applications via the pretrained model. In an example, the pretrained model can be deployed for 3D human pose estimation for human lying in-bed: (1) a webcam can be installed on the ceiling to have a bird's eye view; and (2) the in-bed 3D human poses can be tracked via a computer system with appropriate instructions. For long term monitoring overnight, a depth camera, such as a Kinect depth camera, can be added to or can replace the webcam.

The technology can provide a variety of features, advantages, and uses. For example, it can combine the priors of an existing general-purpose dataset and easy to access observations from the target domain. To train a new model under a new context, no motion capture device is required. Only depth and an inference modality such as RGB are needed. For deployment, a depth sensor is not necessary, as the technology is able to estimate 3D pose and shape via a low-cost webcam. In contrast, existing 3D pose models do not perform well under a new context. To collect 3D pose dataset, motion capture is usually used. It is costly and cannot be deployed in many application natural settings.

Based on a low profile RGB-D device, the technology can be low cost and can be used in applications with natural settings. The technology can be applicable to non-cooperative subjects such as infants or patients. The technology can be used for infant 3D pose tracking or study. The technology is compatible with other modalities, including thermal, depth or pressure map to work for adversarial vision conditions including darkness, such as a lack of artificial illumination in a room, and/or occlusion, such as with a sheet or blanket. The technology can be used for in-bed human pose estimation and bed-bound patient monitoring. The technology can be used in settings with a narrow space such as a vehicle driver's seat or an aircraft cockpit. For example, the technology can be used for driver behavioral studies and/or for pilot training in a cockpit. The technology can be used for artificial intelligence fitness coaching.

II.3. Experimental Evaluation

HW-HuP was evaluated qualitatively on a large-scale public 3D pose dataset, Human3.6M (Catalin Ionescu, Dragos Papaya, Vlad Olaru, and Cristian Sminchisescu. Human3.6m: Large scale datasets and predictive methods for 3d human sensing in natural environments. *IEEE transactions on pattern analysis and machine intelligence*, 36(7): 1325-1339, 2013), and on the SLP in-bed pose dataset described herein. On the Human3.6M benchmark, HW-HuP showed 104.1 mm in MPJPE and 50.4 mm in PA MPJPE, comparable to the existing state-of-the-art approaches that benefit from 3D pose supervision.

II.3.1. Evaluation Datasets and Metrics

Two datasets were used to evaluate the performance of HW-HuP framework in 3D human pose estimation when no ground truth 3D pose data is accessible during training.

SLP Dataset: The first focus was on an emerging healthcare application for in-bed pose monitoring. The Simultaneously-collected multimodal Lying Pose (SLP) dataset, described herein, was used, which was collected in two indoor settings with 7 participants in a hospital room and 102 participants in a regular living room. As described above, four modalities of RGB, long wavelength IR (LWIR), depth, and pressure map were simultaneously collected with different cover conditions as "no-cover", a thin layer sheet (noted as "cover1") and a thick blanket (noted as "cover2"). SLP does not provide the 3D pose annotation and holds a distinctly different pose prior from the public datasets that are focused on daily activities. The reported performance of pre-trained SOTA datasets is not satisfactory and SLP serves as an additional real-world application to show the effectiveness of the HW-HuP framework. The evaluation began with a commonly used RGB modality in order to compare the 3D pose estimation performance with other SOTA approaches. Then, this evaluation was extended to more challenging cases, where the human body was heavily occluded in the RGB images. Other input modalities were introduced beyond RGB such as pressure map, LWIR, or depth to show the effectiveness of HW-HuP in 3D pose estimation. Due to the lack of ground truth 3D pose annotation, this experiment employed the average aligned depth error as a quantitative performance metric.

Human3.6M Dataset: The HW-HuP performance was also evaluated on the Human3.6M dataset, which was a large-scale indoor MoCap benchmark for 3D human pose estimation. The version that was used included 7 subjects conducting daily activities including eating, sitting, walking, etc. The Protocol #2 of the benchmark was employed, where subjects S1, S5, S6, S7, S8 were used for training and S9, S11 for testing. This test employed the mean per joint position error (MPJPE) and the Procrustes analysis (PA) MA-JPE as the evaluation metrics.

II.3.2. Implementation Details

Data Preparation: The depth data in each dataset was preprocessed with denoising and hole filing. (Chuong V Nguyen, Shahram Izadi, and David Lovell, Modeling kinect sensor noise for improved 3d reconstruction and tracking, 2012 *second international conference on 3D imaging, modeling, processing, visualization & transmission*, pages 524-530. IEEE, 2012. Soulan Liu, Chen Chen, and Nasser Kehtarnavaz. A computationally efficient denoising and hole-filling method for depth image enhancement. In *Real-time image and video processing* 2016, volume 9897, page 98970V. International Society for Optics and Photonics, 2016.) The joint depth proxy $X_{dp}$ was extracted from the 2D joint location x from the denoised depth image and reprojected into 3D in the camera space. All images were normalized and human center cropped. Random flipping, rotation and scaling, and random channel-wise noise was used for data augmentation.

Networks Training: Since the focus of this technology is on transfer learning, well-recognized structures were employed as the building blocks. For 3D regression F, the same design was taken as in Kolotouros et al., 2019, and initialized from their pre-trained model. For differential renderer NR, the version is Kato et al., 2018 was employed. The optimization loop used in Kolotouros et al., 2019, and Bogo et al., 2016 was followed and the max iteration was limited to 50. All models were trained on an NVIDIA Tesla K40m with batch size 64. The ADAM optimizer was employed with learning rate $5 \times 10^{-5}$. In the SLP study, the model was trained with a total epoch of 30 with stage II starting at epoch 10. The training took about 20 hours for uncovered RGB and 40 hours for all cover conditions. In the Human3.6M study, due to its large frame quantity and having similar poses in neighboring frames, a down sampling rate of 50 was employed. The total epoch was set at 4 with stage II starting at epoch 2. VisNet was trained on the COCO dataset with Adam optimizer and learning rate 0.001. Additional implementation details and performance are provided below in Section II.4.

II.3.3. Ablation Study

The SLP in-bed pose dataset was chosen to show a clear example, in which no prior pose data is known and no 3D pose data is provided. For a fair comparison with the other 3D pose estimation approaches, the study started with the RGB images, where human subjects were not heavily occluded, similar to the setting in the majority of the SOTA approaches. Aligned depth error was reported for quantitative reference and the qualitative comparison, which intuitively showed performance differences between varying configurations. The chosen SOTA approaches used were the pre-trained model of SPIN* and fine-tuned model of SPIN (Kolotouros et al., 2019) and the fine-tuned model of the human mesh recovery (HMR) work (Angjoo Kanazawa, Michael J Black, David W Jacobs, and Jitendra Malik. End-to-end recovery of human shape and pose. In *Proceedings of the IEEE Conference on Computer Vision and Pattern Recognition*, pages 7122-7131, 2018). For the ablation, several intuitive solutions were formed and compared for transfer learning in following settings:

3D-dp: Assuming 2D pose and depth data together are the same as the 3D pose, so just fine-tune the network with the $X_{dp}$ as the ground truth 3D pose. For this setting, the network was trained with only x for 2D and $X_{dp}$ for 3D pose.

3D-dp-vis: Adding the visibility constraint to rule out joint depth proxy with large biases.

3D-dp-vis-D: HW-HuP full setting with depth alignment at run-time for stage II supervision.

noPrior: Assuming source prior is useless and misleading, so only need to fine-tune the network with the target data. For this setting, the source prior constraint was set to zero.

2D-D: Assuming fine-tuning is just taking whatever is available to fine-tune the network, so just supervise regressor F with the 2D pose and depth.

All the settings were trained with SLP no-cover RGB only, except SPIN*, the original pre-trained model from Kolotouros et al., 2019. Their aligned depth error performance (in mm) is reported in Table 3.

Table 3 provides aligned depth error (in mm) of HW-HuP ablations and SOTA approaches for 3D human pose and shape estimation applied on the "no-cover" RGB images from SLP dataset. The ablation settings are described in Section 5.3.

TABLE 3

| Aligned Depth Error | | | | | | | |
|---|---|---|---|---|---|---|---|
| SOTA | | | HW-HuP Ablation | | | | |
| SPIN* | SPIN | HMR | 3D-dp | 3D-dp-vis | 3D-dp-vis-D | noPrior | 2D-D |
| 80.10 | 68.38 | 63.43 | 48.13 | 47.41 | 36.01 | 38.54 | 39.32 |

The results clearly show that fine-tuning is helpful as the error drops from SPIN* to fine-tuned SPIN. Adding depth proxy supervision can improve the performance significantly and further adding visibility information is helpful. It is noted that the AD-e metric can only partially represent the estimation quality as it cannot accurately quantify the limb position if it is occluded. This is reflected in the later qualitative study. The full HW-HuP solution as manifested in 3D-dp-vis-D version was the best performer among all models. Source prior was helpful as shown in noPrior, which is 3D-dp-vis-D version without prior. From Table 3, it seems that straightforward supervision 2D-D already leads to acceptable estimation. However, this is only the case when there is RGB input with no occlusion. The 3D estimation performance degraded in 2D-D case, when HW-HuP was extended beyond RGB, where no pre-trained model exists.

Figure 19:
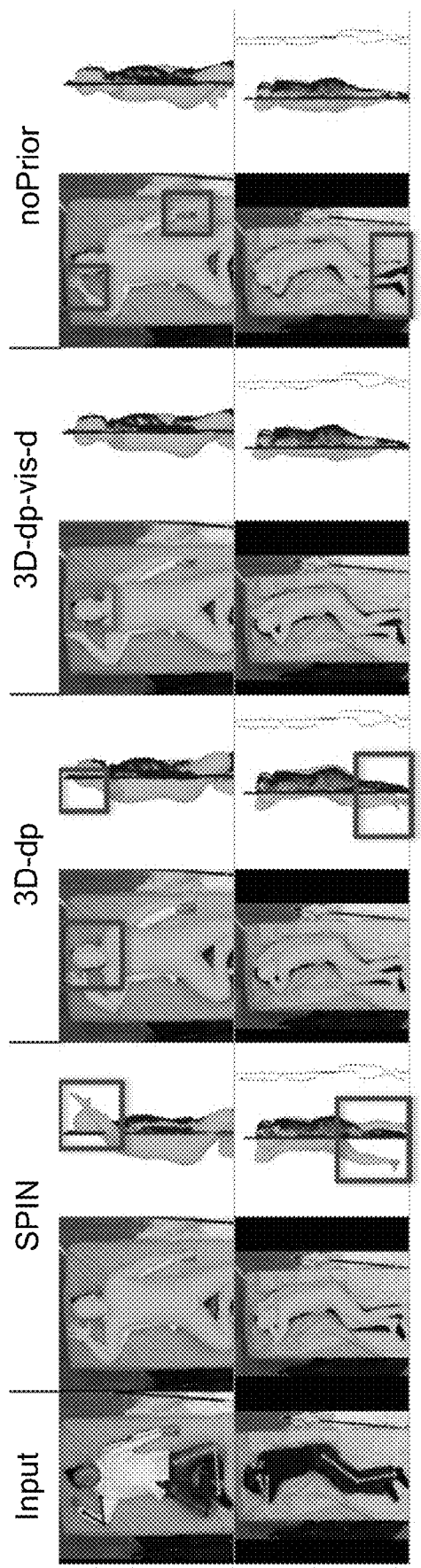
FIG. 19 illustrates qualitative 3D human pose and shape estimation on SLP dataset using "nocover" RGB images. Two examples of supine and side lying postures are shown in first and second rows, respectively. Points cloud are shown as blue dots in the image. The unnatural or defected parts are highlighted in red rectangles. The details captured by HW-HuP are also highlighted in a green rectangle.

The qualitative results for this experiment are presented in FIG. 19. Limited by space, only typical settings with representative issues are presented. FIG. 19 shows that SPIN was prone to the source prior for daily activities; as shown by the sticking out hands in supine and straddle legs in the side lying positions. 3D-dp in supine was generally satisfactory, which agreed with the analysis that for a canonical pose with less occlusion, the depth proxy bias is usually small and $X_{dp}$ is close to the true joint location. However, some local defects were present, such as slightly raised head and also the bent legs into the bed direction in the side posture. In contract, these details were well-captured in the HW-HuP full setting (3D-dp-vis-d). Without prior, although the major limbs showed good alignments, the small body parts such as hands and feet were usually distorted.

II.3.4. Extending Inputs Beyond RGB

Besides the commonly used RGB modality, the model was further extended to work with the other imaging modalities and in more challenging conditions such as heavy occlusion and total darkness, as described above. In this experiment, HW-HuP was trained on non-RGB modalities including depth, LWIR, and pressure map (PM) and their combination under all cover conditions provided in SLP noted as "nocover," thin sheet "cover1" and thick blanket "cover2". Their performance in each cover condition and their overall performance are reported in Table 4.

Table 4 provides aligned depth error (in mm) of HW-HuP and SOTA approaches for 3D human pose and shape estimation applied on the "nocover," "cover1," "cover2," and all cover conditions of the depth, LWIR, PM and their combined modality input images from SLP dataset.

TABLE 4

Aligned Depth Error

| Nocover | Depth | LWIR | PM | Combined | Cover1 | Depth | LWIR | PM | Combined |
|---|---|---|---|---|---|---|---|---|---|
| SPIN* | 108.78 | 89.41 | 102.27 | 96.13 | SPIN* | 105.82 | 92.65 | 101.01 | 102.27 |
| HMR | 68.70 | 69.20 | 75.70 | 72.55 | HMR | 72.81 | 71.25 | 75.92 | 72.52 |
| SPIN | 62.72 | 66.60 | 70.28 | 67.35 | SPIN | 67.71 | 67.81 | 70.29 | 67.96 |
| HW-HuP | 33.87 | 38.45 | 41.48 | 37.62 | HW-HuP | 36.87 | 39.82 | 41.43 | 37.92 |

| Cover2 | Depth | LWIR | PM | Combined | All Covers | Depth | LWIR | PM | Combined |
|---|---|---|---|---|---|---|---|---|---|
| SPIN* | 105.34 | 89.31 | 101.08 | 100.82 | SPIN* | 106.65 | 90.46 | 101.46 | 99.74 |
| HMR | 73.06 | 70.69 | 76.10 | 73.11 | HMR | 71.52 | 70.38 | 75.91 | 72.73 |
| SPIN | 68.38 | 66.58 | 70.40 | 68.15 | SPIN | 66.27 | 67.00 | 70.32 | 67.82 |
| HW-HuP | 37.26 | 40.42 | 41.68 | 38.26 | HW-HuP | 36.00 | 39.56 | 41.53 | 37.93 |

Figure 20:
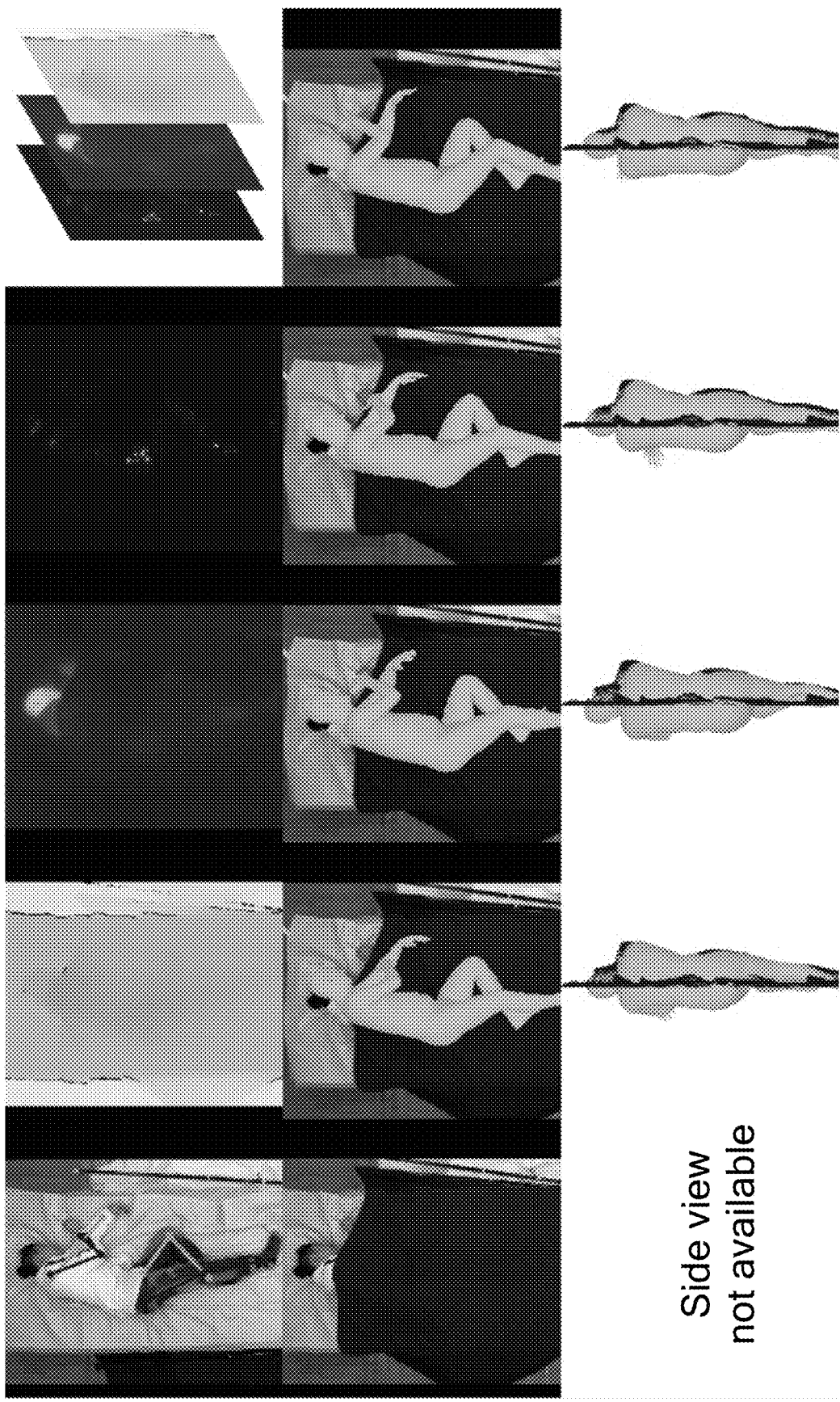
FIG. 20 illustrates qualitative 3D human pose and shape estimation results of the HW-HuP applied on an example image from SLP dataset with heavy occlusion (thick blanket) when input 2D images are depth, LWIR, PM, or their combinations, respectively. First row shows the input modalities as well as a "nocover" version of the RGB image as the reference. Second and third rows show the inference result of front view and side view, respectively.

These results reveal that HW-HuP was still effective under these challenging conditions. Nonetheless, it is reasonable that the performance for "no-cover" cases were noticeably better than the covered conditions. Note that aligned depth error was only a quantitative reference based on depth data alignment, which did not equal their true 3D pose estimation performance. In this case, it is reasonable that the depth modality, which also served as the metric, showed better performance. The outputs of HW-HuP on one of the occluded human images (from "cover2" condition) are shown in FIG. 20, which shows that the results fit the observed point clouds nicely. More instances are described below in Section II.4.

II.3.5. Comparison with SOTA on a Large-Scale 3D Human Pose Benchmark

Due to the lack of 3D pose ground truth in the SLP dataset, to quantify HW-HuP performance, HW-HuP was applied directly on Human3.6M and its performance compared with the reported SOTA approaches, as shown in Table 3.

Table 5 provides a comparison with the SOTA based on the MPJPE metric tested on Human3.6M dataset using Protocol #2. It also reports the result of rigid Procrustes analysis (PA) alignment here for reference. It can be seen that without PA, the performance is already comparable to some of the SOTA approaches despite not using any ground truth 3D pose in the training pipeline. SPIN can be deemed as an oracle for this technology, which employs the same network structure as HW-HuP, yet with access to 3D pose ground truth. Best PA MPJPE is given in italics.

TABLE 5

| Methods | Dir. | Dis. | Eat | Gre. | Phon. | Pose | Pur. | Sit | SitD. | Smo. | Phot. | Wait | Walk | WalkD. | WalkT. | Avg |
|---|---|---|---|---|---|---|---|---|---|---|---|---|---|---|---|---|
| Akhter & Black | 199.2 | 177.6 | 161.8 | 197.8 | 176.2 | 186.5 | 195.4 | 167.3 | 160.7 | 173.7 | 177.8 | 181.9 | 176.2 | 198.6 | 192.7 | 181.1 |
| Ramakrishna | 137.4 | 149.3 | 141.6 | 154.3 | 157.7 | 158.9 | 141.8 | 158.1 | 168.6 | 175.6 | 160.4 | 161.7 | 150.0 | 174.8 | 150.2 | 157.3 |
| Zhou | 99.7 | 95.8 | 87.9 | 116.8 | 108.3 | 107.3 | 93.5 | 95.3 | 109.1 | 137.5 | 106.0 | 102.2 | 106.5 | 110.4 | 115.2 | 106.7 |
| SMPLify | 62.0 | 60.2 | 67.8 | 76.5 | 92.1 | 77.0 | 73.0 | 75.3 | 100.3 | 137.3 | 83.4 | 77.3 | 79.7 | 86.8 | 81.7 | 82.3 |
| Chen | 89.9 | 97.6 | 90.0 | 107.9 | 107.3 | 93.6 | 136.1 | 133.1 | 240.1 | 106.7 | 139.2 | 106.2 | 87.0 | 114.1 | 90.6 | 114.2 |
| Tome | 65.0 | 73.5 | 76.8 | 86.4 | 86.3 | 68.9 | 74.8 | 110.2 | 173.9 | 85.0 | 110.7 | 85.8 | 71.4 | 86.3 | 73.1 | 88.4 |
| Moreno | 69.5 | 80.2 | 78.2 | 87.0 | 100.8 | 76.0 | 69.7 | 104.7 | 113.9 | 89.7 | 102.7 | 98.5 | 79.2 | 82.4 | 77.2 | 87.3 |
| Zhou | 68.7 | 74.8 | 67.8 | 76.4 | 76.3 | 84.0 | 70.2 | 88.0 | 113.8 | 78.0 | 98.4 | 90.1 | 62.6 | 75.1 | 73.6 | 79.9 |
| Hajangiri | 74.4 | 66.7 | 67.9 | 75.2 | 77.3 | 70.6 | 64.5 | 95.6 | 127.3 | 79.6 | 79.1 | 73.4 | 67.4 | 71.8 | 72.8 | 77.6 |
| Mehta | 57.5 | 68.6 | 59.6 | 67.3 | 78.1 | 56.9 | 69.1 | 98.0 | 117.5 | 69.5 | 82.4 | 68.0 | 55.3 | 76.5 | 61.4 | 72.9 |
| Martinez | 51.8 | 56.2 | 58.1 | 59.0 | 69.5 | 55.2 | 58.1 | 74.0 | 94.6 | 62.3 | 78.4 | 59.1 | 49.5 | 65.1 | 52.4 | 62.9 |
| Fang | 50.1 | 54.3 | 57.0 | 57.1 | 66.6 | 53.4 | 55.7 | 72.8 | 88.6 | 60.3 | 73.3 | 57.7 | 47.5 | 62.7 | 50.6 | 60.4 |
| Sun | 52.8 | 54.8 | 54.2 | 54.3 | 61.8 | 53.1 | 53.6 | 71.7 | 86.7 | 61.5 | 67.2 | 53.4 | 47.1 | 61.6 | 63.4 | 59.1 |
| Sun | 47.5 | 47.7 | 49.5 | 50.2 | 51.4 | 43.8 | 46.4 | 58.9 | 65.7 | 49.4 | 55.8 | 47.8 | 38.9 | 49.0 | 43.8 | 49.6 |
| Moon | 50.5 | 55.7 | 50.1 | 51.7 | 53.9 | 46.8 | 50.0 | 61.9 | 68.0 | 52.5 | 55.9 | 49.9 | 41.8 | 56.1 | 46.9 | 53.3 |
| SPIN | 60.6 | 61.0 | 57.9 | 64.5 | 67.1 | 59.9 | 57.7 | 80.1 | 91.3 | 63.2 | 65.8 | 60.2 | 53.2 | 61.2 | 60.4 | 65.7 |
| SPIN PA | 39.5 | 42.1 | 41.1 | 44.8 | 46.6 | 38.6 | 38.8 | 60.8 | 68.5 | 45.2 | 46.2 | 41.4 | 36.0 | 45.0 | 40.9 | *44.2* |
| HW-HuP | 95.0 | 103.9 | 99.8 | 101.0 | 106.3 | 94.2 | 110.1 | 121.4 | 140.1 | 103.3 | 112.8 | 99.5 | 92.8 | 107.2 | 101.9 | 104.1 |
| HW-HuP PA | 47.0 | 49.5 | 49.2 | 51.2 | 52.1 | 45.0 | 48.4 | 64.7 | 75.4 | 49.9 | 54.3 | 47.8 | 42.6 | 53.3 | 48.8 | 50.4 |

Figure 21:
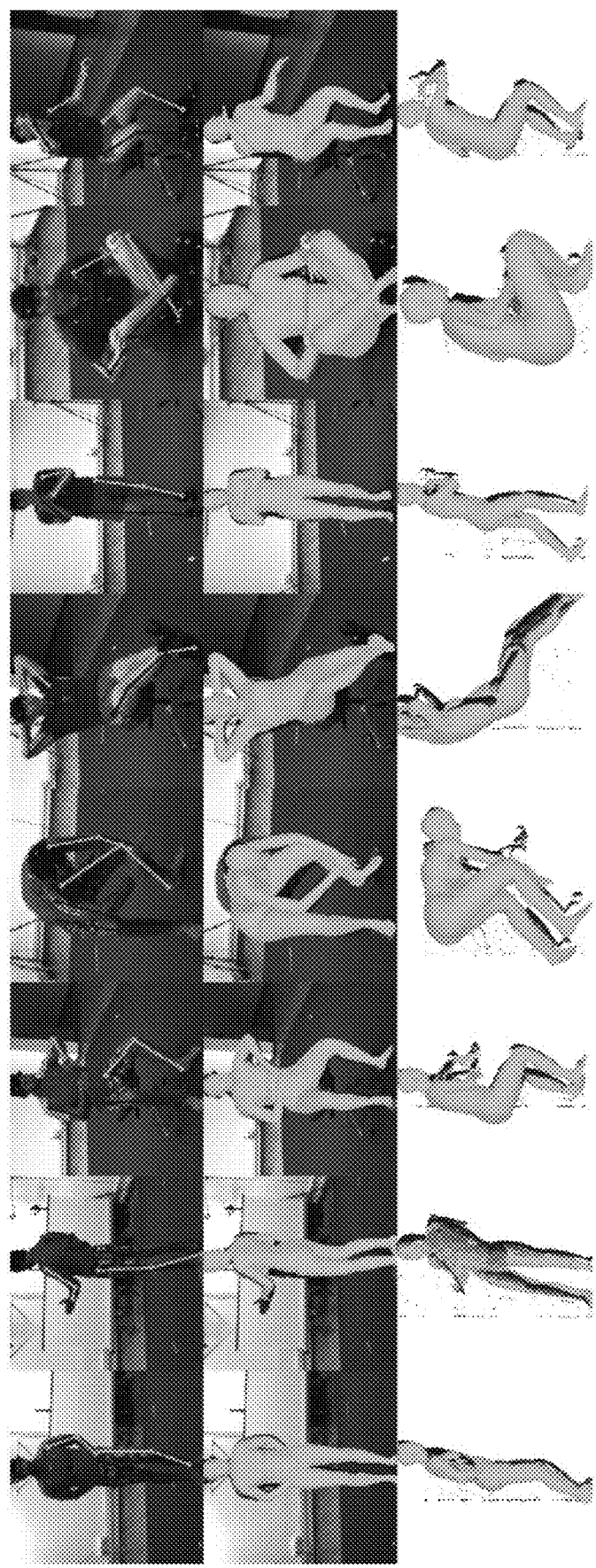
FIG. 21 illustrates qualitative 3D human pose and shape estimation results of the HW-HuP applied on Human3.6m valid dataset (including subject 9 and 11). The first row shows the input RGB image. The second and third rows visualize the HW-HuP results of front view and side view, respectively. Points cloud are aligned with side view model in blue dots in third row. More visualization examples are displayed in our Supplementary Materials.

From Table 5, it can be seen that HW-HuP differs from the oracle performer SPIN by about 40 mm before PA alignment, yet only 10 mm after PA. Some predicted results are also exhibited in FIG. 21. It is apparent that the produced models not only have good 2D projection on the RGB images, they can also match the point clouds effectively by only having access to the depth auxiliary information, without any 3D keypoints ground truth supervision (as shown in the last row of FIG. 21). As a main goal was fine-tuning the existing models for a variety of applications, HW-HuP was always initialized from the pre-trained SPIN, which benefitted from daily activity tasks.

II.4. Additional Material

II.4.1. Details on VisNet Structure

Figures 22A, 22B:
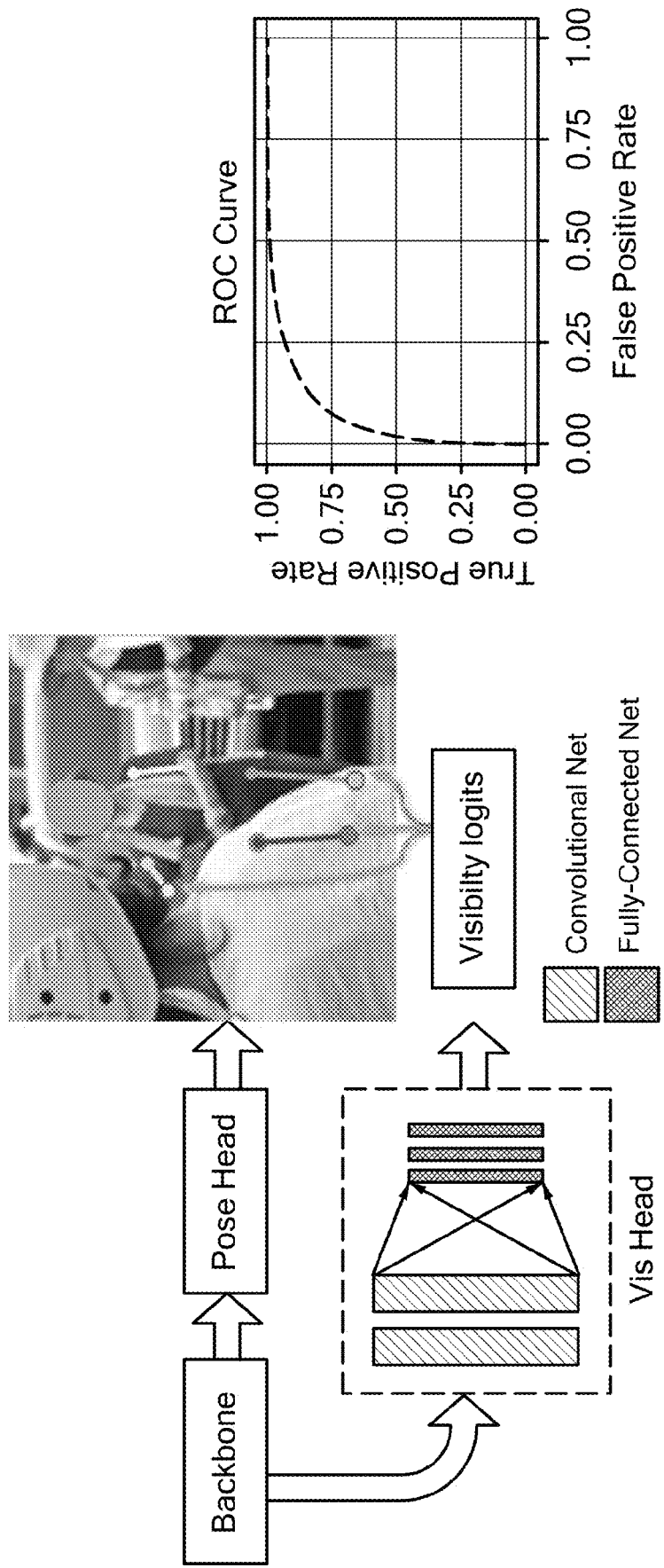
FIGS. 22A-22B illustrate VisNet model diagram (FIG. 22A) and visibility detection ROC performance on COCO validation dataset (FIG. 22B). Detected occlusions are annotated with red circle.

The main purpose of VisNet is to detect the invisible joints in an image. This information is often deemed as trivial in many pose estimation works since (1) an effective pose estimation model is supposed to be able to infer occluded joints for a robust performance, and (2) in the 3D pose cases, the poses are collected from a motion capture (MoCap) device independently, which is irrelevant to its 2D visibility. However, as discussed in Section 3 above, the visibility could be a potential indicator of a large bias for joint depth proxy. Therefore, it is helpful to filter out unreliable proxy points during supervision. In the technology described herein, the VisNet head is based on the ResNet backbone (Kaiming He, Xiangyu Zhang, Shaoqing Ren, and Jian Sun. Deep residual learning for image recognition. In *Proceedings of the IEEE conference on computer vision and pattern recognition*, pages 770-778, 2016). It includes two convolution layers with kernel 1×1 and channel 256 and 32 followed by 3 fully connected layers with channel of 256, 64, 17. Each layer is followed by a batch normalization and a rectified linear unit (ReLU). To enhance its semantic understanding of the specific joint for visibility detection, the pose head can be added on top of the backbone for joint training. VisNet design is shown in FIG. 22A. In this implementation, VisNet was trained with an Adam optimizer with learning rate of 0.001 with a total epoch of 80. The implementation was trained on COCO dataset, which showed an area under curve (AUC) score of 93.3% on COCO validation split. The receiver operating characteristic (ROC) curve is shown in FIG. 22B.

Figure 23:
FIG. 23 illustrates qualitative results of VisNet on COCO (first row) and Human3.6M (second row). Detected occlusions are annotated with red circle.

Qualitative results of VisNet on COCO and Human3.6M are shown in FIG. 23. It can be seen that it is more likely to find the occluded joint when the occluded object has an appearance that is distinct from the blockers. Some failure cases can also be noted, as in the following: (1) When the joints are close to the image boundary or other objects. It can be assumed that it may depend on the appearance differences as the boundary to other objects or image edge all produce sharp changes such as FIG. 23 row(r) 2, column(c) 6. (2) Local view of the limbs, see r1 c6. In the lower body only cases, it is hard to learn a good inference and most parts may be deemed as invisible. (3) If one of the joints is invisible, the neighboring joints on the same limb are sometimes deemed as invisible, see r2 c7.

II.4.2. Projected 2D Pose Estimation Results

PCK (Percentage of Correct Keypoints) was used to evaluate the accuracy of localization of keypoints with a given threshold. PCK@0.2 was used here, which means the threshold is set to 20 percentage of torso size and when the distance between the 2D results projected from 3D predicted pose and the 2D ground truth is smaller than the given threshold, it can be useful to categorize the results as correct predictions. The PCK@0.2 results are shown in Table S1.

Table 6 shows PCK@0.2 of HW-HuP and SOTA approaches for 2D ground truth and 2D results projected by 3D predicted pose on the "nocover," "cover1," "cover2" and all cover conditions of the depth, LWIR, PM from SLP dataset.

TABLE 6

| Nocover | Depth | LWIR | PM | Combined | Cover1 | Depth | LWIR | PM | Combined |
|---|---|---|---|---|---|---|---|---|---|
| SPIN* | 34.43 | 42.85 | 15.49 | 45.90 | SPIN* | 19.63 | 17.21 | 15.82 | 24.58 |
| HMR | 96.51 | 95.57 | 90.59 | 95.46 | HMR | 90.76 | 91.93 | 90.71 | 94.14 |
| SPIN | 96.23 | 95.57 | 90.56 | 95.45 | SPIN | 90.37 | 92.21 | 90.51 | 94.17 |
| HW-HuP | 96.64 | 95.22 | 91.17 | 95.49 | HW-HuP | 91.70 | 91.90 | 91.20 | 94.21 |

| Cover2 | Depth | LWIR | PM | Combined | All Covers | Depth | LWIR | PM | Combined |
|---|---|---|---|---|---|---|---|---|---|
| SPIN* | 21.27 | 17.61 | 15.79 | 25.14 | SPIN* | 25.11 | 25.89 | 15.70 | 31.87 |
| HMR | 91.17 | 91.53 | 90.80 | 93.38 | HMR | 92.81 | 93.01 | 90.70 | 94.33 |
| SPIN | 90.83 | 91.94 | 90.34 | 93.33 | SPIN | 92.48 | 93.24 | 90.47 | 94.32 |
| HW-HuP | 91.68 | 91.76 | 90.79 | 93.77 | HW-HuP | 93.34 | 92.96 | 91.06 | 94.49 |

II.4.3. Comments on the Selective Pose Prior Transfer

Around the idea of learning from the source prior, there are two plausible arguments:

One may assume that learning from the source pose prior is pointless as there will be a different pose distribution in the target domain. However, it can be argued that the incompleteness of the target pose distribution caused by the limited observations can be mitigated by using source priors. For example, only limited major joint locations are available from the target observation to regulate major parts, and their axis rotation as well as small body parts are unconstrained. Since the specific joint pose (rotation) priors are shared between the source and target, this information can be learned from the source priors (imagine that people will not rotate their head to extreme angles in any contexts).

Additionally, if transfer learning is conducted by using a pre-trained model, such prior is inherited from the initial weights. This is true if this transfer learning was conducted within the same modalities. However, when trying to extend this model beyond RGB and without a good initialization, these priors via OPT can play an important role.

Taking the in-bed human pose for example, the underlying logic comes from the following observation: if one looks at the estimation result of the target image with a pre-trained model from a source domain, the output human usually holds a standing-like posture. Most of the time, only a few major joints need to be changed to have an acceptable solution for the target observation. In other words, the estimated pose from the source model and the true pose in the target domain are neighbors on the human pose manifold with similarity in many trivial joint poses. A pose guess from a source prior to regress to the target pose is always better than a guess from nowhere and it can be hoped the evolution follows such manifold. With a strong prior at the beginning, the regressor F learns under the source prior guidance to have a whole picture of full joint pose (rotation). With source prior faded away, F can focus more on the observations to have its context-specific prior over the major joints, yet keep the learned prior over the trivial ones which is otherwise unconstrained under the target-only supervisions. In this way, the source pose prior is actually selectively transferred to the target regressor F.

II.4.4. Additional Qualitative Results

Figure 24:
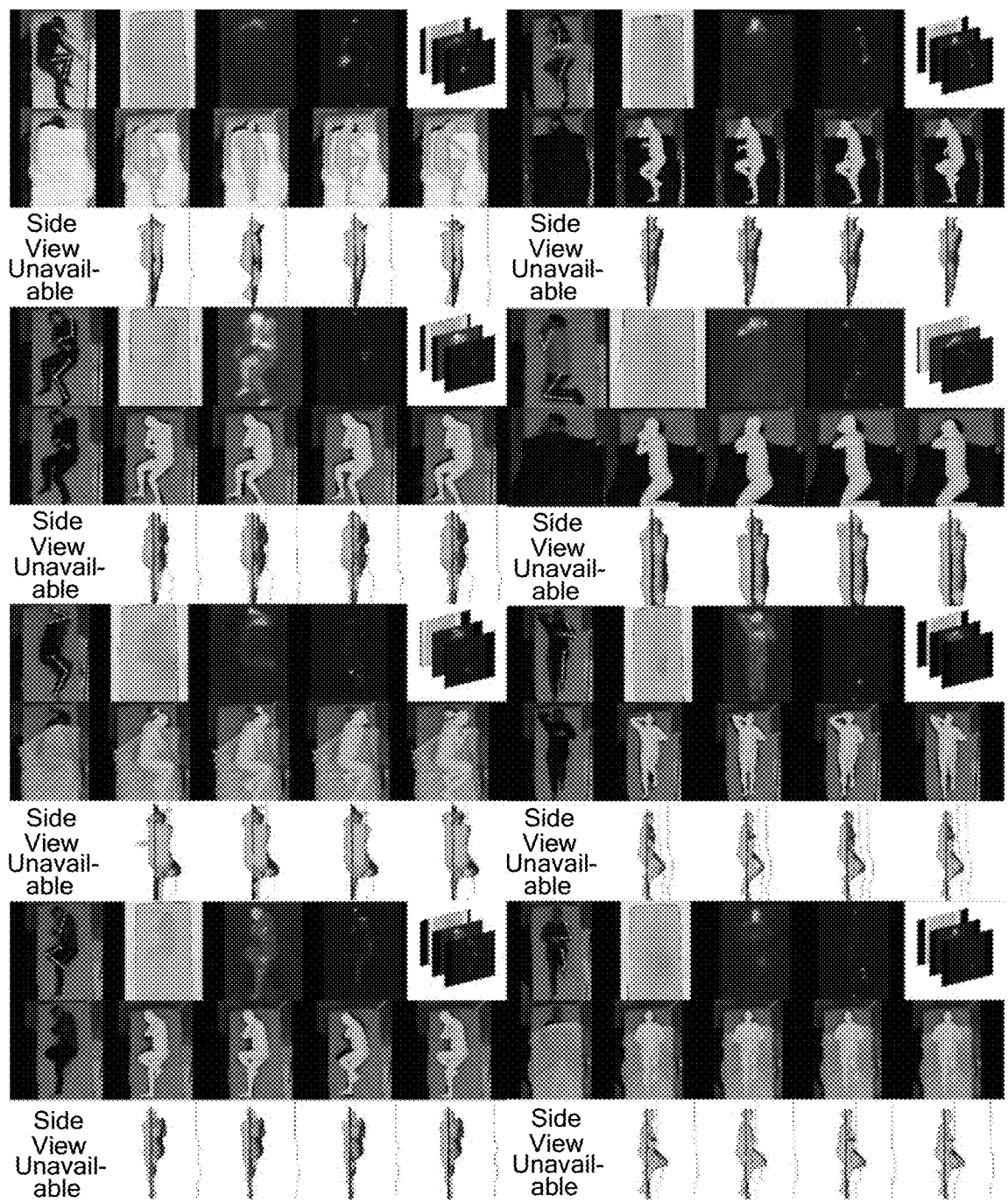
FIG. 24 illustrates qualitative 3D human pose and shape estimation results of the HW-HuP applied on SLP dataset when input 2D images are depth, LWIR, PM, or their combinations, respectively. First row shows the input modalities as well as a "nocover" version of the RGB image as the reference. Second and third rows show the inference result of front view and side view, respectively.
Figure 25:
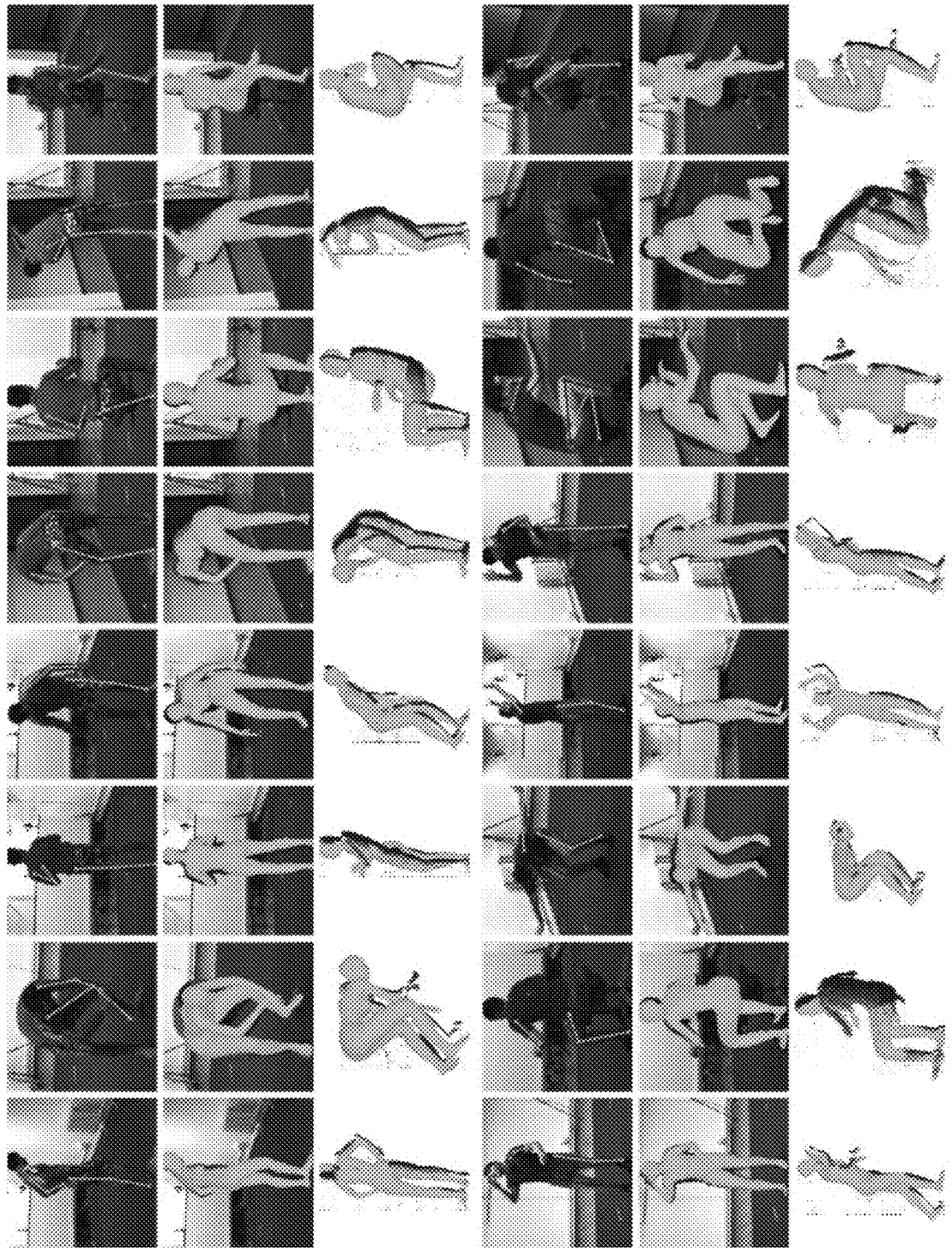
FIG. 25 illustrates further qualitative 3D human pose and shape estimation results of the HW-HuP applied on Human3.6m valid dataset. The first three rows show the predictions of frames for subject 9. The las three rows are for subject 11.

Additional 3D prediction examples of the SLP dataset are illustrated in FIG. 24 and of the Human3.6m dataset are illustrated in FIG. 25. In FIG. 24, the predicted results are displayed based on different inputs (depth, LWIR, PM, or multi-modal) for subjects with different cover conditions (no cover, a thin layer sheet, or a thick blanket). Some failure cases are included such as row(r) 1, column(c) 1 where LWIR failed and also the r3c1 where the left hand is not in a rest pose. For visualization of Human3.6m frames, it can be observed that although the performance of the HW-HuP model is comparable to the SOTA 3D pose estimation models, there are still some failure cases. For instances, the predicted upper limbs are more difficult to align to the point cloud than the lower limbs (e.g., the 2nd pose of subject 9 and the 4th pose of subject 11 in FIG. 25).

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A method of generating a dataset of a plurality of human in-bed poses, comprising:
    by a computer system comprising a processor and memory having computer-readable instructions stored therein:
    (a) receiving a plurality of sets of simultaneously gathered images of in-bed poses of humans from at least three imaging modalities, wherein:
        the imaging modalities include a red-green-blue (RGB) imaging modality, a pressure mapping imaging modality, and at least one of a long wavelength infrared (LWIR) imaging modality, and a depth imaging modality,
        the sets of simultaneously gathered images are each acquired from above a human subject lying in a bed, the bed comprising a pressure sensing mat and a cooling mat, and
        each of the sets of simultaneously gathered images comprises an in-bed pose and an appearance, the appearance comprising each of the humans in a lighting condition and a cover condition, the lighting condition ranging from full illumination to full darkness, the cover condition comprising no covering, a first cover, and optionally a second cover, the second cover being thicker than the first cover;
    (b) labeling the simultaneously gathered images with ground truth poses; and
    (c) storing the simultaneously gathered images labeled with the ground truth poses in a database in the computer system.

2. The method of claim 1, wherein in step (a), the imaging modalities include each of the red-green-blue (RGB) imaging modality, the long wavelength infrared (LWIR) imaging modality, the depth imaging modality, and the pressure mapping imaging modality.

3. A method of generating a dataset of a plurality of human in-bed poses, comprising:
    by a computer system comprising a processor and memory having computer-readable instructions stored therein:
    (a) receiving a plurality of sets of simultaneously gathered images of in-bed poses of humans from at least two imaging modalities, wherein:
        the imaging modalities include a red-green-blue (RGB) imaging modality and at least one of a long wavelength infrared (LWIR) imaging modality, a depth imaging modality, and a pressure mapping imaging modality, and
        each of the sets of simultaneously gathered images comprises an in-bed pose and an appearance, the appearance comprising each of the humans in a lighting condition and a cover condition, the lighting condition ranging from full illumination to full darkness, the cover condition selected from no covering, a first cover, and a second cover, the second cover being thicker than the first cover;

(b) labeling the simultaneously gathered images with ground truth poses, said labeling comprising:
mapping each image in one of the imaging modalities to a target pose state; and
minimizing a pose estimation error that depends on parameters including a target appearance, a target pose, a context appearance, and a context pose, wherein said minimizing comprises one or more of:
labeling images by comparison to a known image with a same target pose under a different context appearance or a different context pose;
labeling images that have a same target pose under a context appearance of no cover;
using images that are gathered from the RGB imaging modality as a heuristic guide to label images gathered from another of the imaging modalities; and
providing a homographic mapping from a first image obtained from one imaging modality to a second image obtained from a different imaging modality;
wherein the target appearance, the context appearance, and the context pose comprise hyperparameters used to control the labeling; and (c) storing the simultaneously gathered images labeled with the ground truth poses in a database in the computer system.

4. A method of generating a dataset of a plurality of human in-bed poses, comprising:
by a computer system comprising a processor and memory having computer-readable instructions stored therein:
(a) receiving a plurality of sets of simultaneously gathered images of poses of humans in a bed from at least two imaging modalities, wherein:
the imaging modalities include a red-green-blue (RGB) imaging modality and at least one of a long wavelength infrared (LWIR) imaging modality, a depth imaging modality, and a pressure mapping imaging modality, and
each of the sets of simultaneously gathered images comprises an in-bed pose and an appearance, the appearance comprising each of the humans in a lighting condition and a cover condition, the lighting condition ranging from full illumination to full darkness, the cover condition comprising no covering, a first cover, and optionally a second cover, the second cover being thicker than the first cover;
(b) obtaining a background image of a surface of an unoccupied bed at a room temperature at each of the imaging modalities;
(c) obtaining a further image of the surface of the unoccupied bed with one or more markers placed on the surface of the unoccupied bed, each marker altering the images obtained by each of the imaging modalities;
(d) using the further image in a homographic mapping;
(e) labeling the simultaneously gathered images with ground truth poses; and
(f) storing the simultaneously gathered images labeled with the ground truth poses in a database in the computer system.

5. The method of claim 1, wherein the labeled images include images of body joints or a data file containing coordinate locations of each body joint.

6. The method of claim 1, further comprising acquiring the sets of the simultaneously gathered images from the imaging modalities, wherein:
the RGB imaging modality, the LWIR imaging modality, and the depth imaging modality, each comprise a camera or sensor mounted on a ceiling at a same distance above the bed; and
each of the imaging modalities is in communication with the computer system to provide simultaneously obtained images to the computer system.

7. The method of claim 1, wherein the lighting condition of full illumination comprises a room having artificial illumination turned on, and the lighting condition of full darkness comprises a room having artificial illumination turned off.

8. A system for providing a dataset of a plurality of human in-bed poses using the method of claim 1, comprising:
the computer system comprising the processor and memory having computer-readable instructions stored therein that when executed, cause the computer system to carry out the steps (a), (b), and (c).

9. A method of estimating a human in-bed pose comprising:
(a) providing a computer system comprising a processor and memory, including a trained model for estimating human in-bed poses trained with a dataset comprising a plurality of human in-bed poses comprising sets of images generated simultaneously from at least three imaging modalities, wherein:
the imaging modalities include a red-green-blue (RGB) imaging modality, a pressure mapping imaging modality, and one or more of a long wavelength infrared (LWIR) imaging modality and a depth imaging modality,
the sets of images are each acquired from above a human subject lying in a bed, the bed comprising a pressure sensing mat and a cooling mat, and
each of the sets of images further comprises an in-bed pose and an appearance, the appearance comprising each human in a lighting condition and a cover condition, the lighting condition ranging from full illumination to full darkness, the cover condition comprising no covering, a first cover, and optionally a second cover, the second cover being thicker than the first cover;
(b) transmitting to the processor one or more images of a human lying in a bed from one or more imaging devices oriented toward the bed, the imaging devices comprising one or more of a red-green-blue (RGB) imaging device, a long wavelength infrared (LWIR) imaging device, a depth imaging device, a cooling mat, and a pressure map imaging device;
(c) determining by the processor a pose of the human lying in the bed above said pressure map imaging device and cooling mat; and
(d) outputting an image illustrating the pose of the human lying in the bed.

10. A system for estimating a human in-bed pose using the method of claim 9, comprising:
the one or more imaging devices oriented toward a bed, the imaging devices comprising the one or more of a red-green-blue (RGB) imaging device, the long wavelength infrared (LWIR) imaging device, the depth imaging device, and the pressure sensing mat; and
the computer system comprising the processor and memory, including the trained model for estimating human in-bed poses trained with the dataset comprising the plurality of human in-bed poses comprising the sets of images generated simultaneously from at least two imaging modalities, wherein:
the imaging modalities including the red-green-blue (RGB) imaging modality, and at least one of the long wavelength infrared (LWIR) imaging modality, the depth imaging modality, and the pressure map imaging modality,
each of the sets of images further comprises an in-bed pose and an appearance, the appearance comprising the darkness condition and the cover condition, the darkness condition selected from light and darkness, the cover condition comprising no covering, the first cover, and the second cover, the second cover being thicker than the first cover, and
the processor is in communication with the one or more imaging devices to receive one or more images of a human lying in the bed and is operative to determine a pose of the human lying in the bed via the trained model.

11. A method of estimating an in-bed human pose comprising:
(a) providing a computer system comprising a processor and memory having computer-readable instructions stored therein, including a trained model for estimating human poses trained with a dataset comprising a plurality of three-dimensional images from a source domain and a plurality of target domain images;
(b) inputting a two-dimensional image of a human figure lying on a bed;
(c) determining by the processor a three-dimensional pose and shape of the human figure lying on the bed; and
(d) generating an image of the human figure, the image illustrating the three-dimensional pose and the shape of the human figure lying on the bed;
wherein:
the source domain images include three-dimensional pose and shape images; and
the target domain images include two-dimensional annotated pose data and depth data including sets of simultaneously gathered images of in-bed poses of humans from at least three imaging modalities, wherein:
the imaging modalities include a red-green-blue (RGB) imaging modality, a pressure mapping imaging modality, and at least one of a long wavelength infrared (LWIR) imaging modality and a depth imaging modality;
the sets of simultaneously gathered images are each acquired from above a human subject lying in a bed, the bed comprising a pressure sensing mat and a cooling mat, and
each of the sets of simultaneously gathered images comprises an in-bed pose and an appearance, the appearance comprising a lighting condition and a cover condition, the lighting condition ranging from full illumination to full darkness, the darkness condition selected from light and darkness, the cover condition comprising no covering, a first cover, and optionally a second cover, the second cover being thicker than the first cover.

12. The method of claim 11, wherein the computer-readable instructions further include:
a three-dimensional pose regression model trained to estimate, from the two-dimensional image, a three-dimensional pose of the human figure, a shape of the human figure, and camera parameters, wherein the regression model is trained to provide an output comprising an estimated mesh of vertices representative of an estimated image of the human figure, wherein the three-dimensional pose is a vector of a representation of a plurality of body parts, and the shape is a number of coefficients in a human template space, and the camera parameters comprise a camera global rotation, a translation vector, and a scale; and
a neural renderer to determine a predicted depth and a mask from the estimated mesh.

13. The method of claim 12, wherein the processor is operative:
in an optimization pipeline to minimize a two-dimensional pose estimation error; and
in an observation pipeline to feed observed two-dimensional pose annotation data, depth data, human body mask data, and joint depth-based proxy data for supervision of step (c) of determining the three-dimensional pose and the shape of the human figure.

14. The method of claim 12, wherein the processor is operative to:
in a first stage, determine an estimated mesh of the human figure aligned in two-dimensions and an estimated mask from the estimated mesh; and
in a second stage, fine tune the three-dimensional pose and the shape from the estimated mask with additional depth alignment data.

15. The method of claim 13, wherein the processor is operative in a first stage to:
(e) determine by the regression model an initial estimate of a three-dimensional pose and camera parameters;
(f) in the optimization pipeline, optimize the initial estimate from step (e) or a subsequent estimate to provide an updated estimate;
(g) in the observation pipeline, update the regression model by minimizing an error in the updated estimate from the two-dimensional pose annotation data and the joint depth-based proxy data; and
(h) repeat steps (f) through (g) for a determined number of iterations.

16. The method of claim 15, wherein:
in step (g), the regression model is updated with a supervision loss dependent on a two-dimensional pose loss, a pose prior learned from the source domain, and penalty terms representative of shape coefficients and joint rotations, or with a three-dimensional pose loss dependent on joint visibility data in the two-dimensional pose annotation data; and
the processor is operative in a second stage after the first stage to generate, by the neural renderer, an estimated depth and a mask of the human figure, wherein the estimated depth and the mask of the human figure are generated with a loss term of human pose and shape regression dependent on the two-dimensional pose loss, optimized pose and shape terms, and a depth loss term.

17. The method of claim 11, wherein the processor is operative to determine the pose of the human in one or more of a covered condition, and in the lighting condition ranging from full illumination to full darkness.

* * * * *